(12) United States Patent (10) Patent No.: US 11,158,107 B2
Hur et al. (45) Date of Patent: Oct. 26, 2021

(54) POINT CLOUD DATA TRANSMISSION DEVICE, POINT CLOUD DATA TRANSMISSION METHOD, POINT CLOUD DATA RECEPTION DEVICE, AND POINT CLOUD DATA RECEPTION METHOD

(71) Applicant: LG ELECTRONICS INC., Seoul (KR)

(72) Inventors: Hyejung Hur, Seoul (KR); Sejin Oh, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 17/062,995

(22) Filed: Oct. 5, 2020

(65) Prior Publication Data

US 2021/0104090 A1 Apr. 8, 2021

Related U.S. Application Data

(60) Provisional application No. 62/910,388, filed on Oct. 3, 2019.

(51) Int. Cl.
*G06T 15/00* (2011.01)
*G06T 19/00* (2011.01)
(Continued)

(52) U.S. Cl.
CPC .......... *G06T 15/005* (2013.01); *G06T 19/003* (2013.01); *G06T 19/006* (2013.01); *H04N 13/15* (2018.05); *H04N 13/161* (2018.05)

(58) Field of Classification Search
CPC ... G06T 15/005; G06T 19/003; G06T 19/006; H04N 13/15; H04N 13/161
See application file for complete search history.

(56) References Cited

U.S. PATENT DOCUMENTS 10,853,447 B2 * 12/2020 Chou ..................... G06F 17/175
10,853,973 B2 * 12/2020 Tourapis ................. G06T 9/001
(Continued)

FOREIGN PATENT DOCUMENTS

KR 1020180122947 A 11/2018
WO WO-2019016168 A1 * 1/2019 ............ C08F 212/08

OTHER PUBLICATIONS

Khaled Mammou et al, "G-PCC codec description v2", ISO/IEC, JTC1/SC29/WG11 N18189, Jan. 31, 2019, See abstract, section 3 and figure 3 (Year: 2019).*

(Continued)

*Primary Examiner* — David T Welch
(74) *Attorney, Agent, or Firm* — Dentons US LLP

(57) ABSTRACT

Disclosed herein is a method of transmitting point cloud data. The method may include acquiring point cloud data, encoding geometry information including positions of points in the point cloud data, generating Level Of Details (LODs) based on the geometry information and searching neighbor points of each point to be attribute encoded based on the generated LODs, encoding first attribute information of each point based on the searched neighbor points, encoding second attribute information of each point based on the searched neighbor points, and transmitting the encoded geometry information, the encoded first and second attribute information and signaling information.

16 Claims, 36 Drawing Sheets

(51) Int. Cl.
*H04N 13/15* (2018.01)
*H04N 13/161* (2018.01)

(56) References Cited

U.S. PATENT DOCUMENTS

| | | | | |
|---|---|---|---|---|
| 10,853,974 | B2 * | 12/2020 | Budagavi | G06T 9/001 |
| 2009/0232355 | A1 | 9/2009 | Minear et al. | |
| 2016/0203387 | A1 | 7/2016 | Lee et al. | |
| 2017/0249401 | A1 | 8/2017 | Eckart et al. | |
| 2019/0080483 | A1 * | 3/2019 | Mammou | G06T 7/50 |
| 2019/0081638 | A1 * | 3/2019 | Mammou | H03M 7/6035 |
| 2019/0087979 | A1 * | 3/2019 | Mammou | H04N 19/597 |
| 2019/0311499 | A1 * | 10/2019 | Mammou | G06T 9/001 |
| 2019/0311501 | A1 * | 10/2019 | Mammou | G06T 17/00 |
| 2020/0021856 | A1 * | 1/2020 | Tourapis | H04N 19/13 |
| 2020/0111236 | A1 * | 4/2020 | Tourapis | G06T 9/001 |
| 2020/0217937 | A1 * | 7/2020 | Mammou | G01S 7/4861 |
| 2020/0219285 | A1 * | 7/2020 | Faramarzi | H04L 65/602 |
| 2020/0302651 | A1 * | 9/2020 | Flynn | G06T 3/4084 |
| 2020/0304823 | A1 * | 9/2020 | Yea | H04N 19/597 |
| 2020/0311984 | A1 * | 10/2020 | Yea | G06T 9/004 |
| 2020/0314435 | A1 * | 10/2020 | Tourapis | G06T 9/001 |
| 2020/0320744 | A1 * | 10/2020 | Nakagami | H04L 65/607 |

OTHER PUBLICATIONS

Khaled Mammou et al., "G-PCC codec description v2", ISO/IEC JTC1/SC29/WG11 N18189, Jan. 31, 2019.

* cited by examiner

FIG. 6
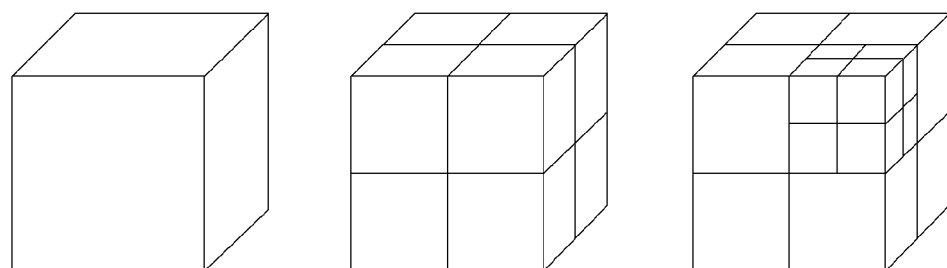
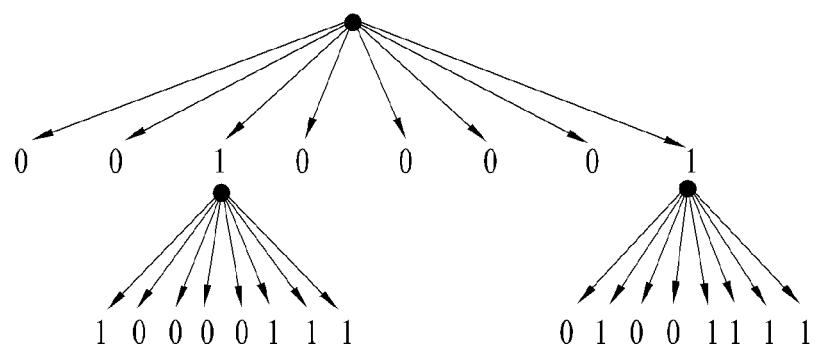

FIG. 7
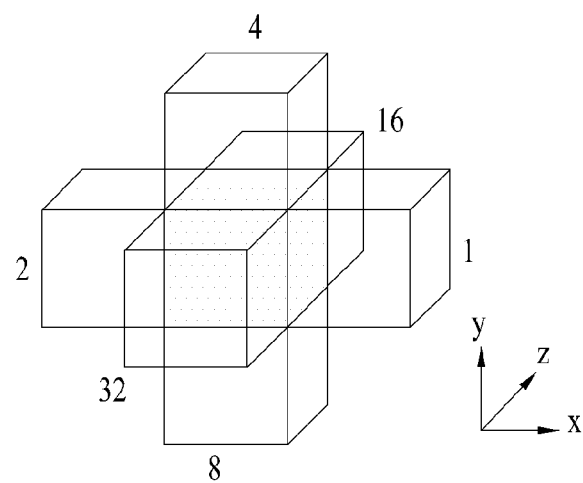
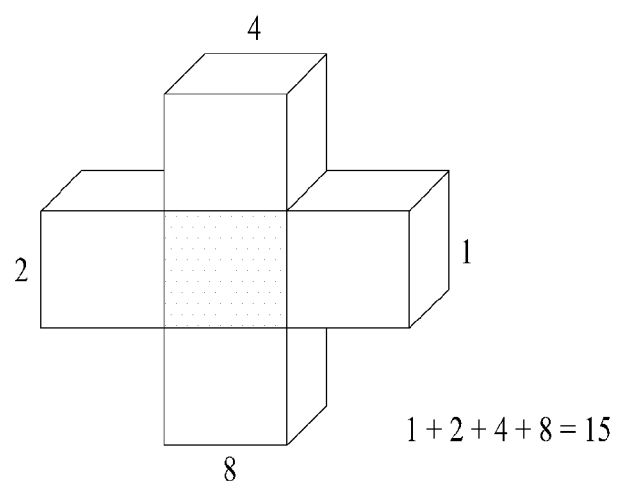
1 + 2 + 4 + 8 = 15

FIG. 25

| seq_parameter_set_rbsp() { | Descriptor |
|---|---|
| profile_idc | u(8) |
| profile_compatibility_flags | u(24) |
| level_idc | u(8) |
| sps_bounding_box_present_flag | u(1) |
| if(sps_bounding_box_present_flag){ | |
| sps_bounding_box_offset_x | se(v) |
| sps_bounding_box_offset_y | se(v) |
| sps_bounding_box_offset_z | se(v) |
| sps_bounding_box_offset_factor | ue(v) |
| sps_bounding_box_offset_width | ue(v) |
| sps_bounding_box_offset_height | ue(v) |
| sps_bounding_box_offset_depth | ue(v) |
| } | |
| sps_source_scale_factor[Ed. TMC13 v6 uses float, but integer is preferred.] | u(32) |
| sps_seq_parameter_set_id | ue(v) |
| sps_num_attribute_sets | ue(v) |
| for( i=0; i<sps_num_attribute_sets; i++ ) { | |
| attriute_dimension[i] | ue(v) |
| attribute_instance_id[i] | ue(v) |
| attribute_bitdepth[i] | ue(v) |
| attribute_cicp_colour_primaries[i] | ue(v) |
| attribute_cicp_transfer_characteristics[i] | ue(v) |
| attribute_cicp_matrix_coeffs[i] | ue(v) |
| attribute_cicp_video_full_range_flag[i] | u(1) |
| known_attribute_label_flag[i]){ | u(1) |
| if(known_attribute_label_flag[i]){ | |
| known_attribute_label[i] | ue(v) |
| else | |
| attribute_label_four_byte[i]} | u(32) |
| attribute_recommanded_shared_result_flag[i] | u(1) |
| } | |
| sps_extension_present_flag | u(1) |
| if(sps_extension_present_flag) | |
| while(more_data_in_byte_stream()) | |
| sps_extension_data_flag | u(1) |
| byte_alignment() | |
| } | |

FIG. 26

| geometry_parameter_set( ) { | Descriptor |
|---|---|
|     gps_geom_parameter_set_id | ue(v) |
|     gps_seq_parameter_set_id | ue(v) |
|     gps_box_present_flag | u(1) |
|     if( gps_box_present_flag ){ | |
|         gps_gsh_box_log2_scale_present_flag | u(1) |
|         if( gps_gsh_box_log2_scale_present_flag == 0 ) | |
|             gps_gsh_box_log2_scale | ue(v) |
|     } | |
|     unique_geometry_points_flag | u(1) |
|     neighbour_context_restriction_flag | u(1) |
|     inferred_direct_coding_mode_enabled_flag | u(1) |
|     bitwise_occupancy_coding_flag | u(1) |
|     adjacent_child_contextualization_enabled_flag | u(1) |
|     log2_neighbour_avail_boundary | ue(v) |
|     log2_intra_pred_max_node_size | ue(v) |
|     log2_trisoup_node_size | ue(v) |
|     gps_extension_present_flag | u(1) |
|     if( gps_extension_present_flag ) | |
|         while( more_data_in_byte_stream( ) ) | |
|             gps_extension_data_flag | u(1) |
|     byte_alignment( ) | |
| } | |

FIG. 27

| attribute_parameter_set() { | Descriptor |
|---|---|
| aps_attr_parameter_set_id | ue(v) |
| aps_seq_parameter_set_id | ue(v) |
| attr_coding_type | ue(v) |
| aps_attr_initial_qp | ue(v) |
| aps_attr_chroma_qp_offset | se(v) |
| aps_slice_qp_delta_present_flag | u(1) |
| isLifting = ( attr_coding_type == 0 \|\| attr_coding_type == 2) ? 1 : 0 | |
| if( isLifting ) { | |
|     lifting_num_pred_nearest_neighbours | ue(v) |
|     lifting_max_num_direct_predictors | ue(v) |
|     lifting_search_range | ue(v) |
|     lifting_lod_regular_sampling_enabled-flag | u(1) |
|     lifting_num_detail_levels_minus1 | ue(v) |
|     for( idx = 0; idx<=num_detail_levels_minus1; idx++ ) { | |
|         if(lifting_lod_decimation_enabled_flag) | |
|         lifting_sampling_period[idx] | ue(v) |
|         else | |
|         lifting_sampling_distance_squared[idx] | ue(v) |
|     } | |
|     attribute_recommanded_shared_result_flag | u(1) |
| } | |
| if(attr_coding_type==0) | |
|     lifting_adaptive_prediction_threshold | ue(v) |
|     lifting_intra_lod_prediction_num_layers | ue(v) |
| } | |
| aps_extension_present_flag | u(1) |
| if(sps_extension_present_flag) | |
|     while(more_data_in_byte_stream( )) | |
|         aps_extension_data_flag | u(1) |
| byte_alignment( ) | |
| } | |

FIG. 28

| tile_parameter_set( ) { | Descriptor |
|---|---|
| num_tiles | ue(v) |
| for( i = 0; i < num_tiles; i++ ) { | |
| tile_bounding_box_offset_x[ i ] | se(v) |
| tile_bounding_box_offset_y[ i ] | se(v) |
| tile_bounding_box_offset_z[ i ] | se(v) |
| tile_bounding_box_size_width[ i ] | ue(v) |
| tile_bounding_box_size_height[ i ] | ue(v) |
| tile_bounding_box_size_depth[ i ] | ue(v) |
| attribute_recommanded_shared_result_flag[i] | u(1) |
| } | |
| byte_alignment( ) | |
| } | |

FIG. 29

| geometry_slice_bistream() { | Descriptor |
|---|---|
| geometry_slice_header() | |
| geometry_slice_data() | |
| } | |

FIG. 30

| geometry_slice_header( ) { | Descriptor |
|---|---|
|     gsh_geom_parameter_set_id | ue(v) |
|     gsh_tile_id | ue(v) |
|     gsh_slice_id | ue(v) |
|     if( gps_box_present_flag ) { | |
|         if( gps_gsh_box_log2_scale_present_flag ) | |
|         gsh_box_log2_scale | ue(v) |
|         gsh_box_origin_x | ue(v) |
|         gsh_box_origin_y | ue(v) |
|         gsh_box_origin_z | ue(v) |
|     } | |
|     gsh_max_node_size_log2 | ue(v) |
|     gsh_num_points | ue(v) |
|     byte_alignment( ) | |
| } | |

FIG. 31

| geometry_slice_data() { | Descriptor |
|---|---|
|   for(depth = 0; depth < MaxGeometryOctreeDepth; depth++ ) { | |
|     for(nodeIdx = 0; nodeIdx < NumNodesAtDepth[depth]; nodeIdx++ ) { | |
|       xN = NodeX[ depth ][nodeIdx] | |
|       yN = NodeY[ depth ][nodeIdx] | |
|       zN = NodeZ[ depth ][nodeIdx] | |
|       geometry_node(depth, nodeIdx, xN, yN, zN) | |
|     } | |
|   } | |
|   if(log2_trioup_node_size > 0) | |
|     geometry_trisoup_data() | |
| } | |

FIG. 32

| attribute_slice_bitstream( ) { | Descriptor |
|---|---|
| attribute_slice_header( ) | |
| attribute_slice_data() | |
| } | |

FIG. 33

| attribute_slice_header( ) { | Descriptor |
|---|---|
|     ash_attr_parameter_set_id | ue(v) |
|     ash_attr_sps_attr_idx | ue(v) |
|     ash_attr_geom_slice_id | ue(v) |
|     if ( aps_slice_qp_delta_present_flag ) { | |
|         ash_qp_delta_luma | se(v) |
|         ash_qp_delta_chroma | se(v) |
|     } | |
|     attribute_recommanded_shared_result_flag | u(1) |
|     byte_alignment( ) | |
| } | |

FIG. 34

| attribute_slice_data( ) { | Descriptor |
|---|---|
|     dimension = attribute_dimension[ ash_attr_sps_attr_idx ] | |
|     zerorun | ae(v) |
|     for( i = 0; i < pointCount; i++ ) { | |
|     if( attr_coding_type = = 0 && <br>        maxPredDiff[ i ] > lifting_adaptive_prediction_threshold && <br>        MaxNumPredictors > 1 ) { | |
|         predIndex[ i ] | ae(v) |
|     } | |
|     if( zerorun > 0 ) { | |
|         for( k = 0; k < dimension ; k++ ) | |
|             values[ k ][ i ] = 0 | |
|         zerorun − = 1 | |
|     } | |
|     else { | |
|         attribute_coding( dimension, i ) | ae(v) |
|         zerorun | ae(v) |
|     } | |
|     } | |
|     byte_alignment( ) | |
| } | |

POINT CLOUD DATA TRANSMISSION DEVICE, POINT CLOUD DATA TRANSMISSION METHOD, POINT CLOUD DATA RECEPTION DEVICE, AND POINT CLOUD DATA RECEPTION METHOD

Pursuant to 35 U.S.C. § 119(e), this application claims the benefit of earlier filing date and right of priority to U.S. Provisional Applications No. 62/910,388 filed on Oct. 3, 2019, the contents of which are hereby incorporated by reference herein in their entirety.

BACKGROUND OF THE INVENTION

Field of the Invention

Embodiments relate to a method and apparatus for processing point cloud content.

Discussion of the Related Art

Point cloud content is content represented by a point cloud, which is a set of points belonging to a coordinate system representing a three-dimensional space. The point cloud content may express media configured in three dimensions, and is used to provide various services such as virtual reality (VR), augmented reality (AR), mixed reality (MR), XR (Extended Reality), and self-driving services. However, tens of thousands to hundreds of thousands of point data are required to represent point cloud content. Therefore, there is a need for a method for efficiently processing a large amount of point data.

SUMMARY OF THE INVENTION

An object of the present disclosure devised to solve the above-described problems is to provide a point cloud data transmission device, a point cloud data transmission method, a point cloud data reception device, and a point cloud data reception method for efficiently transmitting and receiving a point cloud Another object of the present disclosure is to provide a point cloud data transmission device, a point cloud data transmission method, a point cloud data reception device, and a point cloud data reception method for addressing latency and encoding/decoding complexity Another object of the present disclosure is to provide a point cloud data transmission device, a point cloud data transmission method, a point cloud data reception device, and a point cloud data reception method for improving the compression performance of the point cloud by improving the technique of encoding attribute information of geometry-based point cloud compression (G-PCC).

Another object of the present disclosure is to provide a point cloud data transmission device, a point cloud data transmission method, a point cloud data reception device, and a point cloud data reception method for enhancing compression efficiency while supporting parallel processing of attribute information of G-PCC.

Another object of the present disclosure is to provide a point cloud data transmission device, a point cloud data transmission method, a point cloud data reception device, and a point cloud data reception method for efficiently processing encoding and decoding of fused point cloud data in which at least one point has a plurality of attributes.

Objects of the present disclosure are not limited to the aforementioned objects, and other objects of the present disclosure which are not mentioned above will become apparent to those having ordinary skill in the art upon examination of the following description.

To achieve these objects and other advantages and in accordance with the purpose of the disclosure, as embodied and broadly described herein, a method of transmitting point cloud data may include acquiring point cloud data, encoding geometry information including positions of points in the point cloud data, generating Level Of Details (LODs) based on the geometry information and searching neighbor points of each point to be attribute encoded based on the generated LODs, encoding first attribute information of each point based on the searched neighbor points, encoding second attribute information of each point based on the searched neighbor points, and transmitting the encoded geometry information, the encoded first and second attribute information and signaling information.

According to embodiments, the first attribute information is color information and the second attribute information is reflectance information.

According to embodiments, the first attribute information and the second attribute information, respectively, are encoded by sharing a result of the LOD generation and a result of the neighbor point search when a configuration for the LOD generation and a maximum number of neighbor points for the first attribute information and the second attribute information are same.

According to embodiments, encoding first attribute information may include determining a prediction mode of the first attribute information of each point based on the neighbor points, and acquiring first residual attribute information of each point by a difference between first prediction attribute information of each point predicted based on the prediction mode of each point and the first attribute information of each point.

According to embodiments, encoding second attribute information may include determining a prediction mode of the second attribute information of each point based on the neighbor points, and acquiring second residual attribute information of each point by a difference between second prediction attribute information of each point predicted based on the prediction mode of each point and the second attribute information of each point.

According to embodiments, a point cloud data transmission apparatus may include an acquisition unit to acquire point cloud data, a geometry encoder to encode geometry information including positions of points in the point cloud data, a configuration unit to generate Level Of Details (LODs) based on the geometry information and search neighbor points of each point to be attribute encoded based on the generated LODs, a first attribute encoding unit to encode first attribute information of each point based on the searched neighbor points, a second attribute encoding unit to encode second attribute information of each point based on the searched neighbor points, and a transmitter to transmit the encoded geometry information, the encoded first and second attribute information and signaling information.

According to embodiments, the first attribute information is color information and the second attribute information is reflectance information.

According to embodiments, the first attribute information and the second attribute information, respectively, are encoded by sharing a result of the LOD generation and a result of the neighbor point search when a configuration for the LOD generation and a maximum number of neighbor points for the first attribute information and the second attribute information are same.

According to embodiments, the first attribute encoding unit may include a first attribute information predictor to determine a prediction mode of the first attribute information of each point based on the neighbor points, and a first residual attribute information processor to acquire first residual attribute information of each point by a difference between first prediction attribute information of each point predicted based on the prediction mode of each point and the first attribute information of each point.

According to embodiments, the second attribute encoding unit may include a second attribute information predictor to determine a prediction mode of the second attribute information of each point based on the neighbor points, and a second residual attribute information processor to acquire second residual attribute information of each point by a difference between second prediction attribute information of each point predicted based on the prediction mode of each point and the second attribute information of each point.

According to embodiments, a point cloud data reception apparatus may include a receiver to receive geometry information, first and second attribute information, and signaling information, a geometry decoder to decode the geometry information based on the signaling information, a configuration unit to generate Level Of Details (LODs) based on the geometry information and search neighbor points of each point to be attribute decoded based on the generated LODs based on the signaling information and the geometry information, a first attribute decoding unit to decode first attribute information of each point based on the signaling information and the searched neighbor points, a second attribute decoding unit to decode second attribute information of each point based on the signaling information and the searched neighbor points, and a renderer to render point cloud data restored based on the decoded geometry information and the decoded first and second attribute information.

According to embodiments, the first attribute information is color information and the second attribute information is reflectance information.

According to embodiments, the first attribute information and the second attribute information, respectively, are decoded by sharing a result of the LOD generation and a result of the neighbor point search when a configuration for the LOD generation and a maximum number of neighbor points for the first attribute information and the second attribute information are same.

According to embodiments, the first attribute decoding unit may include a first attribute information predictor to determine a prediction mode of the first attribute information of each point based on the signaling information and the neighbor points, and a first attribute information restoring unit to restore first attribute information of each point by adding first prediction attribute information of each point predicted based on the prediction mode of each point and first residual attribute information of each point received.

According to embodiments, the second attribute decoding unit may include a second attribute information predictor to determine a prediction mode of the second attribute information of each point based on the signaling information and the neighbor points, and a second attribute information restoring unit to restore second attribute information of each point by adding second prediction attribute information of each point predicted based on the prediction mode of each point and second residual attribute information of each point received.

BRIEF DESCRIPTION OF THE DRAWINGS

The accompanying drawings, which are included to provide a further understanding of the disclosure and are incorporated in and constitute a part of this application, illustrate embodiment(s) of the disclosure and together with the description serve to explain the principle of the disclosure. In the drawings:

FIG. 6 illustrates an example of octree and occupancy code according to embodiments.

FIG. 7 illustrates an example of a neighbor node pattern according to embodiments.

FIG. 25 illustrates an embodiment of a syntax structure of a sequence parameter set according to embodiments.

FIG. 26 illustrates an embodiment of a syntax structure of a geometry parameter set according to embodiments.

FIG. 27 illustrates an embodiment of a syntax structure of an attribute parameter set according to embodiments.

FIG. 28 illustrates an embodiment of a syntax structure of a tile parameter set according to embodiments.

FIG. 29 illustrates an embodiment of a syntax structure of geometry slice bitstream( ) according to embodiments.

FIG. 30 illustrates an embodiment of a syntax structure of geometry slice header according to embodiments.

FIG. 31 illustrates an embodiment of a syntax structure of geometry slice data according to embodiments.

FIG. 32 illustrates an embodiment of a syntax structure of attribute slice bitstream( ) according to embodiments.

FIG. 33 illustrates an embodiment of a syntax structure of attribute slice header according to embodiments.

FIG. 34 illustrates an embodiment of a syntax structure of attribute slice data according to embodiments.

DETAILED DESCRIPTION OF THE INVENTION

Figure 1:
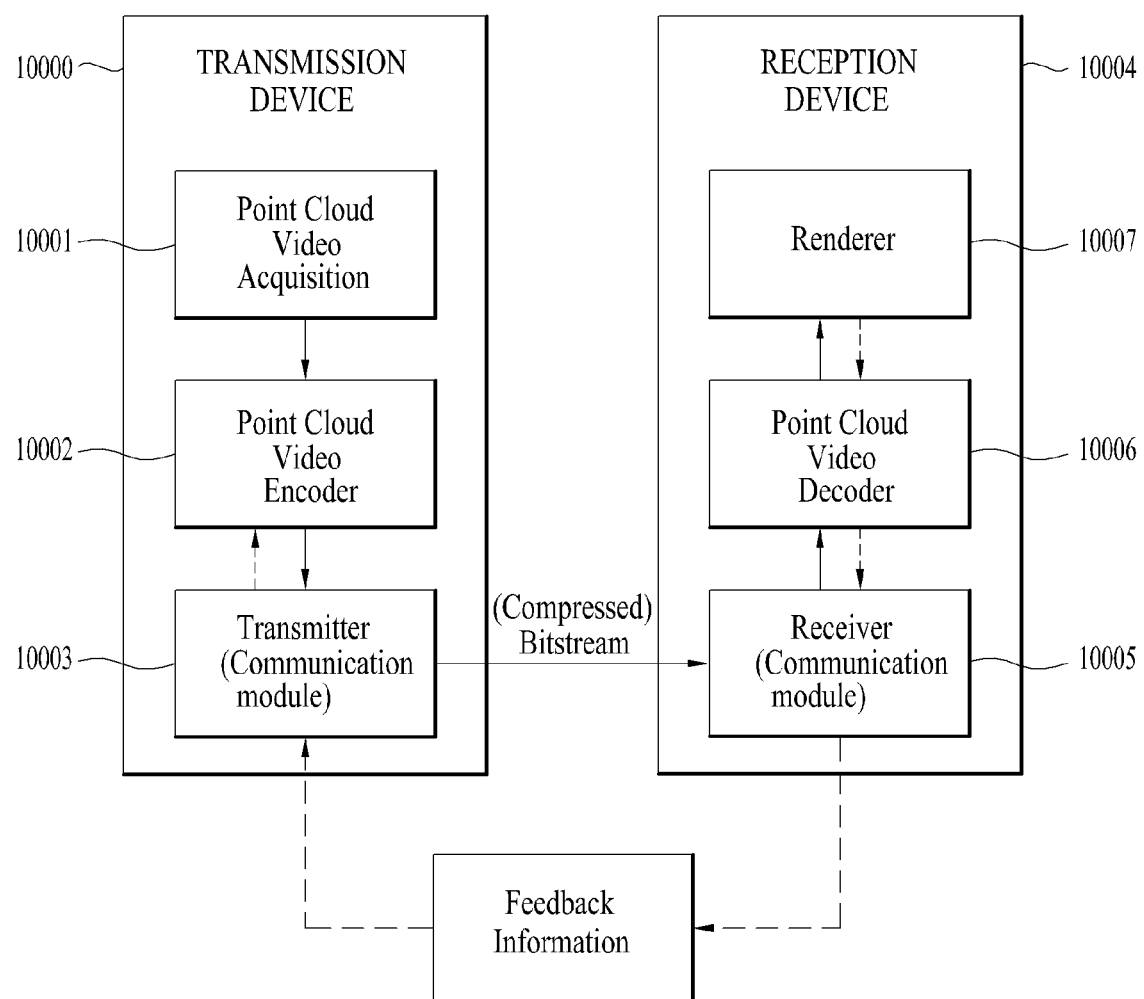
FIG. 1 illustrates an exemplary point cloud content providing system according to embodiments.

Description will now be given in detail according to exemplary embodiments disclosed herein, with reference to the accompanying drawings. For the sake of brief description with reference to the drawings, the same or equivalent components may be provided with the same reference numbers, and description thereof will not be repeated. It should be noted that the following examples are only for embodying the present disclosure and do not limit the scope of the present disclosure. What can be easily inferred by an expert in the technical field to which the present invention belongs from the detailed description and examples of the present disclosure is to be interpreted as being within the scope of the present disclosure.

The detailed description in this present specification should be construed in all aspects as illustrative and not restrictive. The scope of the disclosure should be determined by the appended claims and their legal equivalents, and all changes coming within the meaning and equivalency range of the appended claims are intended to be embraced therein.

Reference will now be made in detail to the preferred embodiments of the present disclosure, examples of which are illustrated in the accompanying drawings. The detailed description, which will be given below with reference to the accompanying drawings, is intended to explain exemplary embodiments of the present disclosure, rather than to show the only embodiments that can be implemented according to the present disclosure. The following detailed description includes specific details in order to provide a thorough understanding of the present disclosure. However, it will be apparent to those skilled in the art that the present disclosure may be practiced without such specific details. Although most terms used in this specification have been selected from general ones widely used in the art, some terms have been arbitrarily selected by the applicant and their meanings are explained in detail in the following description as needed. Thus, the present disclosure should be understood based upon the intended meanings of the terms rather than their simple names or meanings. In addition, the following drawings and detailed description should not be construed as being limited to the specifically described embodiments, but should be construed as including equivalents or substitutes of the embodiments described in the drawings and detailed description.

FIG. 1 shows an exemplary point cloud content providing system according to embodiments.

The point cloud content providing system illustrated in FIG. 1 may include a transmission device 10000 and a reception device 10004. The transmission device 10000 and the reception device 10004 are capable of wired or wireless communication to transmit and receive point cloud data.

The point cloud data transmission device 10000 according to the embodiments may secure and process point cloud video (or point cloud content) and transmit the same. According to embodiments, the transmission device 10000 may include a fixed station, a base transceiver system (BTS), a network, an artificial intelligence (AI) device and/or system, a robot, an AR/VR/XR device and/or server. According to embodiments, the transmission device 10000 may include a device, a robot, a vehicle, an AR/VR/XR device, a portable device, a home appliance, an Internet of Thing (IoT) device, and an A device/server which are configured to perform communication with a base station and/or other wireless devices using a radio access technology (e.g., 5G New RAT (NR), Long Term Evolution (LTE)).

The transmission device 10000 according to the embodiments includes a point cloud video acquisition unit 10001, a point cloud video encoder 10002, and/or a transmitter (or communication module) 10003.

The point cloud video acquisition unit 10001 according to the embodiments acquires a point cloud video through a processing process such as capture, synthesis, or generation. The point cloud video is point cloud content represented by a point cloud, which is a set of points positioned in a 3D space, and may be referred to as point cloud video data. The point cloud video according to the embodiments may include one or more frames. One frame represents a still image/picture. Therefore, the point cloud video may include a point cloud image/frame/picture, and may be referred to as a point cloud image, frame, or picture.

The point cloud video encoder 10002 according to the embodiments encodes the acquired point cloud video data. The point cloud video encoder 10002 may encode the point cloud video data based on point cloud compression coding. The point cloud compression coding according to the embodiments may include geometry-based point cloud compression (G-PCC) coding and/or video-based point cloud compression (V-PCC) coding or next-generation coding. The point cloud compression coding according to the embodiments is not limited to the above-described embodiment. The point cloud video encoder 10002 may output a bitstream containing the encoded point cloud video data. The bitstream may contain not only the encoded point cloud video data, but also signaling information related to encoding of the point cloud video data.

The transmitter 10003 according to the embodiments transmits the bitstream containing the encoded point cloud video data. The bitstream according to the embodiments is encapsulated in a file or segment (for example, a streaming segment), and is transmitted over various networks such as a broadcasting network and/or a broadband network. Although not shown in the figure, the transmission device 10000 may include an encapsulator (or an encapsulation module) configured to perform an encapsulation operation. According to embodiments, the encapsulator may be included in the transmitter 10003. According to embodiments, the file or segment may be transmitted to the reception device 10004 over a network, or stored in a digital storage medium (e.g., USB, SD, CD, DVD, Blu-ray, HDD, SSD, etc.). The transmitter 10003 according to the embodiments is capable of wired/wireless communication with the reception device 10004 (or the receiver 10005) over a network of 4G, 5G, 6G, etc. In addition, the transmitter may perform a necessary data processing operation according to the network system (e.g., a 4G, 5G or 6G communication network system). The transmission device 10000 may transmit the encapsulated data in an on-demand manner.

The reception device 10004 according to the embodiments includes a receiver 10005, a point cloud video decoder 10006, and/or a renderer 10007. According to embodiments, the reception device 10004 may include a device, a robot, a vehicle, an AR/VR/XR device, a portable device, a home appliance, an Internet of Things (IoT) device, and an AI device/server which are configured to perform communication with a base station and/or other wireless devices using a radio access technology (e.g., 5G New RAT (NR), Long Term Evolution (LTE)).

The receiver 10005 according to the embodiments receives the bitstream containing the point cloud video data or the file/segment in which the bitstream is encapsulated from the network or storage medium. The receiver 10005 may perform necessary data processing according to the network system (for example, a communication network system of 4G, 5G, 6G, etc.). The receiver 10005 according to the embodiments may decapsulate the received file/segment and output a bitstream. According to embodiments, the receiver 10005 may include a decapsulator (or a decapsulation module) configured to perform a decapsulation operation. The decapsulator may be implemented as an element (or component or module) separate from the receiver 10005.

The point cloud video decoder 10006 decodes the bitstream containing the point cloud video data. The point cloud video decoder 10006 may decode the point cloud video data according to the method by which the point cloud video data is encoded (for example, in a reverse process of the operation of the point cloud video encoder 10002). Accordingly, the point cloud video decoder 10006 may decode the point cloud video data by performing point cloud decompression coding, which is the inverse process of the point cloud compression. The point cloud decompression coding includes G-PCC coding.

The renderer 10007 renders the decoded point cloud video data. The renderer 10007 may output point cloud content by rendering not only the point cloud video data but also audio data. According to embodiments, the renderer 10007 may include a display configured to display the point cloud content. According to embodiments, the display may be implemented as a separate device or component rather than being included in the renderer 10007.

The arrows indicated by dotted lines in the drawing represent a transmission path of feedback information acquired by the reception device 10004. The feedback information is information for reflecting interactivity with a user who consumes the point cloud content, and includes information about the user (e.g., head orientation information, viewport information, and the like). In particular, when the point cloud content is content for a service (e.g., self-driving service, etc.) that requires interaction with the user, the feedback information may be provided to the content transmitting side (e.g., the transmission device 10000) and/or the service provider. According to embodiments, the feedback information may be used in the reception device 10004 as well as the transmission device 10000, or may not be provided.

The head orientation information according to embodiments is information about the user's head position, orientation, angle, motion, and the like. The reception device 10004 according to the embodiments may calculate the viewport information based on the head orientation information. The viewport information may be information about a region of a point cloud video that the user is viewing. A viewpoint is a point through which the user is viewing the point cloud video, and may refer to a center point of the viewport region. That is, the viewport is a region centered on the viewpoint, and the size and shape of the region may be determined by a field of view (FOV). Accordingly, the reception device 10004 may extract the viewport information based on a vertical or horizontal FOV supported by the device in addition to the head orientation information. Also, the reception device 10004 performs gaze analysis or the like to check the way the user consumes a point cloud, a region that the user gazes at in the point cloud video, a gaze time, and the like. According to embodiments, the reception device 10004 may transmit feedback information including the result of the gaze analysis to the transmission device 10000. The feedback information according to the embodiments may be acquired in the rendering and/or display process. The feedback information according to the embodiments may be secured by one or more sensors included in the reception device 10004. According to embodiments, the feedback information may be secured by the renderer 10007 or a separate external element (or device, component, or the like).

The dotted lines in FIG. 1 represent a process of transmitting the feedback information secured by the renderer 10007. The point cloud content providing system may process (encode/decode) point cloud data based on the feedback information. Accordingly, the point cloud video decoder 10006 may perform a decoding operation based on the feedback information. The reception device 10004 may transmit the feedback information to the transmission device 10000. The transmission device 10000 (or the point cloud video encoder 10002) may perform an encoding operation based on the feedback information. Accordingly, the point cloud content providing system may efficiently process necessary data (e.g., point cloud data corresponding to the user's head position) based on the feedback information rather than processing (encoding/decoding) the entire point cloud data, and provide point cloud content to the user.

According to embodiments, the transmission device 10000 may be called an encoder, a transmitting device, a transmitter, a transmission system, or the like, and the reception device 10004 may be called a decoder, a receiving device, a receiver, a reception system, or the like.

The point cloud data processed in the point cloud content providing system of FIG. 1 according to embodiments (through a series of processes of acquisition/encoding/transmission/decoding/rendering) may be referred to as point cloud content data or point cloud video data. According to embodiments, the point cloud content data may be used as a concept covering metadata or signaling information related to the point cloud data.

The elements of the point cloud content providing system illustrated in FIG. 1 may be implemented by hardware, software, a processor, and/or a combination thereof.

Figure 2:
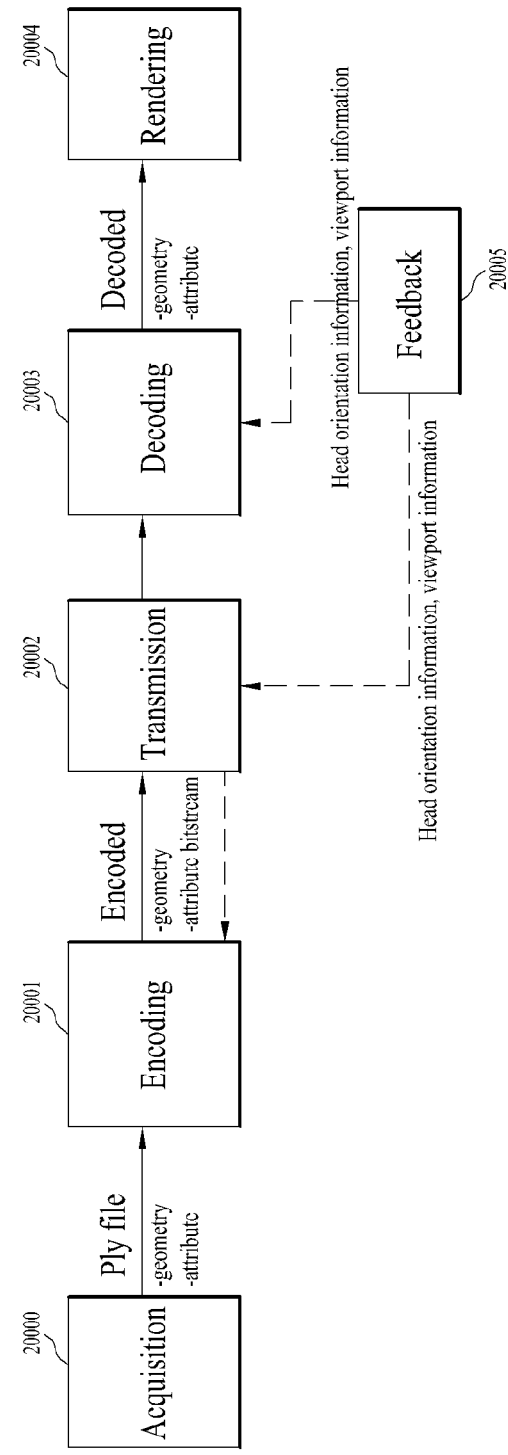
FIG. 2 is a block diagram illustrating a point cloud content providing operation according to embodiments.

FIG. 2 is a block diagram illustrating a point cloud content providing operation according to embodiments.

The block diagram of FIG. 2 shows the operation of the point cloud content providing system described in FIG. 1. As described above, the point cloud content providing system may process point cloud data based on point cloud compression coding (e.g., G-PCC).

The point cloud content providing system according to the embodiments (for example, the point cloud transmission device 10000 or the point cloud video acquisition unit 10001) may acquire a point cloud video (20000). The point cloud video is represented by a point cloud belonging to a coordinate system for expressing a 3D space. The point cloud video according to the embodiments may include a Ply (Polygon File format or the Stanford Triangle format) file. When the point cloud video has one or more frames, the acquired point cloud video may include one or more Ply files. The Ply files contain point cloud data, such as point geometry and/or attributes. The geometry includes positions of points. The position of each point may be represented by parameters (for example, values of the X, Y, and Z axes) representing a three-dimensional coordinate system (e.g., a coordinate system composed of X, Y and Z axes). The attributes include attributes of points (e.g., information about texture, color (in YCbCr or RGB), reflectance r, transparency, etc. of each point). A point has one or more attributes. For example, a point may have an attribute that is a color, or two attributes that are color and reflectance.

According to embodiments, the geometry may be called positions, geometry information, geometry data, or the like, and the attribute may be called attributes, attribute information, attribute data, or the like.

The point cloud content providing system (for example, the point cloud transmission device 10000 or the point cloud video acquisition unit 10001) may secure point cloud data from information (e.g., depth information, color information, etc.) related to the acquisition process of the point cloud video.

The point cloud content providing system (for example, the transmission device 10000 or the point cloud video encoder 10002) according to the embodiments may encode the point cloud data (20001). The point cloud content providing system may encode the point cloud data based on point cloud compression coding. As described above, the point cloud data may include the geometry and attributes of a point. Accordingly, the point cloud content providing system may perform geometry encoding of encoding the geometry and output a geometry bitstream. The point cloud content providing system may perform attribute encoding of encoding attributes and output an attribute bitstream. According to embodiments, the point cloud content providing system may perform the attribute encoding based on the geometry encoding. The geometry bitstream and the attribute bitstream according to the embodiments may be multiplexed and output as one bitstream. The bitstream according to the embodiments may further contain signaling information related to the geometry encoding and attribute encoding.

The point cloud content providing system (for example, the transmission device 10000 or the transmitter 10003) according to the embodiments may transmit the encoded point cloud data (20002). As illustrated in FIG. 1, the encoded point cloud data may be represented by a geometry bitstream and an attribute bitstream. In addition, the encoded point cloud data may be transmitted in the form of a bitstream together with signaling information related to encoding of the point cloud data (for example, signaling information related to the geometry encoding and the attribute encoding). The point cloud content providing system may encapsulate a bitstream that carries the encoded point cloud data and transmit the same in the form of a file or segment.

The point cloud content providing system (for example, the reception device 10004 or the receiver 10005) according to the embodiments may receive the bitstream containing the encoded point cloud data. In addition, the point cloud content providing system (for example, the reception device 10004 or the receiver 10005) may demultiplex the bitstream.

The point cloud content providing system (e.g., the reception device 10004 or the point cloud video decoder 10005) may decode the encoded point cloud data (e.g., the geometry bitstream, the attribute bitstream) transmitted in the bitstream. The point cloud content providing system (for example, the reception device 10004 or the point cloud video decoder 10005) may decode the point cloud video data based on the signaling information related to encoding of the point cloud video data contained in the bitstream. The point cloud content providing system (for example, the reception device 10004 or the point cloud video decoder 10005) may decode the geometry bitstream to reconstruct the positions (geometry) of points. The point cloud content providing system may reconstruct the attributes of the points by decoding the attribute bitstream based on the reconstructed geometry. The point cloud content providing system (for example, the reception device 10004 or the point cloud video decoder 10005) may reconstruct the point cloud video based on the positions according to the reconstructed geometry and the decoded attributes.

The point cloud content providing system according to the embodiments (for example, the reception device 10004 or the renderer 10007) may render the decoded point cloud data (20004). The point cloud content providing system (for example, the reception device 10004 or the renderer 10007) may render the geometry and attributes decoded through the decoding process, using various rendering methods. Points in the point cloud content may be rendered to a vertex having a certain thickness, a cube having a specific minimum size centered on the corresponding vertex position, or a circle centered on the corresponding vertex position. All or part of the rendered point cloud content is provided to the user through a display (e.g., a VR/AR display, a general display, etc.).

The point cloud content providing system (for example, the reception device 10004) according to the embodiments may secure feedback information (20005). The point cloud content providing system may encode and/or decode point cloud data based on the feedback information. The feedback information and the operation of the point cloud content providing system according to the embodiments are the same as the feedback information and the operation described with reference to FIG. 1, and thus detailed description thereof is omitted.

Figure 3:
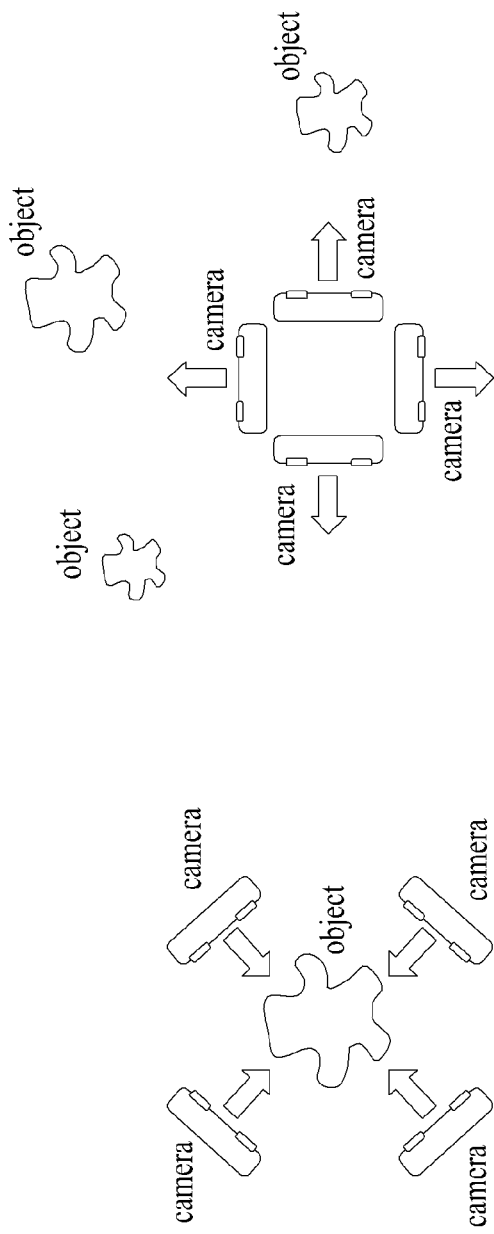
FIG. 3 illustrates an exemplary process of capturing a point cloud video according to embodiments.

FIG. 3 illustrates an exemplary process of capturing a point cloud video according to embodiments.

FIG. 3 illustrates an exemplary point cloud video capture process of the point cloud content providing system described with reference to FIGS. 1 to 2.

Point cloud content includes a point cloud video (images and/or videos) representing an object and/or environment located in various 3D spaces (e.g., a 3D space representing a real environment, a 3D space representing a virtual environment, etc.). Accordingly, the point cloud content providing system according to the embodiments may capture a point cloud video using one or more cameras (e.g., an infrared camera capable of securing depth information, an RGB camera capable of extracting color information corresponding to the depth information, etc.), a projector (e.g., an infrared pattern projector to secure depth information), a LiDAR, or the like. The point cloud content providing system according to the embodiments may extract the shape of geometry composed of points in a 3D space from the depth information and extract the attributes of each point from the color information to secure point cloud data. An image and/or video according to the embodiments may be captured based on at least one of the inward-facing technique and the outward-facing technique.

The left part of FIG. 3 illustrates the inward-facing technique. The inward-facing technique refers to a technique of capturing images a central object with one or more cameras (or camera sensors) positioned around the central object. The inward-facing technique may be used to generate point cloud content providing a 360-degree image of a key object to the user (e.g., VR/AR content providing a 360-degree image of an object (e.g., a key object such as a character, player, object, or actor) to the user).

The right part of FIG. 3 illustrates the outward-facing technique. The outward-facing technique refers to a technique of capturing images an environment of a central object rather than the central object with one or more cameras (or camera sensors) positioned around the central object. The outward-facing technique may be used to generate point cloud content for providing a surrounding environment that appears from the user's point of view (e.g., content representing an external environment that may be provided to a user of a self-driving vehicle).

As shown in FIG. 3, the point cloud content may be generated based on the capturing operation of one or more cameras. In this case, the coordinate system may differ among the cameras, and accordingly the point cloud content providing system may calibrate one or more cameras to set a global coordinate system before the capturing operation. In addition, the point cloud content providing system may generate point cloud content by synthesizing an arbitrary image and/or video with an image and/or video captured by the above-described capture technique. The point cloud content providing system may not perform the capturing operation described in FIG. 3 when it generates point cloud content representing a virtual space. The point cloud content providing system according to the embodiments may perform post-processing on the captured image and/or video. In other words, the point cloud content providing system may remove an unwanted area (for example, a background), recognize a space to which the captured images and/or videos are connected, and, when there is a spatial hole, perform an operation of filling the spatial hole.

The point cloud content providing system may generate one piece of point cloud content by performing coordinate transformation on points of the point cloud video secured from each camera. The point cloud content providing system may perform coordinate transformation on the points based on the coordinates of the position of each camera. Accordingly, the point cloud content providing system may generate content representing one wide range, or may generate point cloud content having a high density of points.

Figure 4:
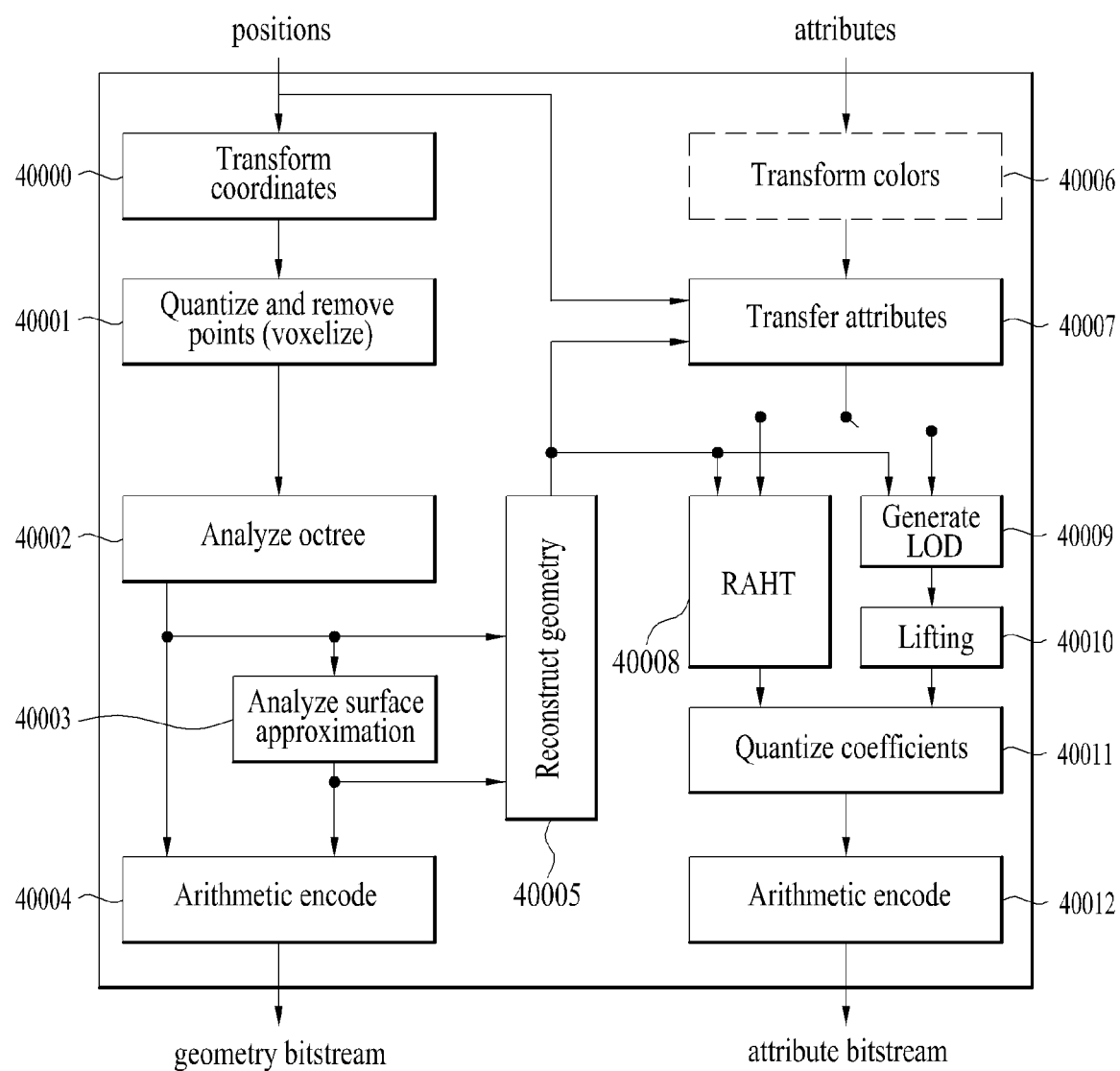
FIG. 4 illustrates an exemplary block diagram of point cloud video encoder according to embodiments.

FIG. 4 illustrates an exemplary point cloud video encoder according to embodiments.

FIG. 4 shows an example of the point cloud video encoder 10002 of FIG. 1. The point cloud video encoder reconstructs and encodes point cloud data (e.g., positions and/or attributes of the points) to adjust the quality of the point cloud content (to, for example, lossless, lossy, or near-lossless) according to the network condition or applications. When the overall size of the point cloud content is large (e.g., point cloud content of 60 Gbps is given for 30 fps), the point cloud content providing system may fail to stream the content in real time. Accordingly, the point cloud content providing system may reconstruct the point cloud content based on the maximum target bitrate to provide the same in accordance with the network environment or the like.

As described with reference to FIGS. 1 to 2, the point cloud video encoder may perform geometry encoding and attribute encoding. The geometry encoding is performed before the attribute encoding.

The point cloud video encoder according to the embodiments includes a coordinate transformer (Transform coordinates) 40000, a quantizer (Quantize and remove points (voxelize)) 40001, an octree analyzer (Analyze octree) 40002, and a surface approximation analyzer (Analyze surface approximation) 40003, an arithmetic encoder (Arithmetic encode) 40004, a geometric reconstructor (Reconstruct geometry) 40005, a color transformer (Transform colors) 40006, an attribute transformer (Transform attributes) 40007, a RAHT transformer (RAHT) 40008, an LOD generator (Generate LOD) 40009, a lifting transformer (Lifting) 40010, a coefficient quantizer (Quantize coefficients) 40011, and/or an arithmetic encoder (Arithmetic encode) 40012.

The coordinate transformer 40000, the quantizer 40001, the octree analyzer 40002, the surface approximation analyzer 40003, the arithmetic encoder 40004, and the geometry reconstructor 40005 may perform geometry encoding. The geometry encoding according to the embodiments may include octree geometry coding, direct coding, trisoup geometry encoding, and entropy encoding. The direct coding and trisoup geometry encoding are applied selectively or in combination. The geometry encoding is not limited to the above-described example.

As shown in the figure, the coordinate transformer 40000 according to the embodiments receives positions and transforms the same into coordinates. For example, the positions may be transformed into position information in a three-dimensional space (for example, a three-dimensional space represented by an XYZ coordinate system). The position information in the three-dimensional space according to the embodiments may be referred to as geometry information.

The quantizer 40001 according to the embodiments quantizes the geometry information. For example, the quantizer 40001 may quantize the points based on a minimum position value of all points (for example, a minimum value on each of the X, Y, and Z axes). The quantizer 40001 performs a quantization operation of multiplying the difference between the minimum position value and the position value of each point by a preset quantization scale value and then finding the nearest integer value by rounding the value obtained through the multiplication. Thus, one or more points may have the same quantized position (or position value). The quantizer 40001 according to the embodiments performs voxelization based on the quantized positions to reconstruct quantized points. The voxelization means a minimum unit representing position information in 3D spacePoints of point cloud content (or 3D point cloud video) according to the embodiments may be included in one or more voxels. The term voxel, which is a compound of volume and pixel, refers to a 3D cubic space generated when a 3D space is divided into units (unit=1.0) based on the axes representing the 3D space (e.g., X-axis, Y-axis, and Z-axis). The quantizer 40001 may match groups of points in the 3D space with voxels. According to embodiments, one voxel may include only one point. According to embodiments, one voxel may include one or more points. In order to express one voxel as one point, the position of the center point of a voxel may be set based on the positions of one or more points included in the voxel. In this case, attributes of all positions included in one voxel may be combined and assigned to the voxel.

The octree analyzer 40002 according to the embodiments performs octree geometry coding (or octree coding) to present voxels in an octree structure. The octree structure represents points matched with voxels, based on the octal tree structure.

The surface approximation analyzer 40003 according to the embodiments may analyze and approximate the octree. The octree analysis and approximation according to the embodiments is a process of analyzing a region containing a plurality of points to efficiently provide octree and voxelization.

The arithmetic encoder 40004 according to the embodiments performs entropy encoding on the octree and/or the approximated octree. For example, the encoding scheme includes arithmetic encoding. As a result of the encoding, a geometry bitstream is generated.

The color transformer 40006, the attribute transformer 40007, the RAHT transformer 40008, the LOD generator 40009, the lifting transformer 40010, the coefficient quantizer 40011, and/or the arithmetic encoder 40012 perform attribute encoding. As described above, one point may have one or more attributes. The attribute encoding according to the embodiments is equally applied to the attributes that one point has. However, when an attribute (e.g., color) includes one or more elements, attribute encoding is independently applied to each element. The attribute encoding according to the embodiments includes color transform coding, attribute transform coding, region adaptive hierarchical transform (RAHT) coding, interpolation-based hierarchical nearest-neighbor prediction (prediction transform) coding, and interpolation-based hierarchical nearest-neighbor prediction with an update/lifting step (lifting transform) coding. Depending on the point cloud content, the RAHT coding, the prediction transform coding and the lifting transform coding described above may be selectively used, or a combination of one or more of the coding schemes may be used. The attribute encoding according to the embodiments is not limited to the above-described example.

The color transformer 40006 according to the embodiments performs color transform coding of transforming color values (or textures) included in the attributes. For example, the color transformer 40006 may transform the format of color information (for example, from RGB to YCbCr). The operation of the color transformer 40006 according to embodiments may be optionally applied according to the color values included in the attributes.

The geometry reconstructor 40005 according to the embodiments reconstructs (decompresses) the octree and/or the approximated octree. The geometry reconstructor 40005 reconstructs the octree/voxels based on the result of analyzing the distribution of points. The reconstructed octree/voxels may be referred to as reconstructed geometry (restored geometry).

The attribute transformer 40007 according to the embodiments performs attribute transformation to transform the attributes based on the reconstructed geometry and/or the positions on which geometry encoding is not performed. As described above, since the attributes are dependent on the geometry, the attribute transformer 40007 may transform the attributes based on the reconstructed geometry information. For example, based on the position value of a point included in a voxel, the attribute transformer 40007 may transform the attribute of the point at the position. As described above, when the position of the center of a voxel is set based on the positions of one or more points included in the voxel, the attribute transformer 40007 transforms the attributes of the one or more points. When the trisoup geometry encoding is performed, the attribute transformer 40007 may transform the attributes based on the trisoup geometry encoding.

The attribute transformer 40007 may perform the attribute transformation by calculating the average of attributes or attribute values of neighboring points (e.g., color or reflectance of each point) within a specific position/radius from the position (or position value) of the center of each voxel. The attribute transformer 40007 may apply a weight according to the distance from the center to each point in calculating the average. Accordingly, each voxel has a position and a calculated attribute (or attribute value).

The attribute transformer 40007 may search for neighboring points existing within a specific position/radius from the position of the center of each voxel based on the K-D tree or the Morton code. The K-D tree is a binary search tree and supports a data structure capable of managing points based on the positions such that nearest neighbor search (NNS) can be performed quickly. The Morton code is generated by presenting coordinates (e.g., (x, y, z)) representing 3D positions of all points as bit values and mixing the bits. For example, when the coordinates representing the position of a point are (5, 9, 1), the bit values for the coordinates are (0101, 1001, 0001). Mixing the bit values according to the bit index in order of z, y, and x yields 010001000111. This value is expressed as a decimal number of 1095. That is, the Morton code value of the point having coordinates (5, 9, 1) is 1095. The attribute transformer 40007 may order the points based on the Morton code values and perform NNS through a depth-first traversal process. After the attribute transformation operation, the K-D tree or the Morton code is used when the NNS is needed in another transformation process for attribute coding.

As shown in the figure, the transformed attributes are input to the RAHT transformer 40008 and/or the LOD generator 40009.

The RAHT transformer 40008 according to the embodiments performs RAHT coding for predicting attribute information based on the reconstructed geometry information. For example, the RAHT transformer 40008 may predict attribute information of a node at a higher level in the octree based on the attribute information associated with a node at a lower level in the octree.

The LOD generator 40009 according to the embodiments generates a level of detail (LOD). The LOD according to the embodiments is a degree of detail of point cloud content. As the LOD value decrease, it indicates that the detail of the point cloud content is degraded. As the LOD value increases, it indicates that the detail of the point cloud content is enhanced. Points may be classified by the LOD.

The lifting transformer 40010 according to the embodiments performs lifting transform coding of transforming the attributes a point cloud based on weights. As described above, lifting transform coding may be optionally applied.

The coefficient quantizer 40011 according to the embodiments quantizes the attribute-coded attributes based on coefficients.

The arithmetic encoder 40012 according to the embodiments encodes the quantized attributes based on arithmetic coding.

Although not shown in the figure, the elements of the point cloud video encoder of FIG. 4 may be implemented by hardware including one or more processors or integrated circuits configured to communicate with one or more memories included in the point cloud content providing apparatus, software, firmware, or a combination thereof. The one or more processors may perform at least one of the operations and/or functions of the elements of the point cloud video encoder of FIG. 4 described above. Additionally, the one or more processors may operate or execute a set of software programs and/or instructions for performing the operations and/or functions of the elements of the point cloud video encoder of FIG. 4. The one or more memories according to the embodiments may include a high speed random access memory, or include a non-volatile memory (e.g., one or more magnetic disk storage devices, flash memory devices, or other non-volatile solid-state memory devices).

Figure 5:
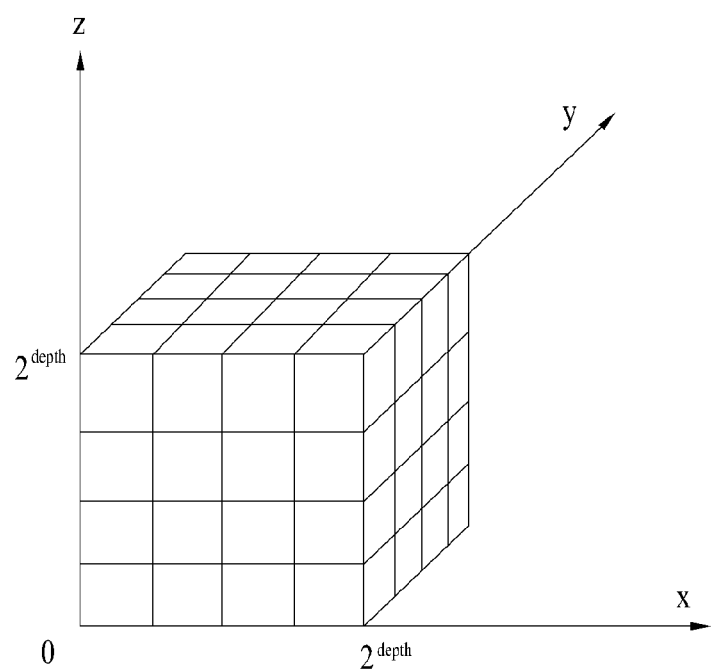
FIG. 5 illustrates an example of voxels in a 3D space according to embodiments.

FIG. 5 shows an example of voxels according to embodiments.

FIG. 5 shows voxels positioned in a 3D space represented by a coordinate system composed of three axes, which are the X-axis, the Y-axis, and the Z-axis. As described with reference to FIG. 4, the point cloud video encoder (e.g., the quantizer 40001) may perform voxelization. Voxel refers to a 3D cubic space generated when a 3D space is divided into units (unit=1.0) based on the axes representing the 3D space (e.g., X-axis, Y-axis, and Z-axis). FIG. 5 shows an example of voxels generated through an octree structure in which a cubical axis-aligned bounding box defined by two poles (0, 0, 0) and ($2^d$, $2^d$, $2^d$) is recursively subdivided. One voxel includes at least one point. The spatial coordinates of a voxel may be estimated from the positional relationship with a voxel group. As described above, a voxel has an attribute (such as color or reflectance) like pixels of a 2D image/video. The details of the voxel are the same as those described with reference to FIG. 4, and therefore a description thereof is omitted.

FIG. 6 shows an example of an octree and occupancy code according to embodiments.

As described with reference to FIGS. 1 to 4, the point cloud content providing system (point cloud video encoder 10002) or the octree analyzer 40002 of the point cloud video encoder performs octree geometry coding (or octree coding) based on an octree structure to efficiently manage the region and/or position of the voxel.

The upper part of FIG. 6 shows an octree structure. The 3D space of the point cloud content according to the embodiments is represented by axes (e.g., X-axis, Y-axis, and Z-axis) of the coordinate system. The octree structure is created by recursive subdividing of a cubical axis-aligned bounding box defined by two poles (0, 0, 0) and ($2^d$, $2^d$, $2^d$). Here, $2^d$ may be set to a value constituting the smallest bounding box surrounding all points of the point cloud content (or point cloud video). Here, d denotes the depth of the octree. The value of d is determined in Equation 1. In Equation 1, ($x_n^{int}$, $y_n^{int}$, $z_n^{int}$) denotes the positions (or position values) of quantized points.

$$d = \text{Ceil}(\text{Log } 2(\text{Max}(x_n^{int}, y_n^{int}, z_n^{int}, n=1, \ldots, N)+1)) \quad \text{Equation 1}$$

As shown in the middle of the upper part of FIG. 6, the entire 3D space may be divided into eight spaces according to partition. Each divided space is represented by a cube with six faces. As shown in the upper right of FIG. 6, each of the eight spaces is divided again based on the axes of the coordinate system (e.g., X-axis, Y-axis, and Z-axis). Accordingly, each space is divided into eight smaller spaces. The divided smaller space is also represented by a cube with six faces. This partitioning scheme is applied until the leaf node of the octree becomes a voxel.

The lower part of FIG. 6 shows an octree occupancy code. The occupancy code of the octree is generated to indicate whether each of the eight divided spaces generated by dividing one space contains at least one point. Accordingly, a single occupancy code is represented by eight child nodes. Each child node represents the occupancy of a divided space, and the child node has a value in 1 bit. Accordingly, the occupancy code is represented as an 8-bit code. That is, when at least one point is contained in the space corresponding to a child node, the node is assigned a value of 1. When no point is contained in the space corresponding to the child node (the space is empty), the node is assigned a value of 0. Since the occupancy code shown in FIG. 6 is 00100001, it indicates that the spaces corresponding to the third child node and the eighth child node among the eight child nodes each contain at least one point. As shown in the figure, each of the third child node and the eighth child node has eight child nodes, and the child nodes are represented by an 8-bit occupancy code. The figure shows that the occupancy code of the third child node is 10000111, and the occupancy code of the eighth child node is 01001111. The point cloud video encoder (for example, the arithmetic encoder 40004) according to the embodiments may perform entropy encoding on the occupancy codes. In order to increase the compression efficiency, the point cloud video encoder may perform intra/inter-coding on the occupancy codes. The reception device (for example, the reception device 10004 or the point cloud video decoder 10006) according to the embodiments reconstructs the octree based on the occupancy codes.

The point cloud video encoder (for example, the octree analyzer 40002) according to the embodiments may perform voxelization and octree coding to store the positions of points. However, points are not always evenly distributed in the 3D space, and accordingly there may be a specific region in which fewer points are present. Accordingly, it is inefficient to perform voxelization for the entire 3D space. For example, when a specific region contains few points, voxelization does not need to be performed in the specific region.

Accordingly, for the above-described specific region (or a node other than the leaf node of the octree), the point cloud video encoder according to the embodiments may skip voxelization and perform direct coding to directly code the positions of points included in the specific region. The coordinates of a direct coding point according to the embodiments are referred to as direct coding mode (DCM). The point cloud video encoder according to the embodiments may also perform trisoup geometry encoding, which is to reconstruct the positions of the points in the specific region (or node) based on voxels, based on a surface model. The trisoup geometry encoding is geometry encoding that represents an object as a series of triangular meshes. Accordingly, the point cloud video decoder may generate a point cloud from the mesh surface. The direct coding and trisoup geometry encoding according to the embodiments may be selectively performed. In addition, the direct coding and trisoup geometry encoding according to the embodiments may be performed in combination with octree geometry coding (or octree coding).

To perform direct coding, the option to use the direct mode for applying direct coding should be activated. A node to which direct coding is to be applied is not a leaf node, and points less than a threshold should be present within a specific node. In addition, the total number of points to which direct coding is to be applied should not exceed a preset threshold. When the conditions above are satisfied, the point cloud video encoder (or the arithmetic encoder 40004) according to the embodiments may perform entropy coding on the positions (or position values) of the points.

The point cloud video encoder (for example, the surface approximation analyzer 40003) according to the embodiments may determine a specific level of the octree (a level less than the depth d of the octree), and the surface model may be used staring with that level to perform trisoup geometry encoding to reconstruct the positions of points in the region of the node based on voxels (Trisoup mode). The point cloud video encoder according to the embodiments may specify a level at which trisoup geometry encoding is to be applied. For example, when the specific level is equal to the depth of the octree, the point cloud video encoder does not operate in the trisoup mode. In other words, the point cloud video encoder according to the embodiments may operate in the trisoup mode only when the specified level is less than the value of depth of the octree. The 3D cube region of the nodes at the specified level according to the embodiments is called a block. One block may include one or more voxels. The block or voxel may correspond to a brick. Geometry is represented as a surface within each block. The surface according to embodiments may intersect with each edge of a block at most once.

One block has 12 edges, and accordingly there are at least 12 intersections in one block. Each intersection is called a vertex (or apex). A vertex present along an edge is detected when there is at least one occupied voxel adjacent to the edge among all blocks sharing the edge. The occupied voxel according to the embodiments refers to a voxel containing a point. The position of the vertex detected along the edge is the average position along the edge of all voxels adjacent to the edge among all blocks sharing the edge.

Once the vertex is detected, the point cloud video encoder according to the embodiments may perform entropy encoding on the starting point (x, y, z) of the edge, the direction vector ($\Delta x$, $\Delta y$, $\Delta z$) of the edge, and the vertex position value (relative position value within the edge). When the trisoup geometry encoding is applied, the point cloud video encoder according to the embodiments (for example, the geometry reconstructor 40005) may generate restored geometry (reconstructed geometry) by performing the triangle reconstruction, up-sampling, and voxelization processes.

The vertices positioned at the edge of the block determine a surface that passes through the block. The surface according to the embodiments is a non-planar polygon. In the triangle reconstruction process, a surface represented by a triangle is reconstructed based on the starting point of the edge, the direction vector of the edge, and the position values of the vertices. The triangle reconstruction process is performed according to Equation 2 by: i) calculating the centroid value of each vertex, ii) subtracting the center value from each vertex value, and iii) estimating the sum of the squares of the values obtained by the subtraction.

$$\text{①}\begin{bmatrix}\mu_x\\\mu_y\\\mu_z\end{bmatrix} = \frac{1}{n}\sum_{i=1}^{n}\begin{bmatrix}x_i\\y_i\\z_i\end{bmatrix} \text{②} \begin{bmatrix}\bar{x}_i\\\bar{y}_i\\\bar{z}_i\end{bmatrix} = \begin{bmatrix}x_i\\y_i\\z_i\end{bmatrix} - \begin{bmatrix}\mu_x\\\mu_y\\\mu_z\end{bmatrix} \text{③}\begin{bmatrix}\sigma_x^2\\\sigma_y^2\\\sigma_z^2\end{bmatrix} = \sum_{i=1}^{n}\begin{bmatrix}\bar{x}_i^2\\\bar{y}_i^2\\\bar{z}_i^2\end{bmatrix} \quad \text{Equation 2}$$

Then, the minimum value of the sum is estimated, and the projection process is performed according to the axis with the minimum value. For example, when the element x is the minimum, each vertex is projected on the x-axis with respect to the center of the block, and projected on the (y, z) plane. When the values obtained through projection on the (y, z) plane are (ai, bi), the value of θ is estimated through a tan 2(bi, ai), and the vertices are ordered based on the value of θ. The table 1 below shows a combination of vertices for creating a triangle according to the number of the vertices. The vertices are ordered from 1 to n. The table 1 below shows that for four vertices, two triangles may be constructed according to combinations of vertices. The first triangle may consist of vertices 1, 2, and 3 among the ordered vertices, and the second triangle may consist of vertices 3, 4, and 1 among the ordered vertices.

TABLE 1

| n | Triangles formed from vertices ordered 1, . . . , n |
|---|---|
| 3 | (1, 2, 3) |
| 4 | (1, 2, 3), (3, 4, 1) |
| 5 | (1, 2, 3), (3, 4, 5), (5, 1, 3) |
| 6 | (1, 2, 3), (3, 4, 5), (5, 6, 1), (1, 3, 5) |
| 7 | (1, 2, 3), (3, 4, 5), (5, 6, 7), (7, 1, 3), (3, 5, 7) |
| 8 | (1, 2, 3), (3, 4, 5), (5, 6, 7), (7, 8, 1), (1, 3, 5), (5, 7, 1) |
| 9 | (1, 2, 3), (3, 4, 5), (5, 6, 7), (7, 8, 9), (9, 1, 3), (3, 5, 7), (7, 9, 3) |
| 10 | (1, 2, 3), (3, 4, 5), (5, 6, 7), (7, 8, 9), (9, 10, 1), (1, 3, 5), (5, 7, 9), (9, 1, 5) |
| 11 | (1, 2, 3), (3, 4, 5), (5, 6, 7), (7, 8, 9), (9, 10, 11), (11, 1, 3), (3, 5, 7), (7, 9, 11), (11, 3, 7) |
| 12 | (1, 2, 3), (3, 4, 5), (5, 6, 7), (7, 8, 9), (9, 10, 11), (11, 12, 1), (1, 3, 5), (5, 7, 9), (9, 11, 1), (1, 5, 9) |

The upsampling process is performed to add points in the middle along the edge of the triangle and perform voxelization. The added points are generated based on the upsampling factor and the width of the block. The added points are called refined vertices. The point cloud video encoder according to the embodiments may voxelize the refined vertices. In addition, the point cloud video encoder may perform attribute encoding based on the voxelized positions (or position values).

FIG. 7 shows an example of a neighbor node pattern according to embodiments.

In order to increase the compression efficiency of the point cloud video, the point cloud video encoder according to the embodiments may perform entropy coding based on context adaptive arithmetic coding.

As described with reference to FIGS. 1 to 6, the point cloud content providing system or the point cloud video encoder 10002 of FIG. 1, or the point cloud video encoder or arithmetic encoder 40004 of FIG. 4 may perform entropy coding on the occupancy code immediately. In addition, the point cloud content providing system or the point cloud video encoder may perform entropy encoding (intra encoding) based on the occupancy code of the current node and the occupancy of neighboring nodes, or perform entropy encoding (inter encoding) based on the occupancy code of the previous frame. A frame according to embodiments represents a set of point cloud videos generated at the same time. The compression efficiency of intra encoding/inter encoding according to the embodiments may depend on the number of neighboring nodes that are referenced. When the bits increase, the operation becomes complicated, but the encoding may be biased to one side, which may increase the compression efficiency. For example, when a 3-bit context is given, coding needs to be performed using $2^3=8$ methods. The part divided for coding affects the complexity of implementation. Accordingly, it is necessary to meet an appropriate level of compression efficiency and complexity.

FIG. 7 illustrates a process of obtaining an occupancy pattern based on the occupancy of neighbor nodes. The point cloud video encoder according to the embodiments determines occupancy of neighbor nodes of each node of the octree and obtains a value of a neighbor pattern. The neighbor node pattern is used to infer the occupancy pattern of the node. The up part of FIG. 7 shows a cube corresponding to a node (a cube positioned in the middle) and six cubes (neighbor nodes) sharing at least one face with the cube. The nodes shown in the figure are nodes of the same depth. The numbers shown in the figure represent weights (1, 2, 4, 8, 16, and 32) associated with the six nodes, respectively. The weights are assigned sequentially according to the positions of neighboring nodes.

The down part of FIG. 7 shows neighbor node pattern values. A neighbor node pattern value is the sum of values multiplied by the weight of an occupied neighbor node (a neighbor node having a point). Accordingly, the neighbor node pattern values are 0 to 63. When the neighbor node pattern value is 0, it indicates that there is no node having a point (no occupied node) among the neighbor nodes of the node. When the neighbor node pattern value is 63, it indicates that all neighbor nodes are occupied nodes. As shown in the figure, since neighbor nodes to which weights 1, 2, 4, and 8 are assigned are occupied nodes, the neighbor node pattern value is 15, the sum of 1, 2, 4, and 8. The point cloud video encoder may perform coding according to the neighbor node pattern value (for example, when the neighbor node pattern value is 63, 64 kinds of coding may be performed). According to embodiments, the point cloud video encoder may reduce coding complexity by changing a neighbor node pattern value (for example, based on a table by which 64 is changed to 10 or 6).

Figure 8:
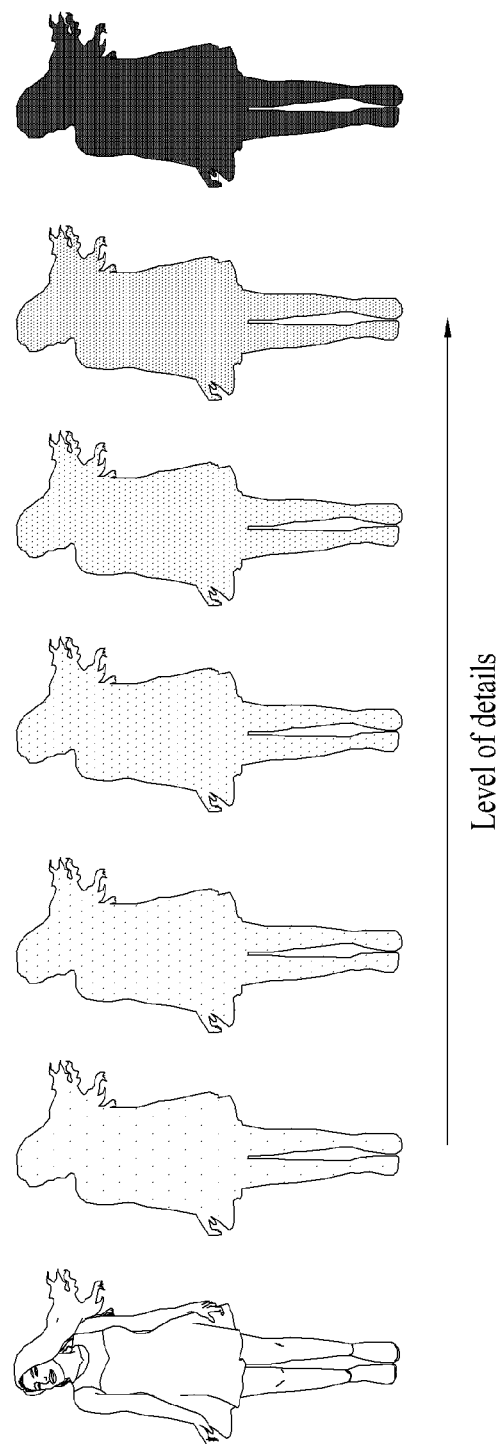
FIG. 8 illustrates an example of point configuration of a point cloud content for each LOD according to embodiments.

FIG. 8 illustrates an example of point configuration in each LOD according to embodiments.

As described with reference to FIGS. 1 to 7, encoded geometry is reconstructed (decompressed) before attribute encoding is performed. When direct coding is applied, the geometry reconstruction operation may include changing the placement of direct coded points (e.g., placing the direct coded points in front of the point cloud data). When trisoup geometry encoding is applied, the geometry reconstruction process is performed through triangle reconstruction, up-sampling, and voxelization. Since the attribute depends on the geometry, attribute encoding is performed based on the reconstructed geometry.

The point cloud video encoder (for example, the LOD generator 40009) may classify (reorganize or group) points by LOD. FIG. 8 shows the point cloud content corresponding to LODs. The leftmost picture in FIG. 8 represents original point cloud content. The second picture from the left of FIG. 8 represents distribution of the points in the lowest LOD, and the rightmost picture in FIG. 8 represents distribution of the points in the highest LOD. That is, the points in the lowest LOD are sparsely distributed, and the points in the highest LOD are densely distributed. That is, as the LOD rises in the direction pointed by the arrow indicated at the bottom of FIG. 8, the space (or distance) between points is narrowed.

Figure 9:
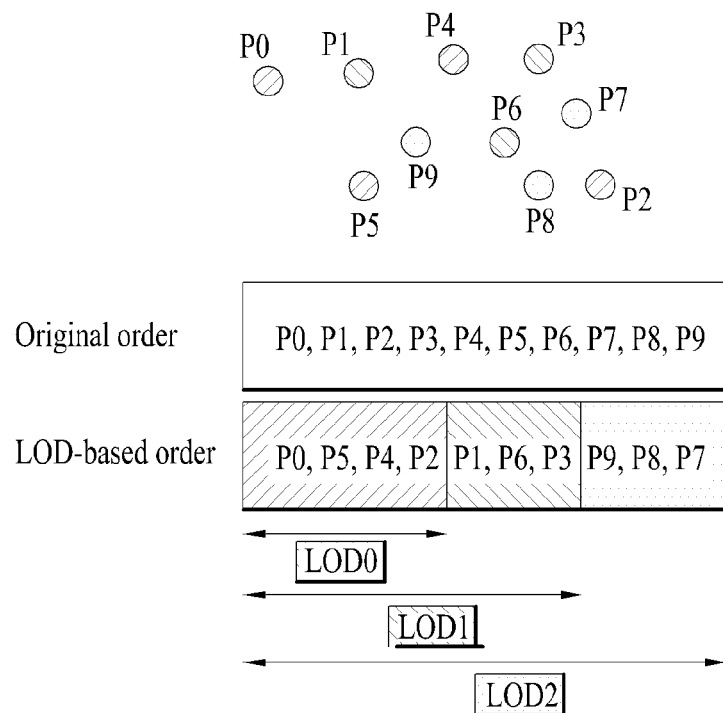
FIG. 9 illustrates an example of point configuration of a point cloud content for each LOD according to embodiments.

FIG. 9 illustrates an example of point configuration for each LOD according to embodiments.

As described with reference to FIGS. 1 to 8, the point cloud content providing system, or the point cloud video encoder (for example, the point cloud video encoder 10002 of FIG. 1, the point cloud video encoder of FIG. 4, or the LOD generator 40009) may generates an LOD. The LOD is generated by reorganizing the points into a set of refinement levels according to a set LOD distance value (or a set of Euclidean distances). The LOD generation process is performed not only by the point cloud video encoder, but also by the point cloud video decoder.

The upper part of FIG. 9 shows examples (P0 to P9) of points of the point cloud content distributed in a 3D space. In FIG. 9, the original order represents the order of points P0 to P9 before LOD generation. In FIG. 9, the LOD based order represents the order of points according to the LOD generation. Points are reorganized by LOD. Also, a high LOD contains the points belonging to lower LODs. As shown in FIG. 9, LOD0 contains P0, P5, P4 and P2. LOD1 contains the points of LOD0, P1, P6 and P3. LOD2 contains the points of LOD0, the points of LOD1, P9, P8 and P7.

As described with reference to FIG. 4, the point cloud video encoder according to the embodiments may perform prediction transform coding based on LOD, lifting transform coding based on LOD, and RAHT transform coding selectively or in combination.

The point cloud video encoder according to the embodiments may generate a predictor for points to perform prediction transform coding based on LOD for setting a predicted attribute (or predicted attribute value) of each point. That is, N predictors may be generated for N points. The predictor according to the embodiments may calculate a weight (=1/distance) based on the LOD value of each point, indexing information about neighboring points present within a set distance for each LOD, and a distance to the neighboring points.

The predicted attribute (or attribute value) according to the embodiments is set to the average of values obtained by multiplying the attributes (or attribute values) (e.g., color, reflectance, etc.) of neighbor points set in the predictor of each point by a weight (or weight value) calculated based on the distance to each neighbor point. The point cloud video encoder according to the embodiments (for example, the coefficient quantizer 40011) may quantize and inversely quantize the residual of each point (which may be called residual attribute, residual attribute value, attribute prediction residual value or prediction error attribute value and so on) obtained by subtracting a predicted attribute (or attribute value) each point from the attribute (i.e., original attribute value) of each point. The quantization process performed for a residual attribute value in a transmission device is configured as shown in table 2. The inverse quantization process performed for a residual attribute value in a reception device is configured as shown in table 3.

TABLE 2

```
int PCCQuantization(int value, int quantStep) {
if( value >=0) {
    return floor(value / quantStep + 1.0 / 3.0);
} else {
    return -floor(-value / quantStep + 1.0 / 3.0);
    }
}
```

TABLE 3

```
int PCCInverseQuantization(int value, int quantStep) {
if( quantStep ==0) {
    return value;
} else {
    return value * quantStep;
    }
}
```

When the predictor of each point has neighbor points, the point cloud video encoder (e.g., the arithmetic encoder 40012) according to the embodiments may perform entropy coding on the quantized and inversely quantized residual attribute values as described above. When the predictor of each point has no neighbor point, the point cloud video encoder according to the embodiments (for example, the arithmetic encoder 40012) may perform entropy coding on the attributes of the corresponding point without performing the above-described operation.

The point cloud video encoder according to the embodiments (for example, the lifting transformer 40010) may generate a predictor of each point, set the calculated LOD and register neighbor points in the predictor, and set weights according to the distances to neighbor points to perform lifting transform coding. The lifting transform coding according to the embodiments is similar to the above-described prediction transform coding, but differs therefrom in that weights are cumulatively applied to attribute values. The process of cumulatively applying weights to the attribute values according to embodiments is configured as follows.

1) Create an array Quantization Weight (QW) for storing the weight value of each point. The initial value of all elements of QW is 1.0. Multiply the QW values of the predictor indexes of the neighbor nodes registered in the predictor by the weight of the predictor of the current point, and add the values obtained by the multiplication.

2) Lift prediction process: Subtract the value obtained by multiplying the attribute value of the point by the weight from the existing attribute value to calculate a predicted attribute value.

3) Create temporary arrays called updateweight and update and initialize the temporary arrays to zero.

4) Cumulatively add the weights calculated by multiplying the weights calculated for all predictors by a weight stored in the QW corresponding to a predictor index to the updateweight array as indexes of neighbor nodes. Cumulatively add, to the update array, a value obtained by multiplying the attribute value of the index of a neighbor node by the calculated weight.

5) Lift update process: Divide the attribute values of the update array for all predictors by the weight value of the updateweight array of the predictor index, and add the existing attribute value to the values obtained by the division.

6) Calculate predicted attributes by multiplying the attribute values updated through the lift update process by the weight updated through the lift prediction process (stored in the QW) for all predictors. The point cloud video encoder (e.g., coefficient quantizer 40011) according to the embodiments quantizes the predicted attribute values. In addition, the point cloud video encoder (e.g., the arithmetic encoder 40012) performs entropy coding on the quantized attribute values.

The point cloud video encoder (for example, the RAHT transformer 40008) according to the embodiments may perform RAHT transform coding in which attributes of nodes of a higher level are predicted using the attributes associated with nodes of a lower level in the octree. RAHT transform coding is an example of attribute intra coding through an octree backward scan. The point cloud video encoder according to the embodiments scans the entire region from the voxel and repeats the merging process of merging the voxels into a larger block at each step until the root node is reached. The merging process according to the embodiments is performed only on the occupied nodes. The merging process is not performed on the empty node. The merging process is performed on an upper node immediately above the empty node.

Equation 3 below represents a RAHT transformation matrix. In Equation 3, $g_{l_{x,y,z}}$ denotes the average attribute value of voxels at level l. $g_{l_{x,y,z}}$ may be calculated based on $g_{l+1_{2x,y,z}}$ and $g_{l+1_{2x+1,y,z}}$. The weights for $g_{l_{2x,y,z}}$ and $g_{l_{2x+1,y,z}}$ are $w1 = w_{l_{2x,y,z}}$ and $w2 = w_{l_{2x+1,y,z}}$.

$$\begin{bmatrix} g_{l-1_{x,y,z}} \\ h_{l-1_{x,y,z}} \end{bmatrix} = T_{w1\ w2} \begin{bmatrix} g_{l_{2x,y,z}} \\ g_{l_{2x+1,y,z}} \end{bmatrix} \quad T_{w1\ w2} = \frac{1}{\sqrt{w1+w2}} \begin{bmatrix} \sqrt{w1} & \sqrt{w2} \\ -\sqrt{w2} & \sqrt{w1} \end{bmatrix} \quad \text{Equation 3}$$

Here, $g_{l-1_{x,y,z}}$ is a low-pass value and is used in the merging process at the next higher level. $h_{l-1_{x,y,z}}$ denotes high-pass coefficients. The high-pass coefficients at each step are quantized and subjected to entropy coding (for example, encoding by the arithmetic encoder 40012). The weights are calculated as $w_{l-1_{x,y,z}} = w_{l_{2x,y,z}} + w_{l_{2x+1,y,z}}$. The root node is created through the $g_{1_{0,0,0}}$ and $g_{1_{0,0,1}}$ as Equation 4.

$$\begin{bmatrix} gDC \\ h_{0_{0,0,0}} \end{bmatrix} = T_{w1000\ w1001} \begin{bmatrix} g_{1_{0,0,0z}} \\ g_{1_{0,0,1}} \end{bmatrix} \quad \text{Equation 4}$$

The value of gDC is also quantized and subjected to entropy coding like the high-pass coefficients.

Figure 10:
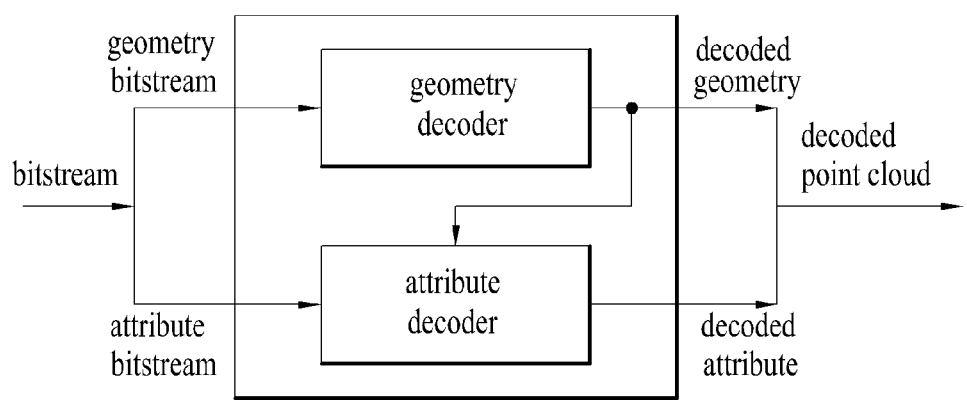
FIG. 10 illustrates an example of a block diagram of a point cloud video decoder according to embodiments.

FIG. 10 illustrates a point cloud video decoder according to embodiments.

The point cloud video decoder illustrated in FIG. 10 is an example of the point cloud video decoder 10006 described in FIG. 1, and may perform the same or similar operations as the operations of the point cloud video decoder 10006 illustrated in FIG. 1. As shown in the figure, the point cloud video decoder may receive a geometry bitstream and an attribute bitstream contained in one or more bitstreams. The point cloud video decoder includes a geometry decoder and an attribute decoder. The geometry decoder performs geometry decoding on the geometry bitstream and outputs decoded geometry. The attribute decoder performs attribute decoding on the attribute bitstream based on the decoded geometry, and outputs decoded attributes. The decoded geometry and decoded attributes are used to reconstruct point cloud content (a decoded point cloud).

Figure 11:
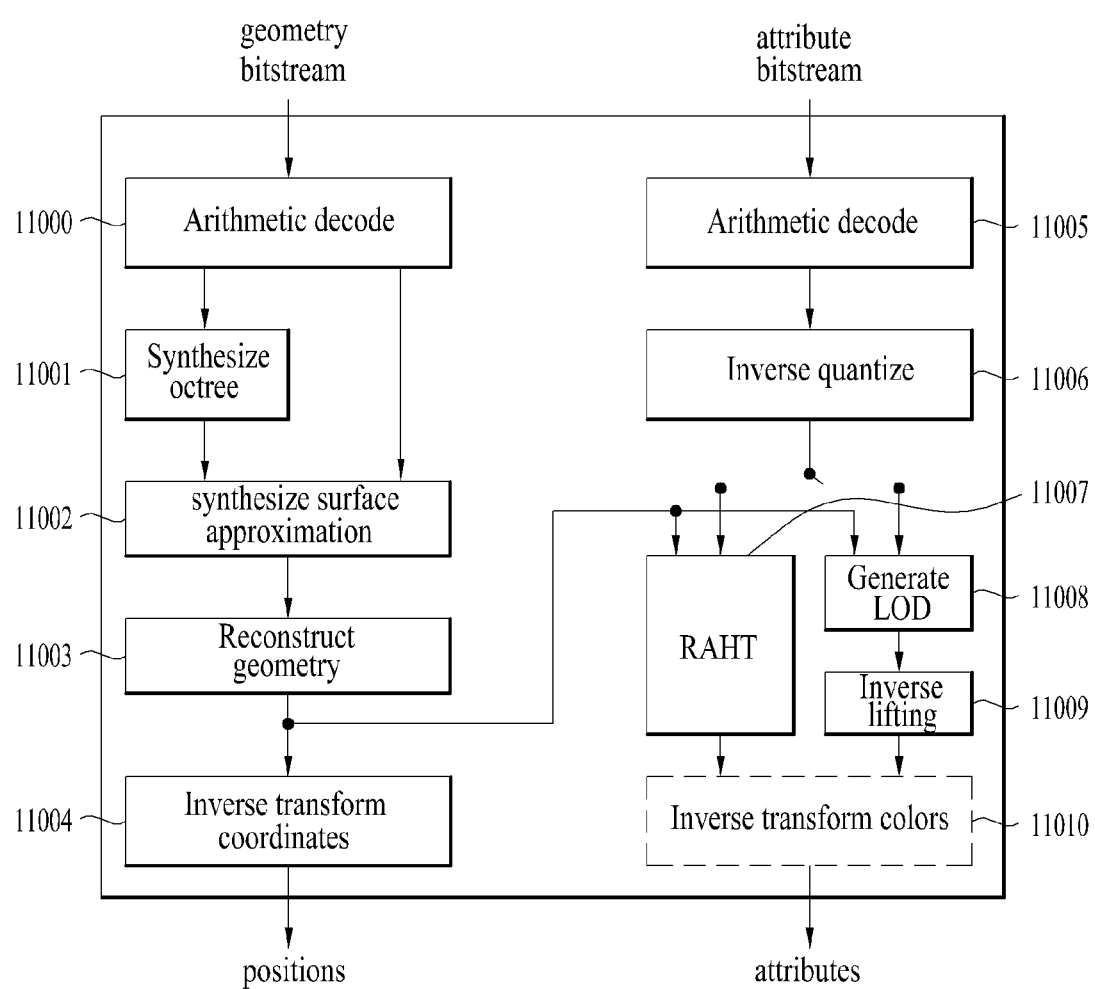
FIG. 11 illustrates an example of a point cloud video decoder according to embodiments.

FIG. 11 illustrates a point cloud video decoder according to embodiments.

The point cloud video decoder illustrated in FIG. 11 is an example of the point cloud video decoder illustrated in FIG. 10, and may perform a decoding operation, which is an inverse process of the encoding operation of the point cloud video encoder illustrated in FIGS. 1 to 9.

As described with reference to FIGS. 1 and 10, the point cloud video decoder may perform geometry decoding and attribute decoding. The geometry decoding is performed before the attribute decoding.

The point cloud video decoder according to the embodiments includes an arithmetic decoder (Arithmetic decode) 11000, an octree synthesizer (Synthesize octree) 11001, a surface approximation synthesizer (Synthesize surface approximation) 11002, and a geometry reconstructor (Reconstruct geometry) 11003, a coordinate inverse transformer (Inverse transform coordinates) 11004, an arithmetic decoder (Arithmetic decode) 11005, an inverse quantizer (Inverse quantize) 11006, a RAHT transformer 11007, an LOD generator (Generate LOD) 11008, an inverse lifter (inverse lifting) 11009, and/or a color inverse transformer (Inverse transform colors) 11010.

The arithmetic decoder 11000, the octree synthesizer 11001, the surface approximation synthesizer 11002, and the geometry reconstructor 11003, and the coordinate inverse transformer 11004 may perform geometry decoding. The geometry decoding according to the embodiments may include direct decoding and trisoup geometry decoding. The direct decoding and trisoup geometry decoding are selectively applied. The geometry decoding is not limited to the above-described example, and is performed as an inverse process of the geometry encoding described with reference to FIGS. 1 to 9.

The arithmetic decoder 11000 according to the embodiments decodes the received geometry bitstream based on the arithmetic coding. The operation of the arithmetic decoder 11000 corresponds to the inverse process of the arithmetic encoder 40004.

The octree synthesizer 11001 according to the embodiments may generate an octree by acquiring an occupancy code from the decoded geometry bitstream (or information on the geometry secured as a result of decoding). The occupancy code is configured as described in detail with reference to FIGS. 1 to 9.

When the trisoup geometry encoding is applied, the surface approximation synthesizer 11002 according to the embodiments may synthesize a surface based on the decoded geometry and/or the generated octree.

The geometry reconstructor 11003 according to the embodiments may regenerate geometry based on the surface and/or the decoded geometry. As described with reference to FIGS. 1 to 9, direct coding and trisoup geometry encoding are selectively applied. Accordingly, the geometry reconstructor 11003 directly imports and adds position information about the points to which direct coding is applied. When the trisoup geometry encoding is applied, the geometry reconstructor 11003 may reconstruct the geometry by performing the reconstruction operations of the geometry reconstructor 40005, for example, triangle reconstruction, up-sampling, and voxelization. Details are the same as those described with reference to FIG. 6, and thus description thereof is omitted. The reconstructed geometry may include a point cloud picture or frame that does not contain attributes.

The coordinate inverse transformer 11004 according to the embodiments may acquire positions of the points by transforming the coordinates based on the reconstructed geometry.

The arithmetic decoder 11005, the inverse quantizer 11006, the RAHT transformer 11007, the LOD generator 11008, the inverse lifter 11009, and/or the color inverse transformer 11010 may perform the attribute decoding described with reference to FIG. 10. The attribute decoding according to the embodiments includes region adaptive hierarchical transform (RAHT) decoding, interpolation-based hierarchical nearest-neighbor prediction (prediction transform) decoding, and interpolation-based hierarchical nearest-neighbor prediction with an update/lifting step (lifting transform) decoding. The three decoding schemes described above may be used selectively, or a combination of one or more decoding schemes may be used. The attribute decoding according to the embodiments is not limited to the above-described example.

The arithmetic decoder 11005 according to the embodiments decodes the attribute bitstream by arithmetic coding.

The inverse quantizer 11006 according to the embodiments inversely quantizes the information about the decoded attribute bitstream or attributes secured as a result of the decoding, and outputs the inversely quantized attributes (or attribute values). The inverse quantization may be selectively applied based on the attribute encoding of the point cloud video encoder.

According to embodiments, the RAHT transformer 11007, the LOD generator 11008, and/or the inverse lifter 11009 may process the reconstructed geometry and the inversely quantized attributes. As described above, the RAHT transformer 11007, the LOD generator 11008, and/or the inverse lifter 11009 may selectively perform a decoding operation corresponding to the encoding of the point cloud video encoder.

The color inverse transformer 11010 according to the embodiments performs inverse transform coding to inversely transform a color value (or texture) included in the decoded attributes. The operation of the color inverse transformer 11010 may be selectively performed based on the operation of the color transformer 40006 of the point cloud video encoder.

Although not shown in the figure, the elements of the point cloud video decoder of FIG. 11 may be implemented by hardware including one or more processors or integrated circuits configured to communicate with one or more memories included in the point cloud content providing apparatus, software, firmware, or a combination thereof. The one or more processors may perform at least one or more of the operations and/or functions of the elements of the point cloud video decoder of FIG. 11 described above. Additionally, the one or more processors may operate or execute a set of software programs and/or instructions for performing the operations and/or functions of the elements of the point cloud video decoder of FIG. 11.

Figure 12:
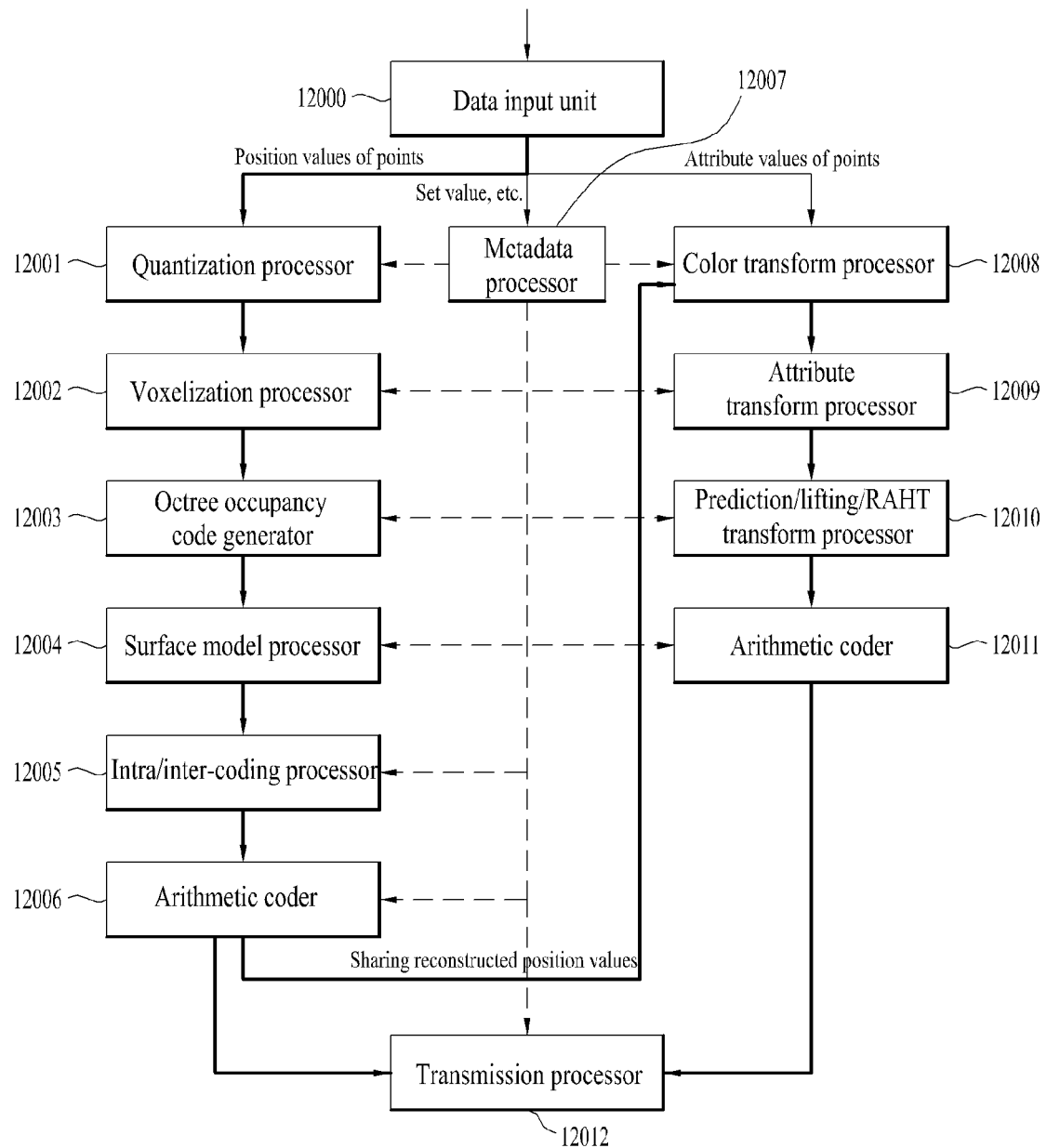
FIG. 12 illustrates a configuration for point cloud video encoding of a transmission device according to embodiments.

FIG. 12 illustrates a transmission device according to embodiments.

The transmission device shown in FIG. 12 is an example of the transmission device 10000 of FIG. 1 (or the point cloud video encoder of FIG. 4). The transmission device illustrated in FIG. 12 may perform one or more of the operations and methods the same as or similar to those of the point cloud video encoder described with reference to FIGS. 1 to 9. The transmission device according to the embodiments may include a data input unit 12000, a quantization processor 12001, a voxelization processor 12002, an octree occupancy code generator 12003, a surface model processor 12004, an intra/inter-coding processor 12005, an arithmetic coder 12006, a metadata processor 12007, a color transform processor 12008, an attribute transform processor 12009, a prediction/lifting/RAHT transform processor 12010, an arithmetic coder 12011 and/or a transmission processor 12012.

The data input unit 12000 according to the embodiments receives or acquires point cloud data. The data input unit 12000 may perform an operation and/or acquisition method the same as or similar to the operation and/or acquisition method of the point cloud video acquisition unit 10001 (or the acquisition process 20000 described with reference to FIG. 2).

The data input unit 12000, the quantization processor 12001, the voxelization processor 12002, the octree occupancy code generator 12003, the surface model processor 12004, the intra/inter-coding processor 12005, and the arithmetic coder 12006 perform geometry encoding. The geometry encoding according to the embodiments is the same as or similar to the geometry encoding described with reference to FIGS. 1 to 9, and thus a detailed description thereof is omitted.

The quantization processor 12001 according to the embodiments quantizes geometry (e.g., position values of points). The operation and/or quantization of the quantization processor 12001 is the same as or similar to the operation and/or quantization of the quantizer 40001 described with reference to FIG. 4. Details are the same as those described with reference to FIGS. 1 to 9.

The voxelization processor 12002 according to the embodiments voxelizes the quantized position values of the points. The voxelization processor 12002 may perform an operation and/or process the same or similar to the operation and/or the voxelization process of the quantizer 40001 described with reference to FIG. 4. Details are the same as those described with reference to FIGS. 1 to 9.

The octree occupancy code generator 12003 according to the embodiments performs octree coding on the voxelized positions of the points based on an octree structure. The octree occupancy code generator 12003 may generate an occupancy code. The octree occupancy code generator 12003 may perform an operation and/or method the same as or similar to the operation and/or method of the point cloud video encoder (or the octree analyzer 40002) described with reference to FIGS. 4 and 6. Details are the same as those described with reference to FIGS. 1 to 9.

The surface model processor 12004 according to the embodiments may perform trisoup geometry encoding based on a surface model to reconstruct the positions of points in a specific region (or node) on a voxel basis. The surface model processor 12004 may perform an operation and/or method the same as or similar to the operation and/or method of the point cloud video encoder (for example, the surface approximation analyzer 40003) described with reference to FIG. 4. Details are the same as those described with reference to FIGS. 1 to 9.

The intra/inter-coding processor 12005 according to the embodiments may perform intra/inter-coding on point cloud data. The intra/inter-coding processor 12005 may perform coding the same as or similar to the intra/inter-coding described with reference to FIG. 7. Details are the same as those described with reference to FIG. 7. According to embodiments, the intra/inter-coding processor 12005 may be included in the arithmetic coder 12006.

The arithmetic coder 12006 according to the embodiments performs entropy encoding on an octree of the point cloud data and/or an approximated octree. For example, the encoding scheme includes arithmetic encoding. The arithmetic coder 12006 performs an operation and/or method the same as or similar to the operation and/or method of the arithmetic encoder 40004.

The metadata processor 12007 according to the embodiments processes metadata about the point cloud data, for example, a set value, and provides the same to a necessary processing process such as geometry encoding and/or attribute encoding. Also, the metadata processor 12007 according to the embodiments may generate and/or process signaling information related to the geometry encoding and/or the attribute encoding. The signaling information according to the embodiments may be encoded separately from the geometry encoding and/or the attribute encoding. The signaling information according to the embodiments may be interleaved.

The color transform processor 12008, the attribute transform processor 12009, the prediction/lifting/RAHT transform processor 12010, and the arithmetic coder 12011 perform the attribute encoding. The attribute encoding according to the embodiments is the same as or similar to the attribute encoding described with reference to FIGS. 1 to 9, and thus a detailed description thereof is omitted.

The color transform processor 12008 according to the embodiments performs color transform coding to transform color values included in attributes. The color transform processor 12008 may perform color transform coding based on the reconstructed geometry. The reconstructed geometry is the same as described with reference to FIGS. 1 to 9. Also, it performs an operation and/or method the same as or similar to the operation and/or method of the color transformer 40006 described with reference to FIG. 4 is performed. The detailed description thereof is omitted.

The attribute transform processor 12009 according to the embodiments performs attribute transformation to transform the attributes based on the reconstructed geometry and/or the positions on which geometry encoding is not performed. The attribute transform processor 12009 performs an operation and/or method the same as or similar to the operation and/or method of the attribute transformer 40007 described with reference to FIG. 4. The detailed description thereof is omitted. The prediction/lifting/RAHT transform processor 12010 according to the embodiments may code the transformed attributes by any one or a combination of RAHT coding, prediction transform coding, and lifting transform coding. The prediction/lifting/RAHT transform processor 12010 performs at least one of the operations the same as or similar to the operations of the RAHT transformer 40008, the LOD generator 40009, and the lifting transformer 40010 described with reference to FIG. 4. In addition, the prediction transform coding, the lifting transform coding, and the RAHT transform coding are the same as those described with reference to FIGS. 1 to 9, and thus a detailed description thereof is omitted.

The arithmetic coder 12011 according to the embodiments may encode the coded attributes based on the arithmetic coding. The arithmetic coder 12011 performs an operation and/or method the same as or similar to the operation and/or method of the arithmetic encoder 40012.

The transmission processor 12012 according to the embodiments may transmit each bitstream containing encoded geometry and/or encoded attributes and metadata, or transmit one bitstream configured with the encoded geometry and/or the encoded attributes and the metadata. When the encoded geometry and/or the encoded attributes and the metadata according to the embodiments are configured into one bitstream, the bitstream may include one or more sub-bitstreams. The bitstream according to the embodiments may contain signaling information including a sequence parameter set (SPS) for signaling of a sequence level, a geometry parameter set (GPS) for signaling of geometry information coding, an attribute parameter set (APS) for signaling of attribute information coding, and a tile parameter set (TPS or tile inventory) for signaling of a tile level, and slice data. The slice data may include information about one or more slices. One slice according to embodiments may include one geometry bitstream $Geom0^0$ and one or more attribute bitstreams $Attr0^0$ and $Attr1^0$.

The slice is a series of a syntax element representing in whole or in part of the coded point cloud frame.

The TPS according to the embodiments may include information about each tile (for example, coordinate information and height/size information about a bounding box) for one or more tiles. The geometry bitstream may contain a header and a payload. The header of the geometry bitstream according to the embodiments may contain a parameter set identifier (geom_parameter_set_id), a tile identifier (geom_tile_id) and a slice identifier (geom_slice_id) included in the GPS, and information about the data contained in the payload. As described above, the metadata processor 12007 according to the embodiments may generate and/or process the signaling information and transmit the same to the transmission processor 12012. According to embodiments, the elements to perform geometry encoding and the elements to perform attribute encoding may share data/information with each other as indicated by dotted lines. The transmission processor 12012 according to the embodiments may perform an operation and/or transmission method the same as or similar to the operation and/or transmission method of the transmitter 10003. Details are the same as those described with reference to FIGS. 1 and 2, and thus a description thereof is omitted.

Figure 13:
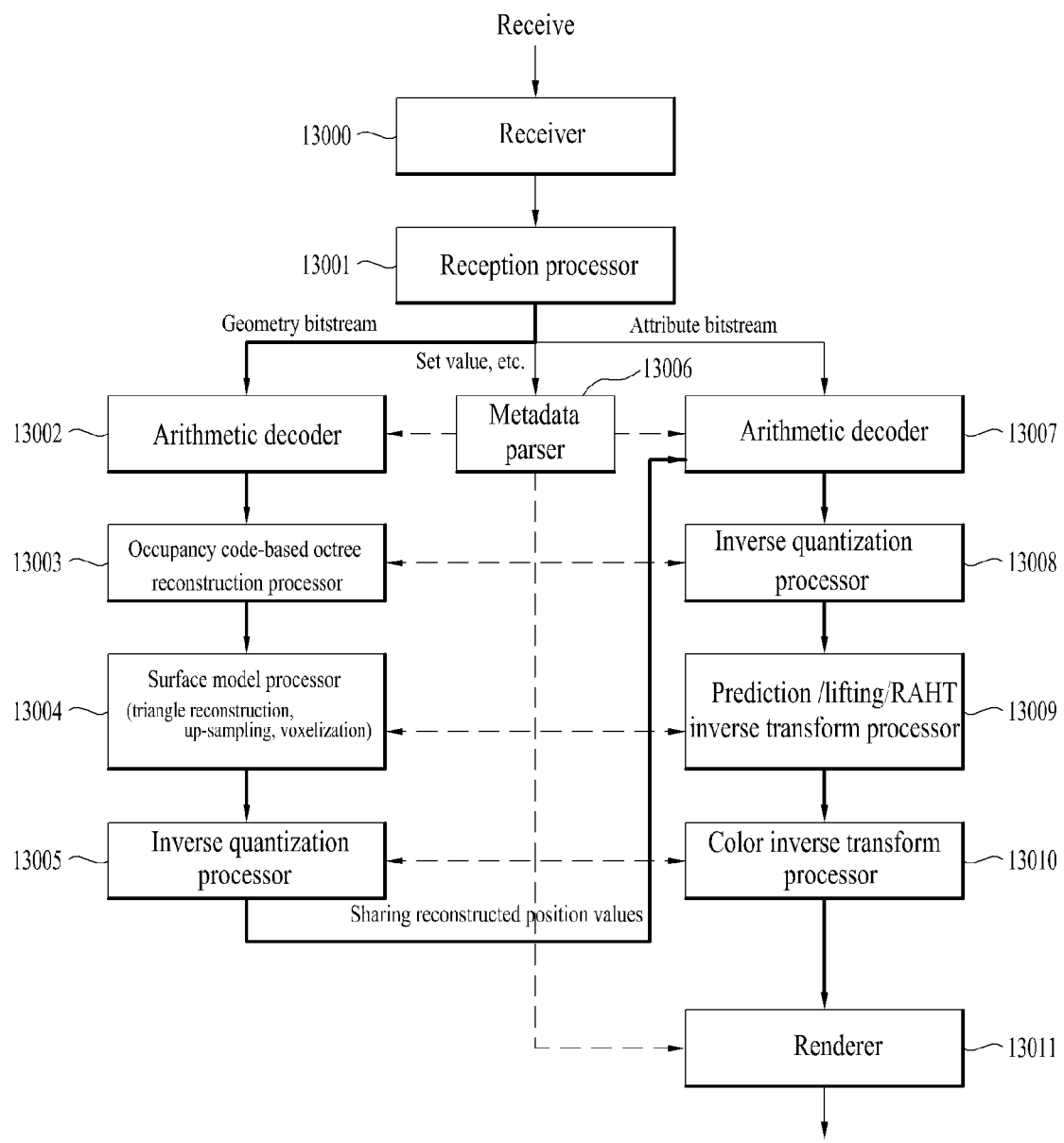
FIG. 13 illustrates a configuration for point cloud video decoding of a reception device according to embodiments.

FIG. 13 illustrates a reception device according to embodiments.

The reception device illustrated in FIG. 13 is an example of the reception device 10004 of FIG. 1 (or the point cloud video decoder of FIGS. 10 and 11). The reception device illustrated in FIG. 13 may perform one or more of the operations and methods the same as or similar to those of the point cloud video decoder described with reference to FIGS. 1 to 11.

The reception device according to the embodiment includes a receiver 13000, a reception processor 13001, an arithmetic decoder 13002, an occupancy code-based octree reconstruction processor 13003, a surface model processor (triangle reconstruction, up-sampling, voxelization) 13004, an inverse quantization processor 13005, a metadata parser 13006, an arithmetic decoder 13007, an inverse quantization processor 13008, a prediction/lifting/RAHT inverse transform processor 13009, a color inverse transform processor 13010, and/or a renderer 13011. Each element for decoding according to the embodiments may perform an inverse process of the operation of a corresponding element for encoding according to the embodiments.

The receiver 13000 according to the embodiments receives point cloud data. The receiver 13000 may perform an operation and/or reception method the same as or similar to the operation and/or reception method of the receiver 10005 of FIG. 1. The detailed description thereof is omitted.

The reception processor 13001 according to the embodiments may acquire a geometry bitstream and/or an attribute bitstream from the received data. The reception processor 13001 may be included in the receiver 13000.

The arithmetic decoder 13002, the occupancy code-based octree reconstruction processor 13003, the surface model processor 13004, and the inverse quantization processor 1305 may perform geometry decoding. The geometry decoding according to embodiments is the same as or similar to the geometry decoding described with reference to FIGS. 1 to 10, and thus a detailed description thereof is omitted.

The arithmetic decoder 13002 according to the embodiments may decode the geometry bitstream based on arithmetic coding. The arithmetic decoder 13002 performs an operation and/or coding the same as or similar to the operation and/or coding of the arithmetic decoder 11000.

The occupancy code-based octree reconstruction processor 13003 according to the embodiments may reconstruct an octree by acquiring an occupancy code from the decoded geometry bitstream (or information about the geometry secured as a result of decoding). The occupancy code-based octree reconstruction processor 13003 performs an operation and/or method the same as or similar to the operation and/or octree generation method of the octree synthesizer 11001. When the trisoup geometry encoding is applied, the surface model processor 1302 according to the embodiments may perform trisoup geometry decoding and related geometry reconstruction (for example, triangle reconstruction, up-sampling, voxelization) based on the surface model method. The surface model processor 1302 performs an operation the same as or similar to that of the surface approximation synthesizer 11002 and/or the geometry reconstructor 11003.

The inverse quantization processor 1305 according to the embodiments may inversely quantize the decoded geometry.

The metadata parser 1306 according to the embodiments may parse metadata contained in the received point cloud data, for example, a set value. The metadata parser 1306 may pass the metadata to geometry decoding and/or attribute decoding. The metadata is the same as that described with reference to FIG. 12, and thus a detailed description thereof is omitted.

The arithmetic decoder 13007, the inverse quantization processor 13008, the prediction/lifting/RAHT inverse transform processor 13009 and the color inverse transform processor 13010 perform attribute decoding. The attribute decoding is the same as or similar to the attribute decoding described with reference to FIGS. 1 to 10, and thus a detailed description thereof is omitted.

The arithmetic decoder 13007 according to the embodiments may decode the attribute bitstream by arithmetic coding. The arithmetic decoder 13007 may decode the attribute bitstream based on the reconstructed geometry. The arithmetic decoder 13007 performs an operation and/or coding the same as or similar to the operation and/or coding of the arithmetic decoder 11005.

The inverse quantization processor 13008 according to the embodiments may inversely quantize the decoded attribute bitstream. The inverse quantization processor 13008 performs an operation and/or method the same as or similar to the operation and/or inverse quantization method of the inverse quantizer 11006.

The prediction/lifting/RAHT inverse transformer 13009 according to the embodiments may process the reconstructed geometry and the inversely quantized attributes. The prediction/lifting/RAHT inverse transform processor 1301 performs one or more of operations and/or decoding the same as or similar to the operations and/or decoding of the RAHT transformer 11007, the LOD generator 11008, and/or the inverse lifter 11009. The color inverse transform processor 13010 according to the embodiments performs inverse transform coding to inversely transform color values (or textures) included in the decoded attributes. The color inverse transform processor 13010 performs an operation and/or inverse transform coding the same as or similar to the operation and/or inverse transform coding of the color inverse transformer 11010. The renderer 13011 according to the embodiments may render the point cloud data.

Figure 14:
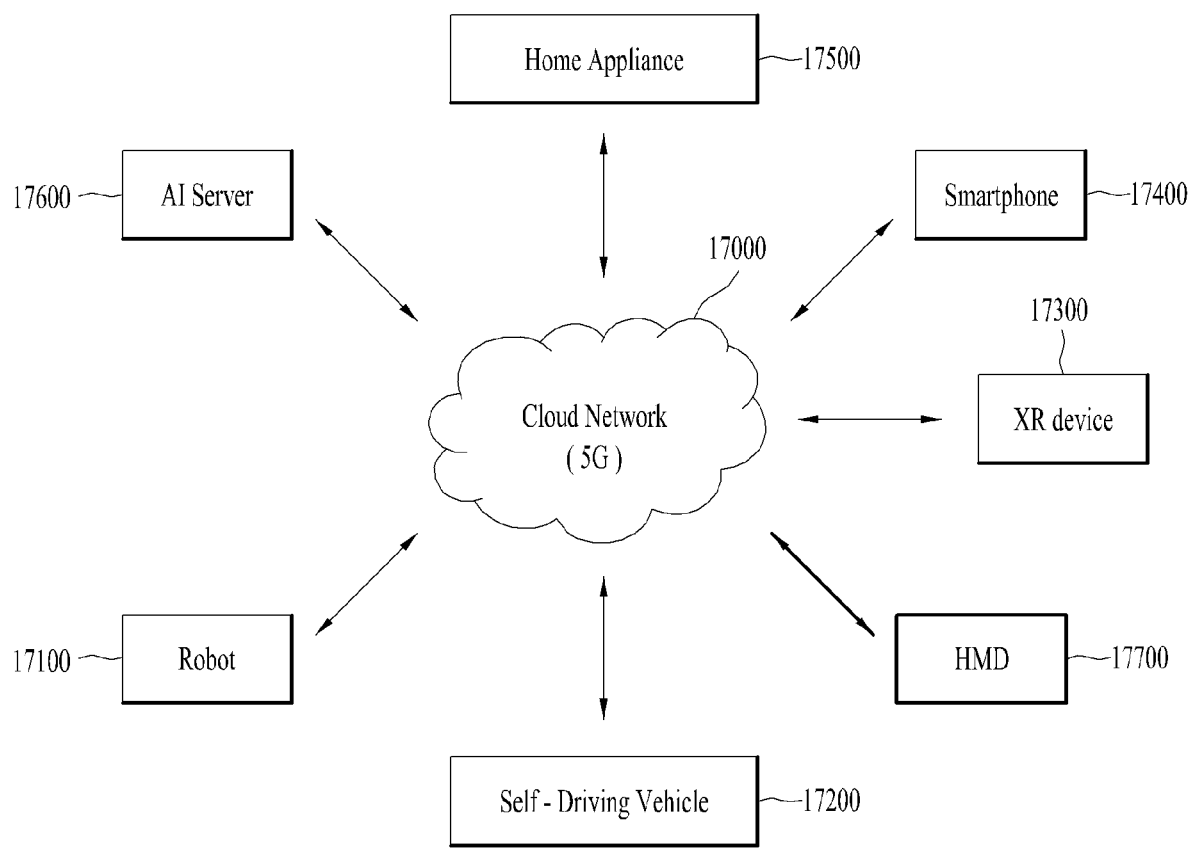
FIG. 14 illustrates an exemplary structure operatively connectable with a method/device for transmitting and receiving point cloud data according to embodiments.

FIG. 14 shows an exemplary structure operatively connectable with a method/device for transmitting and receiving point cloud data according to embodiments.

The structure of FIG. 14 represents a configuration in which at least one of a server 17600, a robot 17100, a self-driving vehicle 17200, an XR device 17300, a smartphone 17400, a home appliance 17500, and/or a head-mount display (HMD) 17700 is connected to a cloud network 17100. The robot 17100, the self-driving vehicle 17200, the XR device 17300, the smartphone 17400, or the home appliance 17500 is referred to as a device. In addition, the XR device 17300 may correspond to a point cloud compressed data (PCC) device according to embodiments or may be operatively connected to the PCC device.

The cloud network 17000 may represent a network that constitutes part of the cloud computing infrastructure or is present in the cloud computing infrastructure. Here, the cloud network 17000 may be configured using a 3G network, 4G or Long Term Evolution (LTE) network, or a 5G network.

The server 17600 may be connected to at least one of the robot 17100, the self-driving vehicle 17200, the XR device 17300, the smartphone 17400, the home appliance 17500, and/or the HMD 17700 over the cloud network 17000 and may assist in at least a part of the processing of the connected devices 17100 to 17700.

The HMD 17700 represents one of the implementation types of the XR device and/or the PCC device according to the embodiments. The HMD type device according to the embodiments includes a communication unit, a control unit, a memory, an I/O unit, a sensor unit, and a power supply unit.

Hereinafter, various embodiments of the devices 17100 to 17500 to which the above-described technology is applied will be described. The devices 17100 to 17500 illustrated in FIG. 14 may be operatively connected/coupled to a point cloud data transmission device and reception according to the above-described embodiments.

<PCC+XR>

The XR/PCC device 17300 may employ PCC technology and/or XR (AR+VR) technology, and may be implemented as an HMD, a head-up display (HUD) provided in a vehicle, a television, a mobile phone, a smartphone, a computer, a wearable device, a home appliance, a digital signage, a vehicle, a stationary robot, or a mobile robot.

The XR/PCC device 17300 may analyze 3D point cloud data or image data acquired through various sensors or from an external device and generate position data and attribute data about 3D points. Thereby, the XR/PCC device 17300 may acquire information about the surrounding space or a real object, and render and output an XR object. For example, the XR/PCC device 17300 may match an XR object including auxiliary information about a recognized object with the recognized object and output the matched XR object.

<PCC+Self-Driving+XR>

The self-driving vehicle 17200 may be implemented as a mobile robot, a vehicle, an unmanned aerial vehicle, or the like by applying the PCC technology and the XR technology.

The self-driving vehicle 17200 to which the XR/PCC technology is applied may represent a self-driving vehicle provided with means for providing an XR image, or a self-driving vehicle that is a target of control/interaction in the XR image. In particular, the self-driving vehicle 17200 which is a target of control/interaction in the XR image may be distinguished from the XR device 17300 and may be operatively connected thereto.

The self-driving vehicle 17200 having means for providing an XR/PCC image may acquire sensor information from sensors including a camera, and output the generated XR/PCC image based on the acquired sensor information. For example, the self-driving vehicle 17200 may have an HUD and output an XR/PCC image thereto, thereby providing an occupant with an XR/PCC object corresponding to a real object or an object present on the screen.

When the XR/PCC object is output to the HUD, at least a part of the XR/PCC object may be output to overlap the real object to which the occupant's eyes are directed. On the other hand, when the XR/PCC object is output on a display provided inside the self-driving vehicle, at least a part of the XR/PCC object may be output to overlap an object on the screen. For example, the self-driving vehicle 17200 may output XR/PCC objects corresponding to objects such as a road, another vehicle, a traffic light, a traffic sign, a two-wheeled vehicle, a pedestrian, and a building.

The virtual reality (VR) technology, the augmented reality (AR) technology, the mixed reality (MR) technology and/or the point cloud compression (PCC) technology according to the embodiments are applicable to various devices.

In other words, the VR technology is a display technology that provides only CG images of real-world objects, backgrounds, and the like. On the other hand, the AR technology refers to a technology that shows a virtually created CG image on the image of a real object. The MR technology is similar to the AR technology described above in that virtual objects to be shown are mixed and combined with the real world. However, the MR technology differs from the AR technology in that the AR technology makes a clear distinction between a real object and a virtual object created as a CG image and uses virtual objects as complementary objects for real objects, whereas the MR technology treats virtual objects as objects having equivalent characteristics as real objects. More specifically, an example of MR technology applications is a hologram service.

Recently, the VR, AR, and MR technologies are sometimes referred to as extended reality (XR) technology rather than being clearly distinguished from each other. Accordingly, embodiments of the present disclosure are applicable to any of the VR, AR, MR, and XR technologies. The encoding/decoding based on PCC, V-PCC, and G-PCC techniques is applicable to such technologies.

The PCC method/device according to the embodiments may be applied to a vehicle that provides a self-driving service.

A vehicle that provides the self-driving service is connected to a PCC device for wired/wireless communication.

When the point cloud compression data (PCC) transmission/reception device according to the embodiments is connected to a vehicle for wired/wireless communication, the device may receive/process content data related to an AR/VR/PCC service, which may be provided together with the self-driving service, and transmit the same to the vehicle. In the case where the PCC transmission/reception device is mounted on a vehicle, the PCC transmission/reception device may receive/process content data related to the AR/VR/PCC service according to a user input signal input through a user interface device and provide the same to the user. The vehicle or the user interface device according to the embodiments may receive a user input signal. The user input signal according to the embodiments may include a signal indicating the self-driving service.

Meanwhile, the point cloud video encoder on the transmitting side may further perform a spatial partitioning process of spatially partitioning (or dividing) the point cloud data into one or more 3D blocks before encoding the point cloud data. That is, in order for the encoding and transmission operations of the transmission device and the decoding and rendering operations of the reception device to be performed in real time and processed with low latency, the transmission device may spatially partition the point cloud data into a plurality of regions. In addition, the transmission device may independently or non-independently encode the spatially partitioned regions (or blocks), thereby enabling random access and parallel encoding in the three-dimensional space occupied by the point cloud data. In addition, the transmission device and the reception device may perform encoding and decoding independently or non-independently for each spatially partitioned region (or block), thereby preventing errors from being accumulated in the encoding and decoding process.

Figure 15:
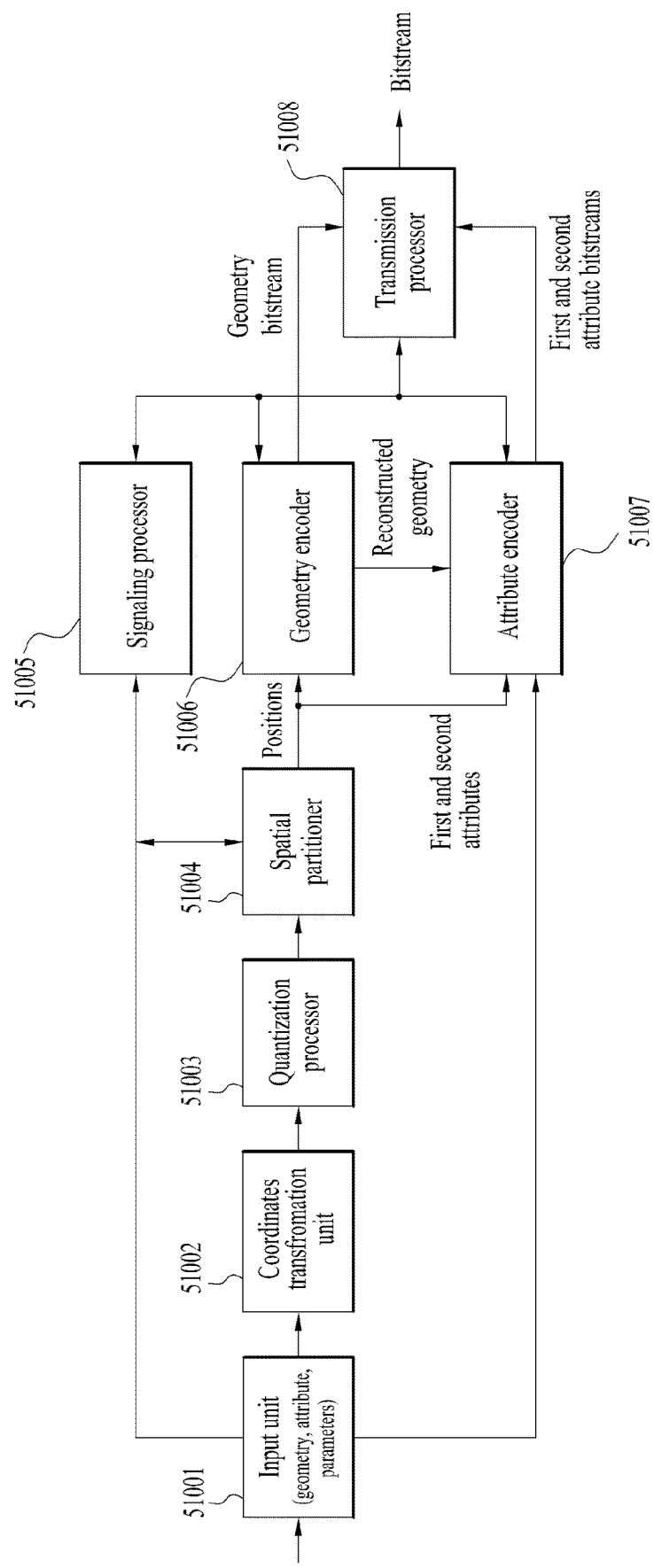
FIG. 15 illustrates an example of a point cloud transmission device according to embodiments.

FIG. 15 is a diagram illustrating another example of a point cloud transmission device according to embodiments, including a spatial partitioner.

The point cloud transmission device according to the embodiments may include a data input unit 51001, a coordinates transformation unit 51002, a quantization processor 51003, a spatial partitioner 51004, a signaling processor 51005, a geometry encoder 51006, an attribute encoder 51007, and a transmission processor 51008. According to embodiments, the coordinates transformation unit 51002, the quantization processor 51003, the spatial partitioner 51004, the geometry encoder 51006, and the attribute encoder 51007 may be referred to as point cloud video encoders.

The data input unit 51001 may perform some or all of the operations of the point cloud video acquisition unit 10001 of FIG. 1, or may perform some or all of the operations of the data input unit 12000 of FIG. 12. The coordinates transformation unit 51002 may perform some or all of the operations of the coordinates transformation unit 40000 of FIG. 4. Further, the quantization processor 51003 may perform some or all of the operations of the quantization unit 40001 of FIG. 4, or may perform some or all of the operations of the quantization processor 12001 of FIG. 12.

The spatial partitioner 51004 may spatially partition the point cloud data quantized and output from the quantization processor 51003 into one or more 3D blocks based on a bounding box and/or a sub-bounding box. Here, the 3D block may refer to a tile group, a tile, a slice, a coding unit (CU), a prediction unit (PU), or a transform unit (TU). In one embodiment, the signaling information for spatial partition is entropy-encoded by the signaling processor 51005 and then transmitted through the transmission processor 51008 in the form of a bitstream.

Figure 16:
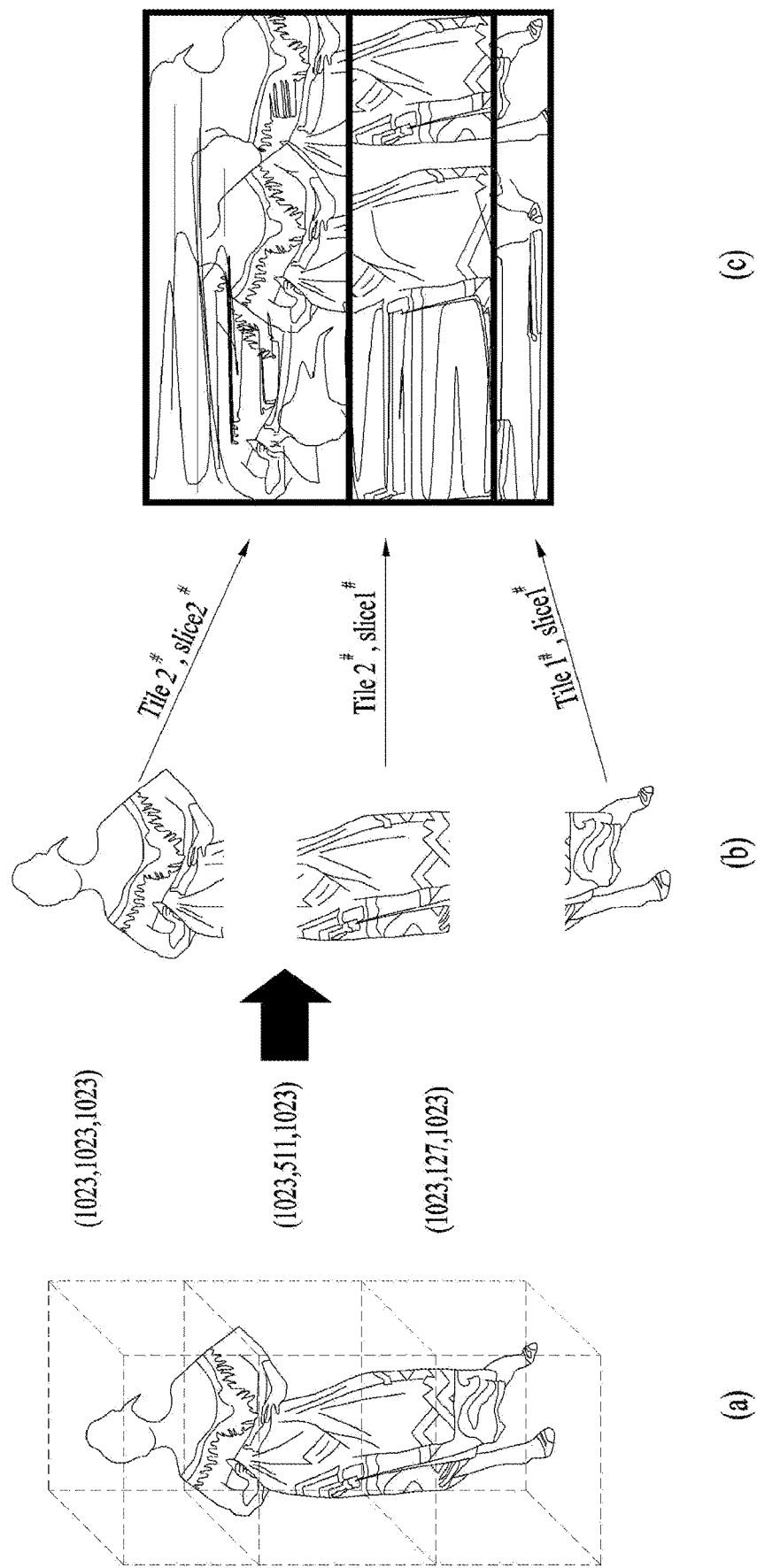
FIG. 16(a) to FIG. 16(c) illustrate an embodiment of partitioning a bounding box into one or more tiles.

FIGS. 16(*a*) to 16(*c*) illustrate an embodiment of partitioning a bounding box into one or more tiles. As shown in FIG. 16(*a*), a point cloud object, which corresponds to point cloud data, may be expressed in the form of a box based on a coordinate system, which is referred to as a bounding box. In other words, the bounding box represents a cube capable of containing all points of the point cloud.

FIGS. 16(*b*) and 16(*c*) illustrate an example in which the bounding box of FIG. 16(*a*) is partitioned into tile 1# and tile 2#, and tile 2# is partitioned again into slice 1# and slice 2#.

In one embodiment, the point cloud content may be one person such as an actor, multiple people, one object, or multiple objects. In a larger range, it may be a map for autonomous driving or a map for indoor navigation of a robot. In this case, the point cloud content may be a vast amount of locally connected data. In this case, the point cloud content cannot be encoded/decoded at once, and accordingly tile partitioning may be performed before the point cloud content is compressed. For example, room #101 in a building may be partitioned into one tile and room #102 in the building may be partitioned into another tile. In order to support fast encoding/decoding by applying parallelization to the partitioned tiles, the tiles may be partitioned (or split) into slices again. This operation may be referred to as slice partitioning (or splitting).

That is, a tile may represent a partial region (e.g., a rectangular cube) of a 3D space occupied by point cloud data according to embodiments. According to embodiments, a tile may include one or more slices. The tile according to the embodiments may be partitioned into one or more slices, and thus the point cloud video encoder may encode point cloud data in parallel.

A slice may represent a unit of data (or bitstream) that may be independently encoded by the point cloud video encoder according to the embodiments and/or a unit of data (or bitstream) that may be independently decoded by the point cloud video decoder. A slice may be a set of data in a 3D space occupied by point cloud data, or a set of some data among the point cloud data. A slice according to the embodiments may represent a region or set of points included in a tile according to embodiments. According to embodiments, a tile may be partitioned into one or more slices based on the number of points included in one tile. For example, one tile may be a set of points partitioned by the number of points. According to embodiments, a tile may be partitioned into one or more slices based on the number of points, and some data may be split or merged in the partitioning process. That is, a slice may be a unit that may be independently coded within a corresponding tile. In this way, a tile obtained by spatially partitioning may be partitioned into one or more slices for fast and efficient processing.

The point cloud video encoder according to the embodiments may encode point cloud data on a slice-by-slice basis or a tile-by-tile basis, wherein a tile includes one or more slices. In addition, the point cloud video encoder according to the embodiments may perform different quantization and/or transformation for each tile or each slice.

Positions of one or more 3D blocks (e.g., slices) spatially partitioned by the spatial partitioner 51004 are output to the geometry encoder 51006, and the attribute information (or attributes) is output to the attribute encoder 51007. The positions may be position information about the points included in a partitioned unit (box, block, tile, tile group, or slice), and are referred to as geometry information.

The geometry encoder 51006 constructs and encodes (i.e., compresses) an octree based on the positions output from the spatial partitioner 51004 to output a geometry bitstream. The geometry encoder 51006 may reconstruct an octree and/or an approximated octree and output the same to the attribute encoder 51007. The reconstructed octree may be referred to as reconstructed geometry (or restored geometry).

The attribute encoder 51007 encodes (i.e., compresses) the attributes output from the spatial partitioner 51004 based on the reconstructed geometry output from the geometry encoder 51006, and outputs an attribute bitstream.

As described above, point cloud data may be composed of a set of points, and each point may have geometry information and attribute information. That is, according to the point cloud data, one point may have one or more attributes such as texture, color, reflectance, and transparency.

Recently, LiDAR equipment configured to capture both color information and reflectance information is increasing.

In the present disclosure, an embodiment in which at least one point has both an attribute corresponding to color and an attribute corresponding to reflectance will be described.

According to embodiments, first attribute(s) may be referred to as color information or color (or color information) attribute(s), and a second attribute(s) may be referred to as reflectance information or reflectance (or reflectance information) attribute(s), or vice versa.

According to embodiments, a first attribute bitstream includes attribute information corresponding to colors, and will be referred to as a color (or color information) bitstream or a color (or color information) attribute bitstream.

According to embodiments, a second attribute bitstream includes attribute information corresponding to reflectance, and will be referred to as a reflectance (or reflectance information) bitstream or a reflectance (or reflectance information) attribute bitstream.

Figure 17:
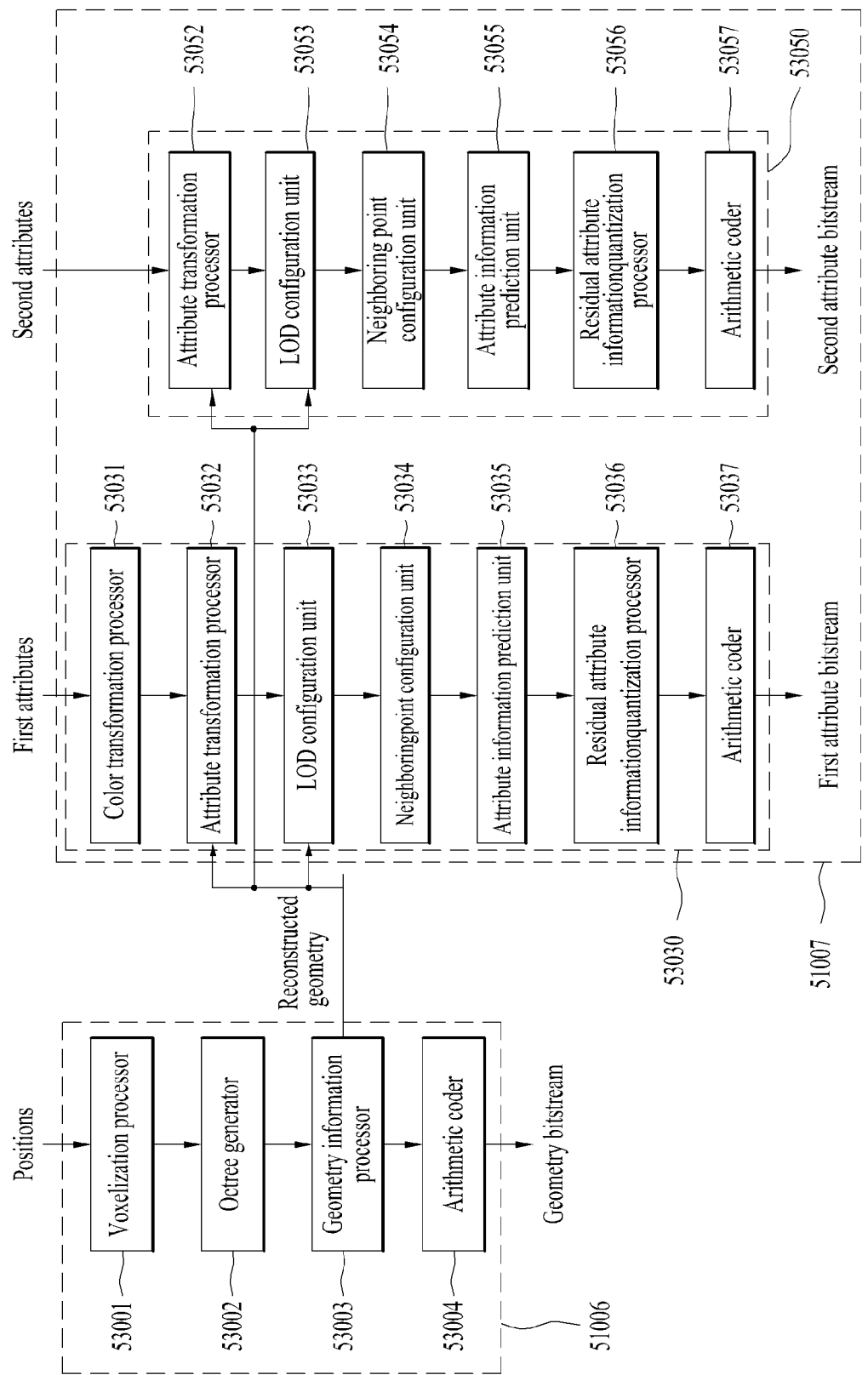
FIG. 17 illustrates an example of a geometry encoder and an attribute encoder according to embodiments.
Figure 18:
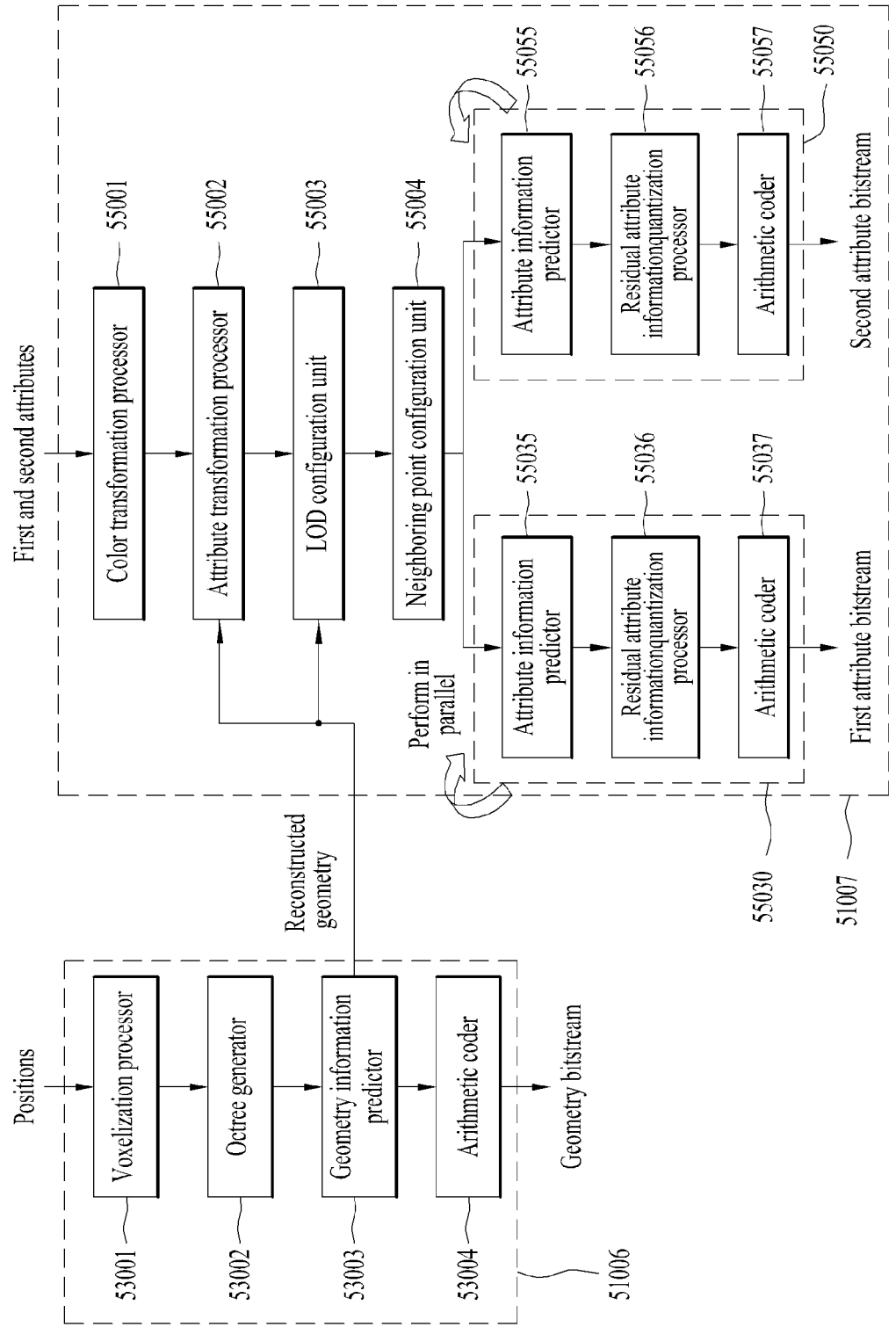
FIG. 18 illustrates another example of a geometry encoder and an attribute encoder according to embodiments.

FIGS. 17 and 18 are block diagrams illustrating embodiments of geometry encoding and attribute encoding when at least one point of point cloud data includes both a color attribute and a reflectance attribute.

According to embodiments, the color attribute and the reflectance attribute may be attribute-encoded, respectively (see FIG. 17), or may share some processing blocks (see FIG. 18).

FIG. 17 is a detailed block diagram illustrating an example of a geometry encoder 51006 and an attribute encoder 51007 according to embodiments. According to embodiments, the point cloud video encoder of FIG. 17 may include the geometry encoder 51006, a first attribute encoding unit 53030 configured to encode the color attribute, and a second attribute encoding unit 53050 configured to encode the reflectance attribute.

The voxelization processor 53001, the octree generator 53002, the geometry information predictor 53003, and the arithmetic coder 53004 of the geometry encoder 51006 of FIG. 17 may perform some or all of the operations of the octree analysis unit 40002, the surface approximation analysis unit 40003, the arithmetic encoder 40004, and the geometry reconstruction unit 40005 of FIG. 4, or may perform some or all of the operations of the voxelization processor 12002, the octree occupancy code generator 12003, and the surface model processor 12004, the intra/inter-coding processor 12005, and the arithmetic coder 12006 of FIG. 12

In an embodiment, a quantization processor may be further provided between the spatial partitioner 51004 and the voxelization processor 53001. The quantization processor quantizes positions of one or more 3D blocks (e.g., slices) spatially partitioned by the spatial partitioner 51004. In this case, the quantization processor may perform some or all of the operations of the quantization unit 40001 of FIG. 4, or perform some or all of the operations of the quantization processor 12001 of FIG. 12. When the quantization processor is further provided between the spatial partitioner 51004 and the voxelization processor 53001, the quantization processor 51003 of FIG. 15 may or may not be omitted.

The voxelization processor 53001 according to the embodiments performs voxelization based on the positions of the one or more spatially partitioned 3D blocks (e.g., slices) or the quantized positions thereof. Voxelization refers to the minimum unit expressing position information in a 3D space. Points of point cloud content (or 3D point cloud video) according to embodiments may be included in one or more voxels. According to embodiments, one voxel may include one or more points. In an embodiment, in the case where quantization is performed before voxelization is performed, a plurality of points may belong to one voxel.

In the present specification, when two or more points are included in one voxel, the two or more points are referred to as duplicated points. That is, in the geometry encoding process, overlapping points may be generated through geometry quantization and voxelization.

The voxelization processor 53001 according to the embodiments may output the duplicated points belonging to one voxel to the octree generator 53002 without merging the same, or may merge the multiple points into one point and output the merged point to the octree generator 53002. According to embodiments, even when the duplicated points are merged into one point, the merged one point may also have both a color attribute and a reflectance attribute.

The octree generator 53002 according to the embodiments generates an octree based on a voxel output from the voxelization processor 53001.

The geometry information predictor 53003 according to the embodiments predicts and compresses geometry information based on the octree generated by the octree generator 53002, and outputs the predicted and compressed information to the arithmetic coder 53004. In addition, the geometry information predictor 53003 reconstructs the geometry based on the positions changed through compression, and outputs the reconstructed (or decoded) geometry to a LOD configuration unit 53033 of the first attribute encoding unit 53030 and a LOD configuration unit 53053 of the second attribute encoding unit 53050. The reconstruction of the geometry information may be performed in a device or component separate from the geometry information predictor 53003. In another embodiment, the reconstructed geometry may also be provided to an attribute transformation processor 53032 of the first attribute encoding unit 53030 and/or an attribute transformation processor 53052 of the first attribute encoding unit 53050.

The first attribute encoding unit 53030 according to the embodiments may include a color transformation processor 53031, the attribute transformation processor 53032, the LOD configuration unit 53033, a neighbor set configuration unit 53034, an attribute information prediction unit 53035, a residual attribute information quantization processor 53036 and an arithmetic coder 53037.

The color transformation processor 53031 of the first attribute encoding unit 53030 corresponds to the color transformation unit 40006 of FIG. 4 or the color transformation processor 12008 of FIG. 12. The color transformation processor 53031 according to the embodiments performs color transformation coding of transforming color values (or textures) included in the attributes provided from the data input unit 51001 and/or the spatial partitioner 51004. For example, the color transformation processor 53031 may transform the format of color information (e.g., from RGB to YCbCr). The operation of the color transformation processor 53031 according to the embodiments may be optionally applied according to color values included in the attributes. In another embodiment, the color transformation processor 53031 may perform color transformation coding based on the reconstructed geometry. For details of the geometry reconstruction, refer to the description of FIGS. 1 to 9.

The attribute transformation processor 53032 according to the embodiments may perform attribute transformation of transforming attributes based on positions on which geometry encoding has not been performed and/or the reconstructed geometry.

The attribute transformation processor 53032 may be referred to as a recoloring unit.

The operation of the attribute transformation processor 53032 according to the embodiments may be optionally applied according to whether duplicated points are merged. According to an embodiment, merging of the duplicated points may be performed by the voxelization processor 53001 or the octree generator 53002 of the geometry encoder 51006.

In the present specification, when points belonging to one voxel are merged into one point in the voxelization processor 53001 or the octree generator 53002, the attribute transformation processor 53032 performs an attribute transformation.

The attribute transformation processor 53032 performs an operation and/or method identical or similar to the operation and/or method of the attribute transformation unit 40007 of FIG. 4 or the attribute transformation processor 12009 of FIG. 12.

According to embodiments, the geometry information reconstructed by the geometry information predictor 53003 and the color attribute information output from the attribute transformation processor 53032 are provided to the LOD configuration unit 53033 for attribute compression.

According to embodiments, the color attribute information output from the attribute transformation processor 53032 may be compressed by one or a combination of two or more of RAHT coding, LOD-based predictive transform coding, and lifting transform coding based on the reconstructed geometry information.

Hereinafter, it is assumed that color attribute compression is performed by one or a combination of the LOD-based predictive transform coding and the lifting transform coding as an embodiment. Thus, a description of the RAHT coding will be omitted. For details of the RAHT transform coding, refer to the descriptions of FIGS. 1 to 9.

The LOD configuration unit 53033 according to the embodiments generates a Level of Detail (LOD).

The LOD is a degree representing the detail of the point cloud content. As the LOD value decreases, it indicates that the detail of the point cloud content is degraded. As the LOD value increases, it indicates that the detail of the point cloud content is enhanced. Points may be classified according to the LOD.

In an embodiment, in the predictive transform coding and the lifting transform coding, points may be divided into LODs and grouped.

This operation may be referred to as an LOD generation process, and a group having different LODs may be referred to as an $LOD_l$ set. Here, l denotes the LOD and is an integer starting from 0. $LOD_0$ is a set consisting of points with the largest distance therebetween. As l increases, the distance between points belonging to $LOD_l$ decreases.

When the $LOD_l$ set is generated by the LOD configuration unit 53033, the neighbor point configuration unit 53034 according to the embodiment may find X (>0) nearest neighbor points in a group having the same or lower LOD (i.e., a large distance between nodes) based on the $LOD_l$ set and register the same in the predictor as a neighbor set. X is the maximum number of points that may be set as neighbors. X may be input as a user parameter, or be signaled in signaling information through the signaling processor 51005 (e.g., the lifting_num_pred_nearest_neighbours field signaled in the APS).

Referring to FIG. 9 as an example, neighbors of P3 belonging to $LOD_1$ are found in $LOD_0$ and $LOD_1$. For example, when the maximum number (X) of points that may be set as neighbors is 3, three nearest neighbor nodes of P3 may be P2 P4 P6. These three nodes are registered as in the predictor of P3 as a neighbor set. In an embodiment, among the registered nodes, the neighbor node P4 is the closest to P3 in terms of distance, then P6 is the next nearest node, and P2 is the farthest node among the three nodes. Here, X=3 is merely an embodiment configured to provide understanding of the present disclosure. The value of X may vary.

As described above, all points of the point cloud data may have a predictor.

The attribute information prediction unit 53035 according to the embodiments predicts an attribute value based on the neighbor points registered in the predictor. The predictor may have a registered neighbor set and register a "½ distance=weight" based on the distance from each neighbor point. For example, the predictor of node P3 has (P2 P4 P6) as a neighbor set and calculates the weight based on the distance from each neighbor point. According to embodiments, the weights of the respective neighbor points may be $(1/\sqrt{(P2-P3)^2}, 1/\sqrt{(P4-P3)^2}, 1/\sqrt{(P6-P3)^2})$.

According to embodiments, when a neighbor set of the predictor is set, the neighbor point configuration unit 53034 or the attribute information prediction unit 53035 may normalize the weights of the respective neighbor points by the total sum of the weights of the neighbor points.

For example, the weights of all neighbor points in the neighbor set of node P3 are added (total_weight=$1/\sqrt{(P2-P3)^2}+1/\sqrt{(P4-P3)^2}+1/\sqrt{(P6-P3)^2}$), and the weight of each neighbor point is divided by the sum of the weights ($1/\sqrt{(P2-P3)^2}$/total_weight, $1/\sqrt{(P4-P3)^2}$/total_weight, $1/\sqrt{(P6-P3)^2}$/total_weight). Thereby, the weight of each neighbor point is normalized Then, the attribute information prediction unit 53035 may predict a color attribute value through the predictor.

According to embodiments, the average of the values obtained by multiplying a color attribute of neighbor points registered in the predictor by a weight (or a normalized weight) may be set as a predicted result (i.e., a predicted attribute value) on the color attribute value. Alternatively, an attribute of a specific point may be set as a predicted result (i.e., a predicted attribute value). According to embodiments, the predicted attribute value may be referred to as predicted attribute information. In addition, a residual attribute value (or residual attribute information or residual) may be obtained subtracting the predicted attribute value (or predicted attribute information) of the point from the attribute value (i.e., the original attribute value) of the point.

According to embodiments, compressed result values may be pre-calculated by applying various prediction modes (or predictor indexes), and then a prediction mode (i.e., a predictor index) generating the smallest bitstream may be selected from among the prediction modes.

In this specification, a prediction mode has the same meaning as a predictor index (Preindex), and may be broadly referred to as a prediction method.

In an embodiment, the process of finding the most suitable prediction mode for each point and setting the found prediction mode in the predictor of the corresponding point may be performed by the attribute information prediction unit 53035.

According to embodiments, a prediction mode in which a predicted attribute value is calculated through a weighted average (i.e., an average obtained by multiplying the attributes of neighbor points set in the predictor of each point by a weight calculated based on the distance to each neighbor point) will be referred to as prediction mode 0. In addition, a prediction mode in which the attribute of the first neighbor point is set as a predicted attribute value will be referred to as prediction mode 1, a prediction mode in which the attribute of the second neighbor point is set as a predicted attribute value will be referred to as prediction mode 2, and a prediction mode in which the attribute of the third neighbor point is set as a predicted attribute value will be referred to as prediction mode 3. In other words, the value of the prediction mode (or predictor index) equal to 0 may indicate that the attribute value is predicted through the weighted average, and the value equal to 1 may indicate that the attribute value is predicted through the first neighbor node (i.e., the neighbor point). The value equal to 2 may indicate that the attribute value is predicted through the second neighbor node, and the value equal to 3 may indicate that the attribute value is predicted through the third neighboring node.

According to embodiments, a residual attribute value in prediction mode 0, a residual attribute value in prediction mode 1, a residual attribute value in prediction mode 2, and a residual attribute value in prediction mode 3 may be calculated, and a score or double score may be calculated based on each residual attribute value. Then, a prediction mode having the least calculated score may be selected and set as a prediction mode of the corresponding point.

According to embodiments, the process of finding the most suitable prediction mode among a plurality of prediction modes and setting the same as a prediction mode of a corresponding point may be performed when a preset condition is satisfied. Accordingly, when the preset condition is not satisfied, a fixed (or pre-defined) prediction mode, e.g., prediction mode 0, in which a prediction attribute value is calculated through a weighted average, may be set as the prediction mode of the point without performing the process of finding the most suitable prediction mode. In an embodiment, this process is performed for each point.

According to embodiments, the preset condition may be satisfied for a specific point when the difference in attribute elements (e.g., R, G, B) between neighbor points registered in the predictor of a point is greater than or equal to a preset threshold (e.g., lifting_adaptive_prediction_threshold), or when the differences in attribute elements (e.g., R, G, B) between the neighbor points registered in the predictor of the point are calculated, and the sum of the largest differences for the elements is greater than or equal to a preset threshold. For example, suppose that point P3 is the specific point, and points P2, P4, and P6 are registered as neighbor points of point P3. Additionally, suppose that, when differences in R, G, and B values between points P2 and P4, differences in R, G, and B values between points P2 and P6, and differences in R, G, and B values between points P4 and P6 are calculated, the largest difference in R value is obtained between points P2 and P4, the largest difference in G value is obtained between points P4 and P6, and the largest difference in B value is obtained between points P2 and P6. In addition, suppose that the difference in R value between points P2 and P4 is the largest among the largest difference in R value (between P2 and P4) and the largest difference in G value (between P4 and P6), and the largest difference in B value (between P2 and P6).

On these assumptions, when the difference in R value between points P2 and P4 is greater than or equal to a preset threshold, or when the sum of the difference in R value between points P2 and P4, the difference in G value between points P4 and P6, and the difference in B value between points P2 and P6 is greater than or equal to a preset threshold, a process of finding the most suitable prediction mode among a plurality of candidate prediction modes may be performed. In addition, the prediction mode (e.g., predIndex) may be signaled only when the difference in R value between points P2 and P4 is greater than or equal to a preset threshold, or the sum of the difference in R value between points P2 and P4, the difference in G value between points P4 and P6, and the difference in B value between points P2 and P6 is greater than or equal to a preset threshold.

According to embodiments, the selected prediction mode (e.g., predIndex) of the point may be signaled in attribute slice data for the color attribute. In this case, the residual attribute value acquired based on the selected prediction mode may be transmitted. On the receiving side, a predicted attribute value of the point may be estimated based on the signaled prediction mode, and added to the received residual attribute value to restore the color attribute value of the point. In another embodiment, in the case where the prediction mode is not signaled, the transmitting side may estimate a predicted attribute value based on a predefined (or default) prediction mode (e.g., prediction mode 0), and estimate and transmit a residual attribute value as the difference between the original attribute value and the predicted attribute value. On the receiving side, a predicted attribute value may be estimated based on the predefined (or default) prediction mode (e.g., prediction mode 0) and added to the received residual attribute value to restore the color attribute value of the point.

According to embodiments, the threshold may be directly input or signaled in the signaling information through the signaling processor 51005 (e.g., the lifting_adaptive_prediction_threshold field signaled in the APS).

According to embodiments, when a preset condition is satisfied for a specific point as described above, predictor candidates may be generated. The predictor candidates are referred to as prediction modes or predictor indexes.

According to embodiments, prediction modes 1 to 3 may be included in the predictor candidates. According to embodiments, prediction mode 0 may or may not be included in the predictor candidates. According to embodiments, at least one prediction mode not mentioned above may be further included in the predictor candidates.

The prediction mode set for each point through the above-described process and the residual attribute value in the set prediction mode are output to the residual attribute information quantization processor 53036.

According to embodiments, the residual attribute information quantization processor 53036 may apply zero run-length coding to the input residual attribute values.

According to an embodiment of the present disclosure, quantization and zero run-length coding may be performed on the residual attribute values.

According to embodiments, the arithmetic coder 53037 applies arithmetic coding to the prediction modes and residual attribute values output from the residual attribute information quantization processor 53036 and outputs the result as an attribute bitstream (i.e., color attribute bitstream).

The second attribute encoding unit 53050 according to the embodiments may include an attribute transformation processor 53052, an LOD configuration unit 53053, a neighbor set configuration unit 53054, an attribute information prediction unit 53055, a residual attribute information quantization processor 53056, and an arithmetic coder 53057.

According to embodiments, the second attribute encoding unit 53050 encodes the reflectance attribute as an embodiment. Accordingly, the color transformation processor may be omitted. The operations of the attribute transformation processor 53052, the LOD configuration unit 53053, and the neighbor set configuration unit 53054 of the second attribute encoding unit 53050 are identical or similar to the operations of the attribute transformation processor 53032, the LOD configuration unit 53033, and the neighbor set configuration unit 53034 of the first attribute encoding unit 53030, and thus a detailed description thereof will be omitted.

The attribute information prediction unit 53055 according to the embodiments predicts a reflectance attribute value based on the neighbor points registered in the predictor.

According to embodiments, the average of the values obtained by multiplying the reflectance attributes of the neighbor points registered in the predictor by a weight (or normalized weight) may be set as a predicted result (i.e., a predicted attribute value) for the reflectance attribute values, or the attribute of a specific point may be set as a predicted result (i.e., a predicted attribute value). In addition, the residual attribute value (or residual attribute information or residual) may be obtained by subtracting the predicted result (referred to as a predicted attribute value or predicted attribute information) of the point from the attribute value (i.e., the original attribute value) of the point.

According to embodiments, compressed result values may be pre-calculated by applying various prediction modes (or predictor indexes), and then a prediction mode (i.e., a predictor index) generating the smallest bitstream may be selected from among the prediction modes.

In an embodiment, the process of finding the most suitable prediction mode for each point and setting the found prediction mode in the predictor of the corresponding point may be performed by the attribute information prediction unit 53055.

According to embodiments, a residual attribute value in prediction mode 0, a residual attribute value in prediction mode 1, a residual attribute value in prediction mode 2, and a residual attribute value in prediction mode 3 may be calculated, and a score (or double score) may be calculated based on each residual attribute value. Then, a prediction mode having the lowest calculated score may be selected and set as a prediction mode of the corresponding point.

According to embodiments, the process of finding the most suitable prediction mode among a plurality of prediction modes and setting the same as a prediction mode of a corresponding point may be performed when a preset condition is satisfied. Accordingly, when the preset condition is not satisfied, a predefined prediction mode, e.g., prediction mode 0, in which a prediction attribute value is calculated through a weighted average, may be set as the prediction mode of the point without performing the process of finding the most suitable prediction mode. In an embodiment, this process is performed for each point.

According to embodiments, the preset condition may be satisfied for a specific point when the maximum difference in attribute (e.g., reflectance) between neighbor points registered in the predictor of the point is greater than or equal to a preset threshold (e.g., lifting_adaptive_prediction_threshold). For example, suppose that, when the difference in reflectance between points P2 and P4, the difference in reflectance between points P2 and P6, and the difference in reflectance between points P4 and P6 are obtained, the difference in reflectance between points P2 and P4 is the largest.

Under this assumption, when the difference in reflectance between points P2 and P4 is greater than or equal to a preset threshold, a process of finding the most suitable prediction mode among a plurality of candidate prediction modes may be performed. In addition, the prediction mode (e.g., predIndex) may be signaled only when the difference in reflectance between points P2 and P4 is greater than or equal to the preset threshold.

According to embodiments, the prediction mode (e.g., predIndex) of the point may be signaled in attribute slice data for the reflectance attribute. In this case, the residual attribute value acquired based on the selected prediction mode may be transmitted. On the receiving side, a predicted attribute value of the point may be estimated based on the signaled prediction mode, and added to the received residual attribute value to restore the reflectance attribute value of the point. In another embodiment, in the case where the prediction mode is not signaled, the transmitting side may estimate a predicted attribute value based on a predefined (or default) prediction mode (e.g., prediction mode 0), and estimate and transmit a residual attribute value as the difference between the original attribute value and the predicted attribute value. On the receiving side, a predicted attribute value may be estimated based on the predefined (or default) prediction mode (e.g., prediction mode 0) and added to the received residual attribute value to restore the reflectance attribute value of the point.

According to embodiments, the threshold may be directly input or signaled in the signaling information through the signaling processor 51005 (e.g., the lifting_adaptive_prediction_threshold field signaled in the APS).

According to embodiments, when a preset condition is satisfied for a specific point as described above, predictor candidates may be generated. The predictor candidates are referred to as prediction modes or predictor indexes.

According to embodiments, prediction modes 1 to 3 may be included in the predictor candidates. According to embodiments, prediction mode 0 may or may not be included in the predictor candidates. According to embodiments, at least one prediction mode not mentioned above may be further included in the predictor candidates.

The prediction mode set for each point by the attribute information prediction unit 53055 through the above-described process and the residual attribute value in the set prediction mode are output to the residual attribute information quantization processor 53056.

According to embodiments, the residual attribute information quantization processor 53056 may apply zero run-length coding to the input residual attribute values.

According to an embodiment of the present disclosure, quantization and zero run-length coding may be performed on the residual attribute values.

According to embodiments, the arithmetic coder 53057 applies arithmetic coding to the prediction modes and residual attribute values output from the residual attribute information quantization processor 53056, and outputs the result as a second attribute bitstream (i.e., reflectance attribute bitstream).

The geometry bitstream output from the geometry encoder 51006, the first attribute bitstream output from the first attribute encoding unit 53030, and the second attribute bitstream output from the second attribute encoding unit 53050 are output to the transmission processor 51008.

The transmission processor 51008 according to the embodiments may perform an operation and/or transmission method identical or similar to the operation and/or transmission method of the transmission processor 12012 of FIG. 12, and perform an operation and/or transmission method identical or similar to the operation and/or transmission method of the transmitter 10003 of FIG. 1. For details, reference will be made to the description of FIG. 1 or 12.

The transmission processor 51008 according to the embodiments may transmit the geometry bitstream output from the geometry encoder 51006, the first attribute bitstream output from the first attribute encoding unit 53030, and the second attribute bitstream output from the second attribute encoding unit 53050, and the signaling bitstream output from the signaling processor 51005, respectively, or may multiplex the bitstreams into one bitstream to be transmitted.

The transmission processor 51008 according to the embodiments may encapsulate the bitstream into a file or segment (e.g., a streaming segment) and then transmit the encapsulated bitstream over various networks such as a broadcasting network and/or a broadband network.

Recently, LiDAR equipment configured to capture both color information and reflectance information is increasing. When the area covered by the captured point cloud data is large and the density and the number of attributes increase, the amount of data on which attribute encoding/decoding is performed may also increase, and thus efficient processing may be required. That is, there may be a need for a method for efficiently processing an attribute encoding/decoding process of fused point cloud data in which at least one point has a plurality of attributes, for example, both a color attribute and a reflectance attribute.

According to embodiments, if the configuration for LOD generation and maximum number of neighbors for both attributes are same, the result from a common process can be shared. This can save encoding and decoding time or computation power and redundant memory usage.

FIG. 18 is a detailed block diagram showing an example of the geometry encoder 51006 and the attribute encoder 51007 according to embodiments, which illustrates processing of an attribute transformation processor 55002, an LOD configuration unit 55003, a neighbor set configuration unit 55004 and sharing of the result thereof in encoding the color attribute and the reflectance attribute.

In FIG. 18, the description of the geometry encoder 51006 is the same as that of FIG. 17, and thus a detailed description thereof is omitted. In the attribute encoder 51007, the color transformation processor 55001 corresponds to the color transformation processor 53031 of FIG. 17, the color transformation unit 40006 of FIG. 4, or the color transformation processor 12008 of FIG. 12.

According to embodiments, the color attribute of a specific point output from the spatial partitioner 51004 may be provided to the attribute transformation processor 55002 after the color is transformed by the color transformation processor 55001, and the reflectance attribute of the point may be directly provided to the attribute transformation processor 55002, bypassing the color transformation processor 55001.

The attribute transformation processor 55002 according to the embodiments may perform attribute transformation of transforming the color and reflectance attributes based on positions on which geometry encoding has not been performed and/or the reconstructed geometry.

According to embodiments, when the geometry encoder 51006 performs lossy geometry encoding, that is, quantizes geometry information, the geometry information is changed because one or more points may have the same quantized position (or position value). Accordingly, the attribute transformation processor 55002 may perform a process of re-adjusting the attributes to a color attribute and reflectance attribute suitable for the changed geometry information.

According to embodiments, the attribute transformation processor 55002 may transform a color attribute and a reflectance attribute of a position of one or more quantized points or a position obtained by merging one or more points included in a voxel.

According to embodiments, the attribute transformation processor 55002 may readjust the color attribute and reflectance attribute of geometry information changed through quantization based on the color attribute and reflectance attribute output from the spatial partitioner 51004 or the color transformation processor 55001.

According to embodiments, neighbor points neighboring a point whose geometry information is quantized may be found in point cloud data (i.e., original point cloud data) whose geometry information is not quantized, and color and reflectance may be readjusted to average values obtained by applying a distance-based weight to the found points. For example, the average of color values of neighbor points within a specific position/radius from the position of the center point of each voxel may be calculated by applying a distance-based weight, and then color attribute transformation may be performed thereon. As another example, the average of reflectance values of neighbor points within a specific position/radius from the position of the center point of each voxel may be calculated by applying a distance-based weight, and then reflectance attribute transformation may be performed thereon.

In the attribute transformation process of the attribute transformation processor 55002 according to the embodiments, the operation on which the most time is spent is to finding neighbor points. However, since the color information and the reflectance information are generated from the same geometry information, the neighbor points found for color attribute transformation are the same as the neighbor points found for reflectance attribute transformation.

Therefore, the attribute transformation processor 55002 may share the result of finding neighbor points for color attribute transformation and reflectance attribute transformation. In another embodiment, when the processing capability (CPU, memory, etc.) of the encoder or decoder is sufficient to allocate the attributes to different processes and parallelize the processes, finding neighbor points may be performed for each attribute.

In the lossy geometry encoding according to embodiments, the attribute transformation processor 55002 is one of modules that take a lot of time in the encoding/decoding process, and may take about 20% or more of the total execution time.

In the present disclosure, as the result of finding neighbor points is shared for transformation of the color attribute and transformation of the reflectance attribute in the attribute transformation processor 55002, the time for encoding may be shortened.

According to embodiments, the attribute information (i.e., the readjusted color information and reflectance information) output from the attribute transformation processor 55002 is output to the LOD configuration unit 55003, which generates an LOD based on the reconstructed geometry information.

According to embodiments, when attribute encoding is performed the technique of predicting/lifting transform, the LOD configuration unit 55003 generates LODs by sorting all points of the reconstructed geometry information based on a Morton code. That is, since the process of generating LODs incudes the process of re-sorting the points in the order of Morton codes, the LOD configuration unit is one of modules that take a lot of time in the encoding/decoding process, and may take about 20% of the total execution time.

Since the color information and the reflectance information are generated from the same geometry information, and the LOD generation process is performed based on the geometry information, LOD generation for a color attribute and a reflectance attribute and a result thereof may be shared. This is because the same result is obtained from the LOD processes for the different attributes. In another embodiment, when the processing capability (CPU, memory, etc.) of the encoder or decoder is sufficient to allocate and parallelize different processes for the respective attributes, LOD generation may be performed for each attribute.

In the present disclosure, as the LOD configuration unit 55003 shares LOD generation for the color attribute and the reflectance attribute and the result thereof, the encoding time may be shortened.

When an $LOD_1$ set is generated by the LOD configuration unit 55003, the neighbor set configuration unit 55004 according to the embodiment may find X (>0) nearest neighbor points in a group having the same or lower LOD (i.e., a large distance between nodes) based on the $LOD_1$ set and register the same in the predictor as a neighbor set. X is the maximum number of points that may be set as neighbors. X may have a fixed value or may be received as a user parameter.

However, the process of generating a neighbor set in the neighbor set configuration unit 55004 is one of modules that take a lot of time in the encoding/decoding process, and may take approximately 20% of the total execution time.

Since the color information and the reflectance information are generated from the same geometry information, and the process of finding neighbor points is performed based on the geometry information, finding neighbor points for a color attribute and a reflectance attribute and a result thereof may be shared. This is because the same result is obtained from the process of finding neighbor points for the different attributes. In another embodiment, when the processing capability (CPU, memory, etc.) of the encoder or decoder is sufficient to allocate and parallelize different processes for the respective attributes, the process of finding neighbor points may be performed for each attribute.

In the present disclosure, as the neighbor set configuration unit 55004 shares the neighbor set generation process for the color attribute and the reflectance attribute and the result thereof, the encoding time may be shortened.

In FIG. 18, according to an embodiment of the present disclosure, when the first attribute is defined as a color attribute and the second attribute is defined as a reflectance attribute, the operation of finding neighbor points by the attribute transformation processor 55002 and the result thereof, the LOD generation by the LOD configuration unit 55003 and the result thereof, and the operation of finding neighbor points by the neighbor set configuration unit 55004 and the result of neighbor set registration may be shared for the color attribute and the reflectance attribute.

This may mean that the LODs generated based on the reconstructed geometry information and the neighbor points of the reflectance attribute and the color attribute registered in the predictor of the point to be predicted are all the same.

However, since the prediction mode of the point and the residual attribute value according to the prediction mode may vary according to the color attribute and the reflectance attribute, blocks for obtaining and encoding the prediction mode and the residual attribute value are provided for each of the color attribute and the reflectance attribute.

To this end, the attribute encoder 51007 of FIG. 18 may include a first compressor 55030 configured to compress the color attribute and a second compressor 55050 configured to compress the reflectance attribute.

The first compressor 55030 according to the embodiments may include an attribute information compressor 55035, a residual attribute information quantization processor 55036, and an arithmetic coder 55037.

The attribute information prediction unit 55035 according to the embodiments predicts a color attribute value based on the neighbor points registered in the predictor.

According to embodiments, the attribute information prediction unit 55035 may obtain a residual attribute value in prediction mode 0, a residual attribute value in prediction mode 1, a residual attribute value in prediction mode 2, and a residual attribute value in prediction mode 3, and calculate a score or double score based on each residual attribute value. Then, it may select and set a prediction mode having the lowest calculated score as a prediction mode of the point.

According to embodiments, when a preset condition is satisfied, the attribute information prediction unit 55035 may perform the process of finding the most suitable prediction mode among a plurality of prediction modes and setting the same as a prediction mode of a corresponding point may be performed. Accordingly, when the preset condition is not satisfied, a predefined prediction mode, e.g., prediction mode 0, in which a prediction attribute value is calculated through a weighted average, may be set as the prediction mode of the point without performing the process of finding the most suitable prediction mode. In an embodiment, this process is performed for each point.

According to embodiments, the preset condition may be satisfied for a specific point when the difference in attribute elements (e.g., R, G, B) between neighbor points registered in the predictor of a point is greater than or equal to a preset threshold (e.g., lifting_adaptive_prediction_threshold), or when the differences in attribute elements (e.g., R, G, B) between the neighbor points registered in the predictor of the point are calculated, and the sum of the largest differences in the elements is greater than or equal to a preset threshold. Only in this case, the prediction mode (e.g., predIndex) may be signaled.

According to embodiments, the prediction mode (e.g., predIndex) of the point may be signaled in attribute slice data for the color attribute. In this case, the residual attribute value acquired based on the selected prediction mode may be transmitted. On the receiving side, a predicted attribute value of the point may be estimated based on the signaled prediction mode, and added to the received residual attribute value to restore the color attribute value of the point. In another embodiment, in the case where the prediction mode is not signaled, the transmitting side may estimate a predicted attribute value based on a default (or predefined) prediction mode (e.g., prediction mode 0), and estimate and transmit a residual attribute value as the difference between the original attribute value and the predicted attribute value. On the receiving side, a predicted attribute value may be estimated based on the default (or predefined) prediction mode (e.g., prediction mode 0) and added to the received residual attribute value to restore the color attribute value of the point.

According to embodiments, the threshold may be directly input or signaled in the signaling information through the signaling processor 51005 (e.g., the lifting_adaptive_prediction_threshold field signaled in the APS).

The prediction mode set for each point by the attribute information prediction unit 55035 through the above-described process and the residual attribute value in the set prediction mode are output to the residual attribute information quantization processor 55036.

According to embodiments, the residual attribute information quantization processor 55036 may apply zero run-length coding to the input residual attribute values.

According to an embodiment of the present disclosure, quantization and zero run-length coding may be performed on the residual attribute values.

The arithmetic coder 55037 according to the embodiments applies arithmetic coding to the prediction modes and residual attribute values output from the residual attribute information quantization processor 55036, and outputs the result as a first attribute bitstream (i.e., a color attribute bitstream).

The second compressor 55050 according to the embodiments may include an attribute information compressor 55055, a residual attribute information quantization processor 55056, and an arithmetic coder 55057.

The attribute information prediction unit 55055 according to the embodiments predicts a reflectance attribute value based on the neighbor points registered in the predictor by the neighbor set configuration unit 55004.

According to embodiments, the attribute information prediction unit 55055 may obtain a residual attribute value in prediction mode 0, a residual attribute value in prediction mode 1, a residual attribute value in prediction mode 2, and a residual attribute value in prediction mode 3, and calculate a score or double score based on each residual attribute value. Then, it may select and set a prediction mode having the lowest calculated score as a prediction mode of the point.

According to embodiments, when a preset condition is satisfied, the attribute information prediction unit 55055 may perform the process of finding the most suitable prediction mode among a plurality of prediction modes and setting the same as a prediction mode of a corresponding point may be performed. Accordingly, when the preset condition is not satisfied, a predefined prediction mode, e.g., prediction mode 0, in which a prediction attribute value is calculated through a weighted average, may be set as the prediction mode of the point without performing the process of finding the most suitable prediction mode. In an embodiment, this process is performed for each point.

According to embodiments, the preset condition may be satisfied for a specific point when the maximum difference in attribute value (e.g., reflectance) between the neighbor points registered in the predictor of the corresponding point is greater than or equal to a preset threshold (e.g., lifting_adaptive_prediction_threshold). Only in this case, the prediction mode (e.g., predIndex) may be signaled.

According to embodiments, the prediction mode (e.g., predIndex) of the point may be signaled in attribute slice data for the reflectance attribute. In this case, the residual attribute value acquired based on the selected prediction mode may be transmitted. On the receiving side, a predicted attribute value of the point may be estimated based on the signaled prediction mode, and added to the received residual attribute value to restore the reflectance attribute value of the point. In another embodiment, in the case where the prediction mode is not signaled, the transmitting side may estimate a predicted attribute value based on a default (or predefined) prediction mode (e.g., prediction mode 0), and estimate and transmit a residual attribute value as the difference between the original attribute value and the predicted attribute value. On the receiving side, a predicted attribute value may be estimated based on the default (or predefined) prediction mode (e.g., prediction mode 0) and added to the received residual attribute value to restore the reflectance attribute value of the point.

According to embodiments, the threshold may be directly input or signaled in the signaling information through the signaling processor 51005 (e.g., the lifting_adaptive_prediction_threshold field signaled in the APS).

The prediction mode set for each point by the attribute information prediction unit 55055 through the above-described process and the residual attribute value in the set prediction mode are output to the residual attribute information quantization processor 55056.

According to embodiments, the residual attribute information quantization processor 55056 may apply zero run-length coding to the input residual attribute values.

According to an embodiment of the present disclosure, quantization and zero run-length coding may be performed on the residual attribute values.

The arithmetic coder 55057 according to the embodiments applies arithmetic coding to the prediction modes and residual attribute values output from the residual attribute information quantization processor 55056, and outputs the result as a second attribute bitstream (i.e., a reflectance attribute bitstream).

FIG. 18 illustrates a case where at least one point has a color attribute and a reflectance attribute according to an embodiment. When at least one point has an additional attribute, the attribute transformation processor 55002, the LOD configuration unit 55003, and the neighbor set configuration unit 55004 may share the additional attribute as well, and a compressor for the prediction mode and residual attribute values may be separately provided.

As described above, as the operation of finding neighbor points by the attribute transformation processor 55002 and the result thereof, the LOD generation by the LOD configuration unit 55003 and the result thereof, and the operation of finding neighbor points by the neighbor set configuration unit 55004 and the result thereof for multiple attributes are shared, the time for encoding attributes may be shortened, and power consumption and redundant memory usage may be reduced.

The geometry bitstream output from the geometry encoder 51006, the first attribute bitstream output from the first compressor 55030, and the second attribute bitstream output from the second compressor 55050 are output to the transmission processor 51008.

The transmission processor 51008 according to the embodiments may perform an operation and/or transmission method identical or similar to the operation and/or transmission method of the transmission processor 12012 of FIG. 12, and perform an operation and/or transmission method identical or similar to the operation and/or transmission method of the transmitter 10003 of FIG. 1. For details, reference will be made to the description of FIG. 1 or 12.

The transmission processor 51008 according to the embodiments may transmit the geometry bitstream output from the geometry encoder 51006, the first attribute bitstream output from the first compressor 55030, and the second attribute bitstream output from the second compressor 55050, and the signaling bitstream output from the signaling processor 51005, respectively, or may multiplex the bitstreams into one bitstream to be transmitted.

The transmission processor 51008 according to the embodiments may encapsulate the bitstream into a file or segment (e.g., a streaming segment) and then transmit the encapsulated bitstream over various networks such as a broadcasting network and/or a broadband network.

The signaling processor 51005 according to the embodiments may generate and/or process signaling information and output the same to the transmission processor 51008 in the form of a bitstream. The signaling information generated and/or processed by the signaling processor 51005 will be provided to the geometry encoder 51006, the attribute encoder 51007, and/or the transmission processor 51008 for geometry encoding, attribute encoding, and transmission processing. Alternatively, the signaling processor 51005 may receive signaling information generated by the geometry encoder 51006, the attribute encoder 51007, and/or the transmission processor 51008.

In the present disclosure, the signaling information may be signaled and transmitted on a per parameter set (sequence parameter set (SPS), geometry parameter set (GPS), attribute parameter set (APS), tile parameter set (TPS), or the like) basis. Also, it may be signaled and transmitted on the basis of a coding unit of each image, such as slice or tile. In the present disclosure, signaling information may include metadata (e.g., set values) related to point cloud data, and may be provided to the geometry encoder 51006, the attribute encoder 51007, and/or the transmission processor 51008 for geometry encoding, attribute encoding, and transmission processing. Depending on the application, the signaling information may also be defined at the system side, such as a file format, dynamic adaptive streaming over HTTP (DASH), or MPEG media transport (MMT), or at the wired interface side, such as high definition multimedia interface (HDMI), Display Port, Video Electronics Standards Association (VESA), or CTA.

A method/device according to the embodiments may signal related information to add/perform an operation of the embodiments. The signaling information according to the embodiments may be used in a transmission device and/or a reception device.

According to embodiments, in the present disclosure, attribute encoding may be performed by fixing one of the attribute encoder as illustrated in FIG. 17 or the attribute encoder as illustrated in FIG. 18.

According to embodiments, independent attribute encoding for each attribute through the attribute encoder of FIG. 17 or attribute encoding in which some processing results are shared through the attribute encoder of FIG. 18 may be selectively performed according to the processing capability of the attribute encoder and/or the attribute decoder. According to embodiments, whether the attribute transformation processor, the LOD configuration unit, and the neighbor set configuration unit independently operate for a plurality of attributes may be signaled in a recommended scheme. The recommendation scheme may be applied by the point cloud video decoder according to the processing capability of the equipment, and/or the characteristics of the content, and/or the workload at the corresponding time.

According to an embodiment of the present disclosure, information indicating whether some processing operations are shared or independently performed in attribute encoding and decoding is signaled in signaling information. In present disclosure, the information indicating whether some processing operations are shared or independently performed in attribute encoding and decoding is referred to as an attribute processing method (attribute_recommendedshared_result_flag) for the fused point cloud. The attribute processing method (attribute_recommendedshared_result_flag) for the fused point cloud according to the embodiments may specify whether to recommend independent execution when at least one point has a plurality of attributes.

According to embodiments, the fused point cloud attribute processing method (attribute_recommendedshared_result_flag) may be signaled in at least one of a sequence parameter set, an attribute parameter set, a tile parameter set, or an attribute slice header.

According to an embodiment of the present disclosure, information on the maximum number of predictors to be used for attribute prediction (lifting_max_num_direct_predictors), threshold information for enabling adaptive prediction of an attribute (lifting_adaptive_prediction_threshold), and the like may be signaled in at least one of a sequence parameter set, an attribute parameter set, a tile parameter set, or an attribute slice header. In addition, according to an embodiment, predictor index information (predIndex) indicating a prediction mode corresponding to a predictor candidate selected from among a plurality of predictor candidates may be signaled in attribute slice data.

Similar to the point cloud video encoder of the transmission device described above, the point cloud video decoder of the reception device performs the same or similar process of generating an $LOD_1$ set, finding the nearest neighbor points based on the $LOD_1$ set and registering the same in the predictor as a neighbor point set, calculating a weight based on a distance from each neighbor point, and performing normalization with the weight. Then, the decoder decodes a received prediction mode, and predicts an attribute value of the point according to the decoded prediction mode. In addition, after the received residual attribute value is decoded, the decoded residual attribute value may be added to the predicted attribute value to restore the attribute value of the point.

When at least one point has a plurality of attributes, for example, a color attribute and a reflectance attribute, the color attribute value and the reflectance attribute value may be restored independently or restored by sharing some processing results for the color attribute bitstream and the reflectance attribute bitstream.

According to embodiments, the first attribute bitstream includes attribute information (residual attribute values) corresponding to a color, and will be referred to as a color (or color information) bitstream or a color (or color information) attribute bitstream.

According to embodiments, the second attribute bitstream includes attribute information (i.e., residual attribute values) corresponding to reflectance, and will referred to as a reflectance (or reflectance information) bitstream or a reflectance (or reflectance information) attribute bitstream.

Figure 19:
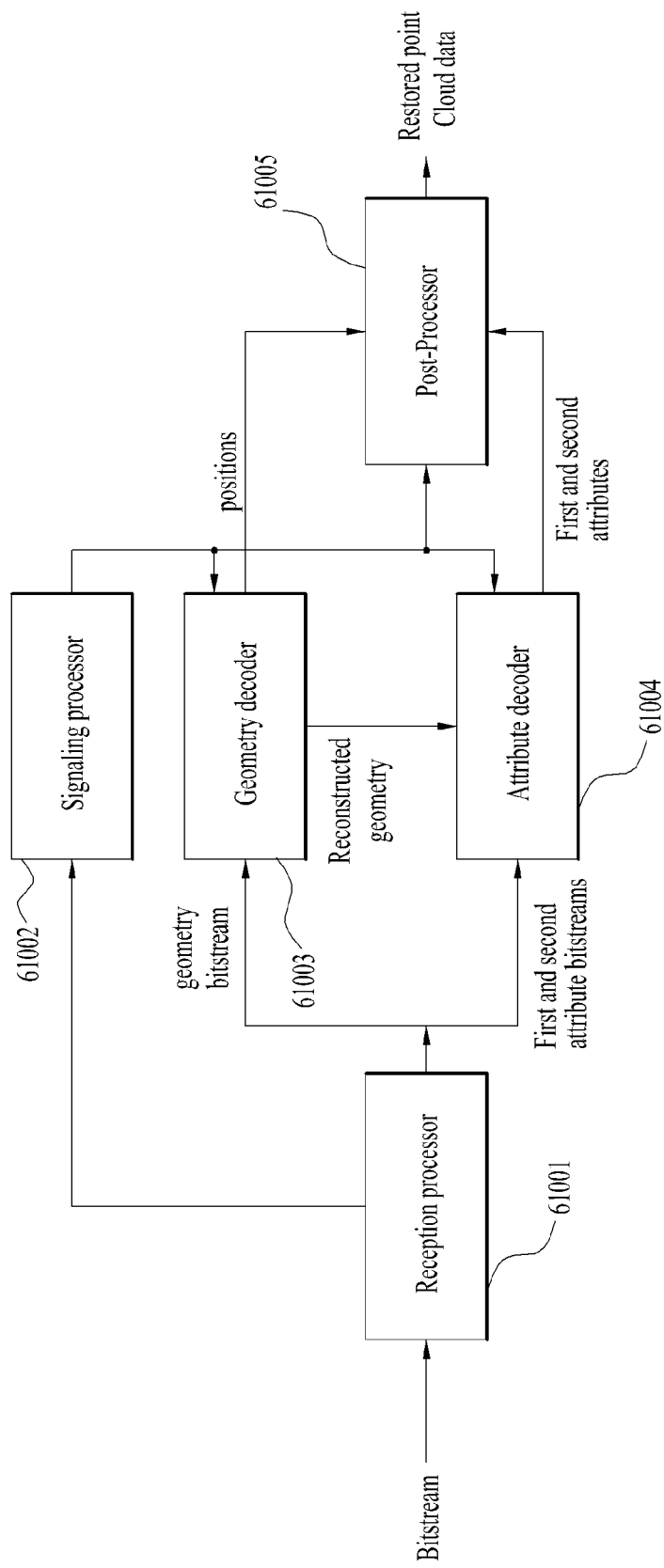
FIG. 19 illustrates an example of a point cloud reception device according to embodiments.

FIG. 19 is a diagram showing another exemplary point cloud reception device according to embodiments. FIG. 19 is an example for restoring point cloud data by receiving a geometry bitstream, a first attribute bitstream, a second attribute bitstream, and/or signaling bitstream.

The point cloud reception device according to the embodiments may include a reception processor 61001, a signaling processor 61002, a geometry decoder 61003, an attribute decoder 61004, and a post-processor 61005. According to embodiments, the geometry decoder 61003 and the attribute decoder 61004 may be referred to as a point cloud video decoder. According to embodiments, the point cloud video decoder may be referred to as a PCC decoder, a PCC decoding unit, a point cloud decoder, a point cloud decoding unit, or the like.

The reception processor 61001 according to the embodiments may receive a single bitstream, or may receive a geometry bitstream, a first attribute bitstream, a second attribute bitstream, and a signaling bitstream, respectively. When a file and/or segment is received, the reception processor 61001 according to the embodiments may decapsulate the received file and/or segment and output the decapsulated file and/or segment as a bitstream.

When the single bitstream is received (or decapsulated), the reception processor 61001 according to the embodiments may demultiplex the geometry bitstream, the first attribute bitstream, the second attribute bitstream, and/or the signaling bitstream from the single bitstream. The reception processor 61001 may output the demultiplexed signaling bitstream to the signaling processor 61002, the geometry bitstream to the geometry decoder 61003, and the first and second attribute bitstreams to the attribute decoder 61004.

When the geometry bitstream, the first and second attribute bitstreams, and/or the signaling bitstream are received (or decapsulated), respectively, the reception processor 61001 according to the embodiments may deliver the signaling bitstream to the signaling processor 61002, the geometry bitstream to the geometry decoder 61003, and the first and second attribute bitstreams to the attribute decoder 61004.

The signaling processor 61002 may parse signaling information, for example, information contained in the SPS, GPS, APS, TPS, metadata, or the like from the input signaling bitstream, process the parsed information, and provide the processed information to the geometry decoder 61003, the attribute decoder 61004, and the post-processor 61005. In another embodiment, signaling information contained in the geometry slice header and/or the attribute slice header may also be parsed by the signaling processor 61002 before decoding of the corresponding slice data. That is, when the point cloud data is partitioned into tiles and/or slices at the transmitting side as shown in FIG. 16, the TPS includes the number of slices included in each tile, and accordingly the point cloud video decoder according to the embodiments may check the number of slices and quickly parse the information for parallel decoding.

Accordingly, the point cloud video decoder according to the present disclosure may quickly parse a bitstream containing point cloud data as it receives an SPS having a reduced amount of data. The reception device may decode tiles upon receiving the tiles, and may decode each slice based on the GPS and APS included in each tile. Thereby, decoding efficiency may be maximized.

Figure 20:
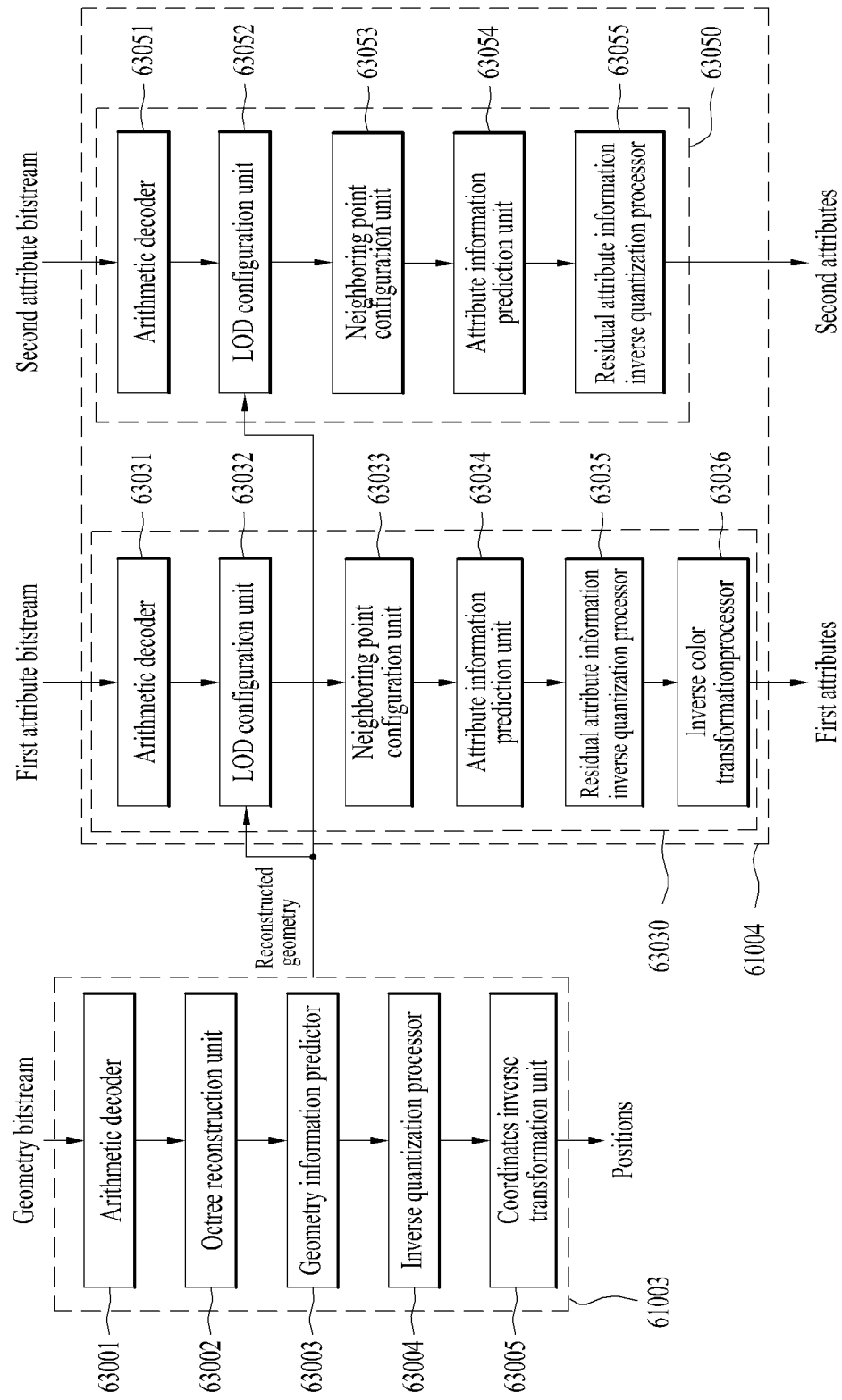
FIG. 20 illustrates an example of a geometry decoder and an attribute decoder according to embodiments.
Figure 21:
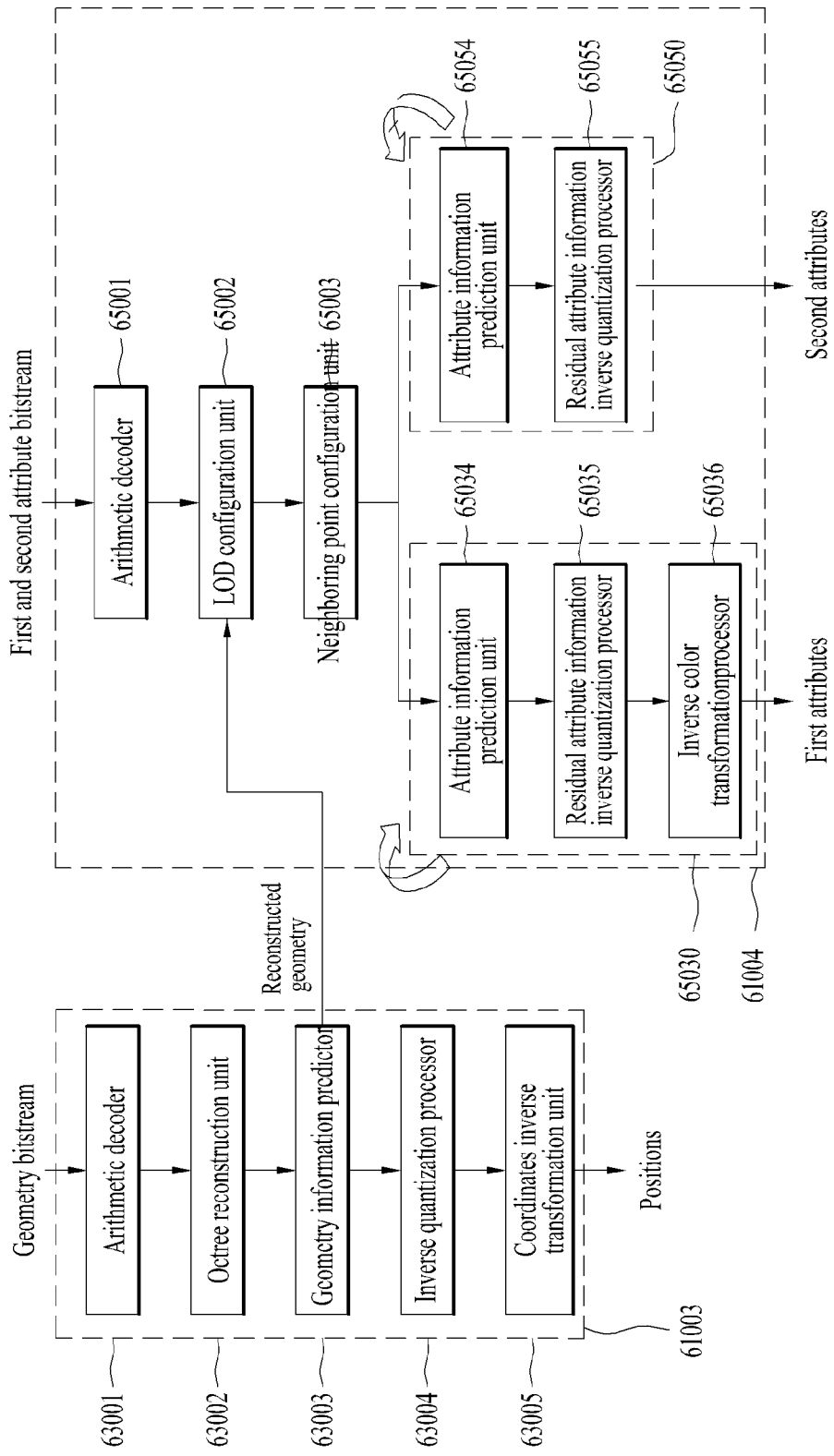
FIG. 21 illustrates another example of a geometry decoder and an attribute decoder according to embodiments.

That is, the geometry decoder 61003 may reconstruct the geometry by performing the reverse process of the operation of the geometry encoder 51006 of FIG. 15 on the compressed geometry bitstream based on signaling information (e.g., geometry related parameters). The geometry restored (or reconstructed) by the geometry decoder 61003 is provided to the attribute decoder 61004. The attribute decoder 61004 may restore the first and second attributes as shown in FIG. 20 or FIG. 21 by performing the reverse process of the operation of the attribute encoder of FIG. 17 or FIG. 18 on the input first and second attribute bitstreams based on signaling information (e.g., attribute related parameters) and the reconstructed geometry. According to embodiments, when the point cloud data is partitioned into tiles and/or slices at the transmitting side as shown in FIG. 16, the geometry decoder 61003 and the attribute decoder 61004 perform geometry decoding and attribute decoding on a tile-by-tile basis and/or slice-by-slice basis.

FIG. 20 is a detailed block diagram illustrating an example of the geometry decoder 61003 and the attribute decoder 61004 according to embodiments. FIG. 20 shows an embodiment of restoring a color attribute value and a reflectance attribute value by independently performing attribute decoding on a color attribute bitstream and a reflectance attribute bitstream.

The arithmetic decoder 63001, the octree reconstruction unit 63002, the geometry information prediction unit 63003, the inverse quantization processor 63004, and the coordinates inverse transformation unit 63005 included in the geometry decoder 61003 of FIG. 20 may perform some or all of the operations of the arithmetic decoder 11000, the octree synthesis unit 11001, the surface approximation synthesis unit 11002, the geometry reconstruction unit 11003, and the coordinates inverse transformation unit 11004 of FIG. 11, or may perform some or all of the operations of the arithmetic decoder 13002, the occupancy code-based octree reconstruction processor 13003, the surface model processor 13004, and the inverse quantization processor 13005 of FIG. 13. The positions restored by the geometry decoder 61003 are output to the post-processor 61005.

According to embodiments, when information on the maximum number of predictors to be used for attribute prediction (lifting_max_num_direct_predictors), threshold information for enabling adaptive prediction of an attribute (lifting_adaptive_prediction_threshold), an attribute processing method of the fused point cloud (attribute_recommendedshared_result_flag), and the like are signaled in at least one of a sequence parameter set (SPS), an attribute parameter set (APS), a tile parameter set (TPS), or an attribute slice header, they may be acquired and provided to the attribute decoder 61004 by the signaling processor 61002, or may be acquired directly by the attribute decoder 61004.

The attribute decoder 61004 according to the embodiments may include a first attribute decoding unit 63030 and a second attribute decoding unit 63050.

The first attribute decoding unit 63030 may include an arithmetic decoder 63031, an LOD configuration unit 63032, a neighbor set configuration unit 63033, an attribute information prediction unit 63034, and a residual attribute information inverse quantization processor 63035, and an inverse color transformation processor 63036.

The arithmetic decoder 63031 according to the embodiments may arithmetically decode the input first attribute bitstream (i.e., color attribute bitstream). The arithmetic decoder 63031 may decode the color attribute bitstream based on the reconstructed geometry. The arithmetic decoder 63031 performs an operation and/or decoding identical or similar to the operation and/or decoding of the arithmetic decoder 11005 of FIG. 11 or the arithmetic decoder 13007 of FIG. 13.

According to embodiments, the color attribute bitstream output from the arithmetic decoder 63031 may be decoded by one or a combination of two or more of RAHT decoding, LOD-based predictive transform decoding, and lifting transform decoding based on the reconstructed geometry information.

It has been described as an embodiment that the transmission device performs color attribute compression by one or a combination of the LOD-based predictive transform coding and the lifting transform coding. Accordingly, an embodiment in which the reception device performs color attribute decoding by one or a combination of the LOD-based predictive transform decoding and the lifting transform decoding will be described. The description of the RAHT decoding for the reception device will be omitted.

According to an embodiment, the color attribute bitstream that is arithmetically decoded by the arithmetic decoder 63031 is provided to the LOD configuration unit 63032. According to embodiments, the color attribute bitstream provided from the arithmetic decoder 63031 to the LOD configuration unit 63032 may contain prediction modes and residual attribute values.

The LOD configuration unit 63032 according to the embodiments generates LODs in the same or similar manner as the LOD configuration unit 53033 of the transmission device, and outputs the generated LODs to the neighbor point configuration unit 63033.

According to embodiments, the LOD configuration unit 63032 divides and groups points into LODs. Here, a group having different LODs is referred to as an $LOD_l$ set. Here, 1 denotes the LOD and is an integer starting from 0. $LOD_0$ is a set consisting of points with the largest distance therebetween. As 1 increases, the distance between points belonging to $LOD_1$ decreases.

According to embodiments, the prediction modes and residual attribute values encoded by the transmission device may be provided for each LOD or only for a leaf node.

In one embodiment, when the $LOD_1$ set is generated by the LOD configuration unit 63032, the neighbor set configuration unit 63033 may find X (>0) nearest neighbor points in a group having the same or lower LOD (i.e., a large distance between nodes) based on the $LOD_1$ set and register the same in the predictor as a neighbor set. Here, X is the maximum number of points that may be set as neighbors (e.g., lifting_num_pred_nearest_neighbours). X may be input as a user parameter, or be received in signaling information such as SPS, APS, GPS, TPS, geometry slice header, or attribute slice header.

In another embodiment, the neighbor set configuration unit 63033 may select neighbor points of each point based on signaling information such as SPS, APS, GPS, TPS, geometry slice header, or attribute slice header. To this end, the neighbor set configuration unit 63033 may receive the information from the signaling processor 61002.

According to embodiments, the attribute information prediction unit 63034 performs a process of predicting a color attribute value of a specific point based on the prediction mode of the specific point. According to an embodiment, the attribute prediction is performed on all points or at least some points of the reconstructed geometry.

The prediction mode of the specific point according to the embodiments may be one of prediction modes 0 to 3.

The prediction mode of the specific point according to the embodiments may be a predefined prediction mode (i.e., prediction mode 0), or a prediction mode corresponding to a predictor index (PredIndex) acquired from attribute slice data for the color attribute.

According to embodiments, the attribute information prediction unit 63034 may predict a color attribute value of each point based on the prediction mode of each point.

Once the attribute information prediction unit 63034 obtains the predicted attribute value of the point based on the prediction mode of the point, the residual attribute information inverse quantization processor 63035 restores the color attribute value of the point by adding the predicted attribute value of the point predicted by the predictor 63034 to the received residual attribute value of the point, and then performs inverse quantization as a reverse process to the quantization process of the transmission device.

In an embodiment, in the case where the transmitting side applies zero run-length coding to the residual attribute values of points, the residual attribute information inverse quantization processor 63035 performs zero run-length decoding on the residual attribute values of the points, and then performs inverse quantization.

The color attribute values restored by the residual attribute information inverse quantization processor 63035 are output to the inverse color transformation processor 63036.

The inverse color transformation processor 63036 performs inverse transform coding for inverse transformation of the color values (or textures) included in the restored attribute values, and then outputs the attributes to the post-processor 61005. The inverse color transformation processor 63036 performs an operation and/or inverse transform coding identical or similar to the operation and/or inverse transform coding of the inverse color transformation unit 11010 of FIG. 11 or the inverse color transformation processor 13010 of FIG. 13.

The second attribute decoding unit 63050 may include an arithmetic decoder 63051, an LOD configuration unit 63052, a neighbor set configuration unit 63053, an attribute information prediction unit 63054, and a residual attribute information inverse quantization processor 63055. The second attribute decoding unit 63050 is configured to restore a reflectance attribute value, and the inverse color transformation processor may be omitted.

The arithmetic decoder 63051 according to the embodiments may arithmetically decode the input second attribute bitstream, that is, the reflectance attribute bitstream. The arithmetic decoder 63051 may decode the reflectance attribute bitstream based on the reconstructed geometry. The arithmetic decoder 63051 performs an operation and/or decoding identical or similar to the operation and/or decoding of the arithmetic decoder 11005 of FIG. 11 or the arithmetic decoder 13007 of FIG. 13.

According to embodiments, the reflectance attribute bitstream output from the arithmetic decoder 63051 may be decoded by one or a combination of two or more of RAHT decoding, LOD-based predictive transform decoding, and lifting transform decoding based on the reconstructed geometry information.

It has been described as an embodiment that the transmission device performs reflectance attribute compression by one or a combination of the LOD-based predictive transform coding and the lifting transform coding. Accordingly, an embodiment in which the reception device performs reflectance attribute decoding by one or a combination of the LOD-based predictive transform decoding and the lifting transform decoding will be described. The description of the RAHT decoding for the reception device will be omitted.

According to an embodiment, the reflectance attribute bitstream that is arithmetically decoded by the arithmetic decoder 63051 is provided to the LOD configuration unit 63052. According to embodiments, the reflectance attribute bitstream provided from the arithmetic decoder 63051 to the LOD configuration unit 63052 may contain prediction modes and residual attribute values.

The LOD configuration unit 63052 according to the embodiments generates LODs in the same or similar manner as the LOD configuration unit 63032 of the first attribute encoding unit 66030 or the LOD configuration unit 53033 of the transmission device, and outputs the generated LODs to the neighbor set configuration unit 63053.

According to embodiments, the LOD configuration unit 63052 divides and groups points into LODs. Here, a group having different LODs is referred to as an LOD set. Here, 1 denotes the LOD and is an integer starting from 0. $LOD_0$ is a set consisting of points with the largest distance therebetween. As 1 increases, the distance between points belonging to $LOD_1$ decreases.

According to embodiments, the prediction modes and residual attribute values encoded by the transmission device may be provided for each LOD or only for a leaf node.

In one embodiment, when the $LOD_1$ set is generated by the LOD configuration unit 63052, the neighbor set configuration unit 63053 finds and registers neighbor points in the same or similar manner as the neighbor set configuration unit 63033 of the first attribute encoding unit 63030. That is, the neighbor set configuration unit 63053 may find X (>0) nearest neighbor points in a group having the same or lower LOD (i.e., a large distance between nodes) based on the $LOD_1$ set and register the same in the predictor as a neighbor set. Here, X is the maximum number of points that may be set as neighbors (e.g., lifting_num_pred_nearest_neighbours). X may be input as a user parameter, or be received in signaling information such as SPS, APS, GPS, TPS, geometry slice header, or attribute slice header.

In another embodiment, the neighbor set configuration unit 63053 may select neighbor points of each point based on signaling information such as SPS, APS, GPS, TPS, geometry slice header, or attribute slice header. To this end, the neighbor set configuration unit 63053 may receive the information from the signaling processor 61002.

According to embodiments, the attribute information prediction unit 63054 performs a process of predicting a reflectance attribute value of a specific point based on the prediction mode of the specific point. According to an embodiment, the attribute prediction is performed on all points or at least some points of the reconstructed geometry.

The prediction mode of the specific point according to the embodiments may be one of prediction modes 0 to 3.

The prediction mode of the specific point according to the embodiments may be a predefined prediction mode (i.e., prediction mode 0), or a prediction mode corresponding to a predictor index (PredIndex) acquired from attribute slice data for the reflectance attribute.

According to embodiments, the attribute information prediction unit 63054 may predict the reflectance attribute value of each point based on the prediction mode of each point.

Once the attribute information prediction unit 63054 obtains the predicted attribute value of the point based on the prediction mode of the point, the residual attribute information inverse quantization processor 63055 restores the reflectance attribute value of the point by adding the predicted attribute value of the point predicted by the attribute information prediction unit 63054 to the received residual attribute value of the point, and then performs inverse quantization as a reverse process to the quantization process of the transmission device.

In an embodiment, in the case where the transmitting side applies zero run-length coding to the residual attribute values of points, the residual attribute information inverse quantization processor 63035 performs zero run-length decoding on the residual attribute values of the points, and then performs inverse quantization.

The reflectance attribute values restored by the residual attribute information inverse quantization processor 63055 are output to the post-processor 61005.

The post-processor 61005 may reconstruct point cloud data by matching the positions restored and output by the geometry decoder 61003 with the first and second attributes restored and output by the attribute decoder 61004. In addition, when the reconstructed point cloud data is in a tile and/or slice unit, the post-processor 61005 may perform a reverse process to the spatial partitioning of the transmitting side based on the signaling information. For example, when the bounding box shown in FIG. 16(a) is partitioned into tiles and slices as shown in of FIGS. 16(b) and 16(c), the tiles and/or slices may be combined based on the signaling information to restore the bounding box as shown in FIG. 16(a).

FIG. 21 is a detailed block diagram illustrating an example of the geometry decoder 61003 and the attribute decoder 61004 according to embodiments. FIG. 21 illustrates an embodiment of restoring a color attribute value and a reflectance attribute value by performing attribute decoding on a color attribute bitstream and a reflectance attribute bitstream while sharing some processing results.

The arithmetic decoder 63001, the octree reconstruction unit 63002, the geometry information prediction unit 63003, the inverse quantization processor 63004, and the coordinates inverse transformation unit 63005 included in the geometry decoder 61003 of FIG. 21 may perform some or all of the operations of the arithmetic decoder 11000, the octree synthesis unit 11001, the surface approximation synthesis unit 11002, the geometry reconstruction unit 11003, and the coordinates inverse transformation unit 11004 of FIG. 11, or may perform some or all of the operations of the arithmetic decoder 13002, the occupancy code-based octree reconstruction processor 13003, the surface model processor 13004, and the inverse quantization processor 13005 of FIG. 13. The positions restored by the geometry decoder 61003 are output to the post-processor 61005.

According to embodiments, when information on the maximum number of predictors to be used for attribute prediction (lifting_max_num_direct_predictors), threshold information for enabling adaptive prediction of an attribute (lifting_adaptive_prediction_threshold), an attribute processing method for fused point cloud data (attribute_recommendedshared_result_flag), and the like are signaled in at least one of a sequence parameter set (SPS), an attribute parameter set (APS), a tile parameter set (TPS), or an attribute slice header, they may be acquired and provided to the attribute decoder 61004 by the signaling processor 61002, or may be acquired directly by the attribute decoder 61004.

The attribute decoder 61004 according to the embodiments may include an arithmetic decoder 65001, an LOD configuration unit 65002, a neighbor set configuration unit 65003, a first decompressor 65030, and a second decompressor 65050.

According to embodiments, if the configuration for LOD generation and maximum number of neighbors for both attributes are same, the result from the common process can be shared. This can save encoding and decoding time or computation power and redundant memory usage. In other words, since the color information and reflectance information are generated from the same geometry information, and the LOD generation process and the neighbor point set generation process are also performed based on the geometry information, the result from the LOD generation process and the result from the process of finding neighbor point are the same for both attributes.

Therefore, in decoding of the color attribute bitstream and decoding of the reflectance attribute bitstream, the result of the LOD generation process and the result of finding of neighbor points may be shared, thereby reducing the attribute decoding time.

According to embodiments, the arithmetic decoder 65001 of the attribute decoder 61004 may arithmetically decode the first attribute bitstream (i.e., color attribute bitstream) and the second attribute bitstream (i.e., reflectance attribute bitstream) input thereto. The arithmetic decoder 65001 may arithmetically decode the color attribute bitstream and the reflectance attribute bitstream based on the reconstructed geometry. The arithmetic decoder 65001 an operation and/or decoding identical or similar to the operation and/or decoding of the arithmetic decoder 11005 of FIG. 11 or the arithmetic decoder 13007 of FIG. 13.

According to embodiments, the color attribute bitstream and the reflectance attribute bitstream output from the arithmetic decoder 65001 may be decoded by one or a combination of two or more of RAHT decoding, LOD-based predictive transform decoding, and lifting transform decoding based on the reconstructed geometry information.

It has been described as an embodiment that the transmission device performs attribute compression by one or a combination of the LOD-based predictive transform coding and the lifting transform coding. Accordingly, an embodiment in which the reception device decodes the color and reflectance attributes by one or a combination of the LOD-based predictive transform decoding and the lifting transform decoding will be described. The description of the RAHT decoding for the reception device will be omitted.

According to an embodiment, the color attribute bitstream and the reflectance attribute bitstream that are arithmetically decoded by the arithmetic decoder 65001 is provided to the LOD configuration unit 65002. According to embodiments, the color attribute bitstream provided from the arithmetic decoder 65001 to the LOD configuration unit 65002 may contain prediction modes and residual attribute values for restoring the color attribute, and the reflectance attribute bitstream provided from the arithmetic decoder 65001 to the LOD configuration unit 65002 may contain prediction modes and residual attribute values for restoring the reflectance attribute.

The LOD configuration unit 65002 according to the embodiments generates LODs in the same or similar manner as the LOD configuration unit 55003 of the transmission device, and outputs the generated LODs to the neighbor set configuration unit 65003.

According to embodiments, the LOD configuration unit 65002 divides and groups points into LODs. Here, a group having different LODs is referred to as an $LOD_l$ set. Here, 1 denotes the LOD and is an integer starting from 0. $LOD_0$ is a set consisting of points with the largest distance therebetween. As 1 increases, the distance between points belonging to $LOD_l$ decreases.

According to embodiments, the prediction modes and residual attribute values encoded by the transmission device may be provided for each LOD or only for a leaf node.

In one embodiment, when the $LOD_l$ set is generated by the LOD configuration unit 65002, the neighbor set configuration unit 65003 may find X (>0) nearest neighbor points in a group having the same or lower LOD (i.e., a large distance between nodes) based on the $LOD_l$ set and register the same in the predictor as a neighbor set. Here, X is the maximum number of points that may be set as neighbors (e.g., lifting_num_pred_nearest_neighbours). X may be input as a user parameter, or be received in signaling information such as SPS, APS, GPS, TPS, geometry slice header, or attribute slice header.

In another embodiment, the neighbor set configuration unit 65003 may select neighbor points of each point based on signaling information such as SPS, APS, GPS, TPS, geometry slice header, or attribute slice header. To this end, the neighbor set configuration unit 65003 may receive the information from the signaling processor 61002.

The first decompressor 65030 of FIG. 21 restores color attribute values based on the arithmetically decoded color attribute bitstream and the neighbor points registered by the neighbor set configuration unit 65003.

To this end, the first decompressor 65030 may include an attribute information prediction unit 65034, a residual attribute information inverse quantization processor 65035, and an inverse color transformation processor 65036.

According to embodiments, the attribute information prediction unit 65034 performs a process of predicting a color attribute value of a specific point based on the prediction mode of the point. According to an embodiment, the process of prediction the color attribute is performed on all points or at least some points of the reconstructed geometry.

The prediction mode of the specific point according to the embodiments may be one of prediction modes 0 to 3.

The prediction mode of the specific point according to the embodiments may be a predefined prediction mode (i.e., prediction mode 0), or a prediction mode corresponding to a predictor index (PredIndex) acquired from attribute slice data.

According to embodiments, the attribute information prediction unit 65034 may predict the color attribute value of each point based on the prediction mode of each point.

Once the attribute information prediction unit 65034 obtains the predicted attribute value of the point based on the prediction mode of the point, the residual attribute information inverse quantization processor 65035 restores the color attribute value of the point by adding the predicted attribute value of the point predicted by the attribute information prediction unit 65034 to the received residual attribute value of the point, and then performs inverse quantization as a reverse process to the quantization process of the transmission device.

In an embodiment, in the case where the transmitting side applies zero run-length coding to the residual attribute values of points, the residual attribute information inverse quantization processor 65035 performs zero run-length decoding on the residual attribute values of the points, and then performs inverse quantization.

The color attribute values restored by the residual attribute information inverse quantization processor 65035 are output to the inverse color transformation processor 65036.

The inverse color transformation processor 65036 performs inverse transform coding for inverse transformation of the color values (or textures) included in the restored color attribute values, and then outputs the color attributes to the post-processor 61005. The inverse color transformation processor 65036 performs an operation and/or inverse transform coding identical or similar to the operation and/or inverse transform coding of the inverse color transformation unit 11010 of FIG. 11 or the inverse color transformation processor 13010 of FIG. 13.

The second decompressor 65050 of FIG. 21 restores attribute values based on the arithmetically decoded reflectance attribute bitstream and the neighbor points registered by the neighbor set configuration unit 65003.

To this end, the second decompressor 65050 may include an attribute information prediction unit 65054 and a residual attribute information inverse quantization processor 65055. The second decompressor 65050 according to embodiments is configured to restore the reflectance attribute value, and the inverse color transformation processor may be omitted.

According to embodiments, the attribute information prediction unit 65054 performs a process of predicting a reflectance attribute value of a specific point based on the prediction mode of the point. According to an embodiment, the process of prediction the reflectance attribute is performed on all points or at least some points of the reconstructed geometry.

The prediction mode of the specific point according to the embodiments may be one of prediction modes 0 to 3.

The prediction mode of the specific point according to the embodiments may be a predefined prediction mode (i.e., prediction mode 0), or a prediction mode corresponding to a predictor index (PredIndex) acquired from attribute slice data.

According to embodiments, the attribute information prediction unit 65054 may predict the reflectance attribute value of each point based on the prediction mode of each point.

Once the attribute information prediction unit 65054 obtains the predicted reflectance attribute value of the point based on the prediction mode of the point, the residual attribute information inverse quantization processor 65035 restores the reflectance attribute value of the point by adding the predicted attribute value of the point predicted by the attribute information prediction unit 65054 to the received residual attribute value of the point, and then performs inverse quantization as a reverse process to the quantization process of the transmission device.

In an embodiment, in the case where the transmitting side applies zero run-length coding to the residual attribute values of points, the residual attribute information inverse quantization processor 65055 performs zero run-length decoding on the residual attribute values of the points, and then performs inverse quantization.

The reflectance attribute values restored by the residual attribute information inverse quantization processor 65055 are output to the post-processor 61005.

The post-processor 61005 may reconstruct point cloud data by matching the positions restored and output by the geometry decoder 61003 with the first attributes restored and output by the first decompressor 65030 of the attribute decoder 61004 and the second attributes restored and output by the second decompressor 65050. In addition, when the reconstructed point cloud data is in a tile and/or slice unit, the post-processor 61005 may perform a reverse process to the spatial partitioning of the transmitting side based on the signaling information. For example, when the bounding box shown in FIG. 16(*a*) is partitioned into tiles and slices as shown in of FIGS. 16(*b*) and 16(*c*), the tiles and/or slices may be combined based on the signaling information to restore the bounding box as shown in FIG. 16(*a*).

According to embodiments, independent attribute decoding for each attribute through the attribute decoder of FIG. 20 or attribute decoding in which some processing results are shared through the attribute decoder of 21 may be selectively performed according to the processing capability of the attribute encoder and/or the attribute decoder. According to embodiments, whether the LOD configuration unit and the neighbor set configuration unit independently operate for a plurality of attributes may be signaled in a recommended scheme. The recommendation scheme may be applied by the point cloud video decoder according to the processing capability of the equipment, and/or the characteristics of the content, and/or the workload at the corresponding time.

According to an embodiment of the present disclosure, information for indicating whether some processing operations are shared or independently performed in attribute decoding is signaled in signaling information. In present disclosure, an attribute processing method (attribute_recommendedshared_result_flag) of the fused point cloud indicating whether some processing operations are shared or independently performed in attribute encoding and decoding may be signaled in at least one of a sequence parameter set, an attribute parameter set, a tile parameter set, or an attribute slice header. The attribute processing method (attribute_recommendedshared_result_flag) of the fused point cloud according to the embodiments may specify whether to recommend independent execution when at least one point has a plurality of attributes.

Figure 22:
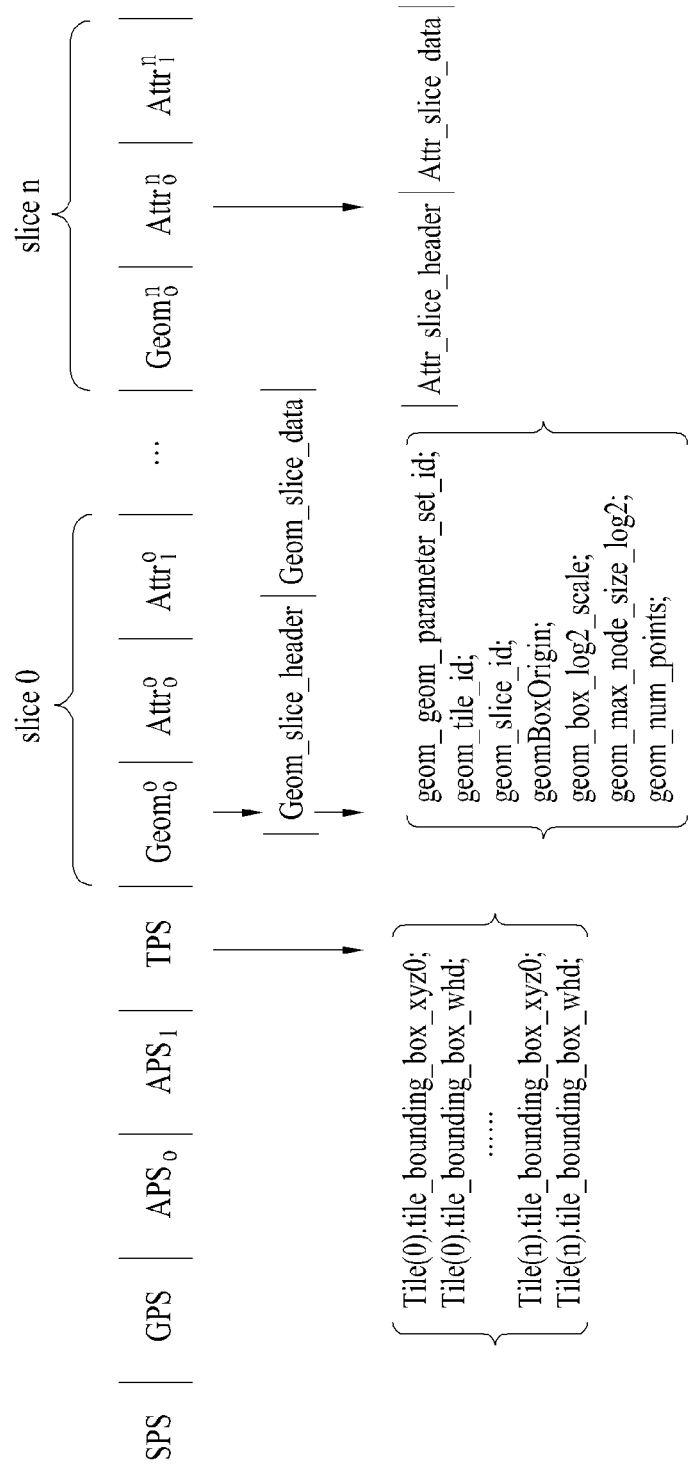
FIG. 22 illustrates an exemplary bitstream structure for point cloud data for transmission/reception according to embodiments.

FIG. 22 shows an exemplary bitstream structure of point cloud data for transmission/reception according to embodiments.

When a geometry bitstream, an attribute bitstream, and a signaling bitstream according to embodiments are configured as one bitstream, the bitstream may include one or more sub-bitstreams. The bitstream according to the embodiments may include a sequence parameter set (SPS) for sequence level signaling, a geometry parameter set (GPS) for signaling of geometry information coding, one or more attribute parameter sets (APSs) ($APS_0$, $APS_1$) for signaling of attribute information coding, a tile parameter set (TPS) for tile level signaling, and one or more slices (slice 0 to slice n). That is, a bitstream of point cloud data according to embodiments may include one or more tiles, and each of the tiles may be a group of slices including one or more slices (slice 0 to slice n). The TPS according to the embodiments may contain information about each of the one or more tiles (e.g., coordinate value information and height/size information about the bounding box). Each slice may include one geometry bitstream (Geom0) and one or more attribute bitstreams (Attr0 and Attr1). For example, a first slice (slice 0) may include one geometry bitstream ($Geom0^0$) and one or more attribute bitstreams ($Attr0^0$, $Attr1^0$).

The geometry bitstream (or geometry slice) in each slice may be composed of a geometry slice header (geom_slice_header) and geometry slice data (geom_slice_data). According to embodiments, geom_slice_header may include identification information (geom_parameter_set_id), a tile identifier (geom_tile_id), and a slice identifier (geom_slice_id) for a parameter set included in the GPS, and information (geomBoxOrigin, geom_box_log 2_scale, geom_max_node_size_log 2, geom_num_points) about data contained in the geometry slice data (geom_slice_data). geomBoxOrigin is geometry box origin information indicating the origin of the box of the geometry slice data, geom_box_log 2_scale is information indicating the log scale of the geometry slice data, geom_max_node_size_log 2 is information indicating the size of the root geometry octree node, and geom_num_points is information related to the number of points of the geometry slice data. According to embodiments, the geom_slice_data may include geometry information (or geometry data) about the point cloud data in a corresponding slice. For example, $Attr0^0$ may be a first attribute bitstream (i.e., a color attribute bitstream) and $Attr1^0$ may be a second attribute bitstream (i.e., a reflectance attribute bitstream). In this case, $APS_0$ may be an attribute parameter set for the color attribute, and $APS_1$ may be an attribute parameter set for the reflectance attribute.

Each attribute bitstream (or attribute slice) in each slice may be composed of an attribute slice header (attr_slice_header) and attribute slice data (attr_slice_data). According to embodiments, the attr_slice_header may include information about the corresponding attribute slice data. The attribute slice data may contain attribute information (or attribute data or attribute value) about the point cloud data in the corresponding slice. When there is a plurality of attribute bitstreams in one slice, each of the bitstreams may contain different attribute information. For example, one attribute bitstream may contain attribute information corresponding to color, and another attribute stream may contain attribute information corresponding to reflectance.

Figure 23:
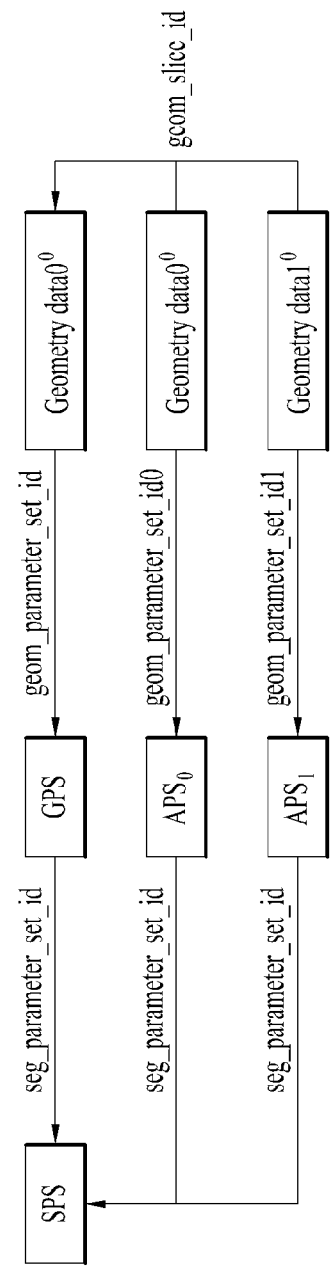
FIG. 23 illustrates an exemplary bitstream structure for point cloud data according to embodiments.

FIG. 23 shows an exemplary bitstream structure for point cloud data according to embodiments.

Figure 24:
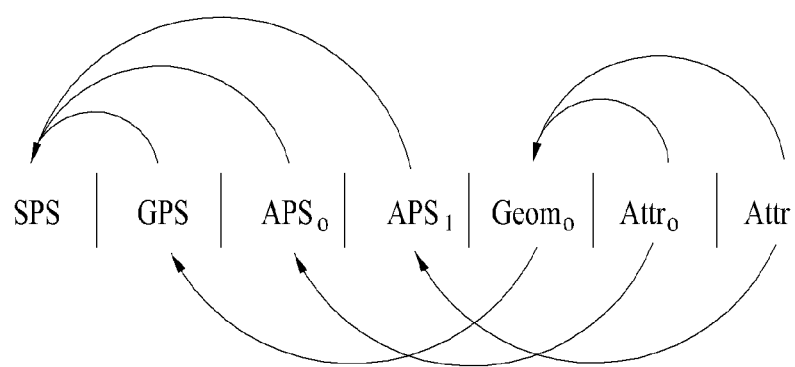
FIG. 24 illustrates a connection relationship between components in a bitstream of point cloud data according to embodiments.

FIG. 24 illustrates a connection relationship between components in a bitstream of point cloud data according to embodiments.

The bitstream structure for the point cloud data illustrated in FIGS. 23 and 24 may represent the bitstream structure for point cloud data shown in FIG. 22.

According to the embodiments, the SPS may include an identifier (seq_parameter_set_id) for identifying the SPS, and the GPS may include an identifier (geom_parameter_set_id) for identifying the GPS and an identifier (seq_parameter_set_id) indicating an active SPS to which the GPS belongs. The APS may include an identifier (attr_parameter_set_id) for identifying the APS and an identifier (seq_parameter_set_id) indicating an active SPS to which the APS belongs. For example, $APS_0$ may include an identifier (attr_parameter_set_id0) for identifying the $APS_0$ and an identifier (seq_parameter_set_id) indicating an active SPS to which $APS_0$ belongs, and $APS_1$ may include an identifier (attr_parameter_set_id1) for identifying $APS_1$ and an identifier (seq_parameter_set_id) indicating an active SPS to which $APS_1$ belongs.

According to embodiments, a geometry bitstream (or geometry slice) may include a geometry slice header and geometry slice data. The geometry slice header may include an identifier (geom_parameter_set_id) of an active GPS to be referred to by a corresponding geometry slice. Moreover, the geometry slice header may further include an identifier (geom_slice_id) for identifying a corresponding geometry slice and/or an identifier (geom_tile_id) for identifying a corresponding tile. The geometry slice data may include geometry information belonging to a corresponding slice.

According to embodiments, an attribute bitstream (or attribute slice) may include an attribute slice header and attribute slice data. The attribute slice header may include an identifier (attr_parameter_set_id) of an active APS to be referred to by a corresponding attribute slice and an identifier (geom_slice_id) for identifying a geometry slice related to the attribute slice. The attribute slice data may include attribute information belonging to a corresponding slice.

As an example, $Attr0^0$ may include an attribute slice header and attribute slice data for a color attribute. The attribute slice header may include an identifier (attr_parameter_set_id0) of an active APS to be referred to by a corresponding attribute slice and an identifier (geom_slice_id) for identifying a geometry slice related to the attribute slice. The attribute slice data may include color attribute information belonging to the slice. As another example, $Attr0^1$ may include an attribute slice header and attribute slice data for a reflectance attribute. The attribute slice header may include an identifier (attr_parameter_set_id1) of an active APS to be referred to by a corresponding attribute slice and an identifier (geom_slice_id) for identifying a geometry slice related to the attribute slice. The attribute slice data may include reflectance attribute information belonging to the slice.

That is, the geometry slice refers to the GPS, and the GPS refers the SPS. In addition, the SPS lists available attributes, assigns an identifier to each of the attributes, and identifies a decoding method. The attribute slice is mapped to output attributes according to the identifier. The attribute slice has a dependency on the preceding (decoded) geometry slice and the APS. The APS refers to the SPS.

According to embodiments, parameters necessary for encoding of the point cloud data may be newly defined in a parameter set of the point cloud data and/or a corresponding slice header. For example, when encoding of the attribute information is performed, the parameters may be added to the APS. When tile-based encoding is performed, the parameters may be added to the tile and/or slice header.

As shown in FIGS. 22, 23, and 24, the bitstream of the point cloud data provides tiles or slices such that the point cloud data may be partitioned and processed by regions. According to embodiments, the respective regions of the bitstream may have different importances. Accordingly, when the point cloud data is partitioned into tiles, a different filter (encoding method) and a different filter unit may be applied to each tile. When the point cloud data is partitioned into slices, a different filter and a different filter unit may be applied to each slice.

When the point cloud data is partitioned and compressed, the transmission device and the reception device according to the embodiments may transmit and receive a bitstream in a high-level syntax structure for selective transmission of attribute information in the partitioned regions.

The transmission device according to the embodiments may transmit point cloud data according to the bitstream structure as shown in FIGS. 22, 23, and 24. Accordingly, a method to apply different encoding operations and use a good-quality encoding method for an important region may be provided. In addition, efficient encoding and transmission may be supported according to the characteristics of point cloud data, and attribute values may be provided according to user requirements.

The reception device according to the embodiments may receive the point cloud data according to the bitstream structure as shown in FIGS. 22, 23, and 24. Accordingly, different filtering (decoding) methods may be applied to the respective regions (regions partitioned into tiles or into slices), rather than a complexly decoding (filtering) method being applied to the entire point cloud data. Therefore, better image quality in a region important is provided to the user and an appropriate latency to the system may be ensured.

As described above, a tile or a slice is provided to process the point cloud data by partitioning the point cloud data by region. In partitioning the point cloud data by region, an option to generate a different set of neighbor points for each region may be set. Thereby, a selection method having low complexity and slightly lower reliability, or a selection method having high complexity and high reliability I may be provided.

At least one of the SPS, APS, TPS, or an attribute slice header for each slice according to embodiments may include an attribute processing method (attribute_recommended-shared_result_flag) for the fused point cloud.

The attribute processing method (attribute_recommendedshared_result_flag) for the fused point cloud according to the embodiments is configured to indicate whether some processing results in attribute decoding are shared or independently executed. In particular, it may specify whether to recommend independent execution when at least one point has a plurality of attributes.

A field, which is a term used in syntaxes of the present disclosure described below, may have the same meaning as a parameter or element.

FIG. 25 shows an embodiment of a syntax structure of a sequence parameter set (SPS) (seq_parameter_set_rbsp( )) according to the present disclosure. The SPS may include sequence information about a point cloud data bitstream. In particular, in this example, the SPS includes predictor selection related option information.

The SPS according to the embodiments may include a profile_idc field, a profile_compatibility_flags field, a level_idc field, an sps_bounding_box_present_flag field, an sps_source_scale_factor field, an sps_seq_parameter_set_id field, an sps_num_attribute_sets field, and an sps_extension_present_flag field.

The profile_idc field indicates a profile to which the bitstream conforms.

The profile_compatibility_flags field equal to 1 may indicate that the bitstream conforms to the profile indicated by profile_idc.

The level_idc field indicates a level to which the bitstream conforms.

The sps_bounding_box_present_flag field indicates whether source bounding box information is signaled in the SPS. The source bounding box information may include offset and size information about the source bounding box. For example, the sps_bounding_box_present_flag field equal to 1 indicates that the source bounding box information is signaled in the SPS. The sps_bounding_box_present_flag field equal to 0 indicates the source bounding box information is not signaled. The sps_source_scale_factor field indicates the scale factor of the source point cloud.

The sps_seq_parameter_set_id field provides an identifier for the SPS for reference by other syntax elements.

The sps_num_attribute_sets field indicates the number of coded attributes in the bitstream.

The sps_extension_present_flag field specifies whether the sps_extension_data syntax structure is present in the SPS syntax structure. For example, the sps_extension_present_flag field equal to 1 specifies that the sps_extension_data syntax structure is present in the SPS syntax structure. The sps_extension_present_flag field equal to 0 specifies that this syntax structure is not present. When not present, the value of the sps_extension_present_flag field is inferred to be equal to 0.

When the sps_bounding_box_present_flag field is equal to 1, the SPS according to embodiments may further include an sps_bounding_box_offset_x field, an sps_bounding_box_offset_y field, an sps_bounding_box_offset_z field, an sps_bounding_box_scale_factor field, an sps_bounding_box_size_width field, an sps_bounding_box_size_height field, and an sps_bounding_box_size_depth field.

The sps_bounding_box_offset_x field indicates the x offset of the source bounding box in the Cartesian coordinates. When the x offset of the source bounding box is not present, the value of sps_bounding_box_offset_x is 0.

The sps_bounding_box_offset_y field indicates the y offset of the source bounding box in the Cartesian coordinates. When the y offset of the source bounding box is not present, the value of sps_bounding_box_offset_y is 0.

The sps_bounding_box_offset_z field indicates the z offset of the source bounding box in the Cartesian coordinates. When the z offset of the source bounding box is not present, the value of sps_bounding_box_offset_z is 0.

The sps_bounding_box_scale_factor field indicates the scale factor of the source bounding box in the Cartesian coordinates. When the scale factor of the source bounding box is not present, the value of sps_bounding_box_scale_factor may be 1.

The sps_bounding_box_size_width field indicates the width of the source bounding box in the Cartesian coordinates. When the width of the source bounding box is not present, the value of the sps_bounding_box_size_width field may be 1.

The sps_bounding_box_size_height field indicates the height of the source bounding box in the Cartesian coordinates. When the height of the source bounding box is not present, the value of the sps_bounding_box_size_height field may be 1.

The sps_bounding_box_size_depth field indicates the depth of the source bounding box in the Cartesian coordinates. When the depth of the source bounding box is not present, the value of the sps_bounding_box_size_depth field may be 1.

The SPS according to embodiments includes an iteration statement repeated as many times as the value of the sps_num_attribute_sets field. In an embodiment, i is initialized to 0, and is incremented by 1 each time the iteration statement is executed. The iteration statement is repeated until the value of i becomes equal to the value of the sps_num_attribute_sets field. The iteration statement may include an attribute_dimension[i] field, an attribute_instance_id[i] field, an attribute_bitdepth[i] field, an attribute_cicp_colour_primaries[i] field, an attribute_cicp_transfer_characteristics[i] field, an attribute_cicp_matrix_coeffs[i] field, an attribute_cicp_video_full_range_flag[i] field, and a known_attribute_label_flag[i] field.

The attribute_dimension[i] field specifies the number of components of the i-th attribute.

The attribute_instance_id[i] field specifies the instance ID of the i-th attribute.

The attribute_bitdepth[i] field specifies the bitdepth of the i-th attribute signal(s).

The attribute_cicp_colour_primaries[i] field indicates chromaticity coordinates of the color attribute source primaries of the i-th attribute.

The attribute_cicp_transfer_characteristics[i] field either indicates the reference opto-electronic transfer characteristic function of the colour attribute as a function of a source input linear optical intensity with a nominal real-valued range of 0 to 1 or indicates the inverse of the reference electro-optical transfer characteristic function as a function of an output linear optical intensity.

The attribute_cicp_matrix_coeffs[i] field describes the matrix coefficients used in deriving luma and chroma signals from the green, blue, and red, or Y, Z, and X primaries.

The attribute_cicp_video_full_range_flag[i] field indicates the black level and range of the luma and chroma signals as derived from E'Y, E'PB, and E'PR or E'R, E'G, and E'B real-valued component signals.

The known_attribute_label_flag[i] field specifies whether a known_attribute_label field or an attribute_label_four_bytes field is signaled for the i-th attribute. For example, the value of the known_attribute_label_flag[i] field equal to 0 specifies that the known_attribute_label field is signaled for the ith attribute. The known_attribute_label_flag[i] field equal to 1 specifies that the attribute_label_four_bytes field is signaled for the ith attribute.

The known_attribute_label[i] field may specify an attribute type. For example, the known_attribute_label[i] field equal to 0 may specify that the i-th attribute is color. The known_attribute_label[i] field equal to 1 specifies that the i-th attribute is reflectance. The known_attribute_label[i] field equal to 2 may specify that the i-th attribute is frame index.

The attribute_label_four_bytes field indicates the known attribute type with a 4-byte code.

In this example, the attribute_label_four_bytes field indicates color when equal to 0 and indicates reflectance when is equal to 1.

According to embodiments, when the sps_extension_present_flag field is equal to 1, the SPS may further include a sps_extension_data_flag field.

The sps_extension_data_flag field may have any value.

The SPS according to the embodiments may further include an attribute processing method (attribute_recommendedshared_result_flag) for the fused point cloud.

According to embodiments, the attribute processing method (attribute_recommendedshared_result_flag) for the fused point cloud may be included in an iteration statement repeated as many times as the value of the sps_num_attribute_sets field described above.

That is, the iteration statement may include an attribute_recommendedshared_result_flag [i] field.

When at least one point has a plurality of attributes, the attribute_recommendedshared_result_flag [i] field may specify whether to recommend independent execution for the i-th attribute. For example, the attribute_recommended-shared_result_flag [i] field equal to 0 may indicate that the i-th attribute is independently decoded according to FIG. 20. The attribute_recommendedshared_result_flag [i] field equal to 1 may indicate that some processing results are shared to decode the i-th attribute according to FIG. 21.

FIG. 26 shows an embodiment of a syntax structure of the geometry parameter set (GPS) (geometry_parameter_set( )) according to the present disclosure. The GPS according to the embodiments may contain information on a method of encoding geometry information about point cloud data contained in one or more slices.

According to embodiments, the GPS may include a gps_geom_parameter_set_id field, a gps_seq_parameter_set_id field, a gps_box_present_flag field, a unique_geometry_points_flag field, a neighbour_context_restriction_flag field, an inferred_direct_coding_mode_enabled_flag field, a bitwise_occupancy_coding_flag field, an adjacent_child_contextualization_enabled_flag field, a log 2_neighbour_avail_boundary field, a log 2_intra_pred_max_node_size field, a log 2_trisoup_node_size field, and a gps_extension_present_flag field.

The gps_geom_parameter_set_id field provides an identifier for the GPS for reference by other syntax elements.

The gps_seq_parameter_set_id field specifies the value of sps_seq_parameter_set_id for the active SPS.

The gps_box_present_flag field specifies whether additional bounding box information is provided in a geometry slice header that references the current GPS. For example, the gps_box_present_flag field equal to 1 may specify that additional bounding box information is provided in a geometry header that references the current GPS. Accordingly, when the gps_box_present_flag field is equal to 1, the GPS may further include a gps_gsh_box_log 2_scale_present_flag field.

The gps_gsh_box_log 2_scale_present_flag field specifies whether the gps_gsh_box_log 2_scale field is signaled in each geometry slice header that references the current GPS. For example, the gps_gsh_box_log 2_scale_present_flag field equal to 1 may specify that the gps_gsh_box_log 2_scale field is signaled in each geometry slice header that references the current GPS. As another example, the gps_gsh_box_log 2_scale_present_flag field equal to 0 may specify that the gps_gsh_box_log 2_scale field is not signaled in each geometry slice header and a common scale for all slices is signaled in the gps_gsh_box_log 2_scale field of the current GPS.

When the gps_gsh_box_log 2_scale_present_flag field is equal to 0, the GPS may further include a gps_gsh_box_log 2_scale field.

The gps_gsh_box_log 2_scale field indicates the common scale factor of the bounding box origin for all slices that refer to the current GPS.

The unique_geometry_points_flag field indicates whether all output points have unique positions. For example, the unique_geometry_points_flag field equal to 1 indicates that all output points have unique positions. The unique_geometry_points_flag field equal to 0 indicates that in all slices that refer to the current GPS, the two or more of the output points may have the same position.

The neighbor_context_restriction_flag field indicates contexts used for octree occupancy coding. For example, the neighbour_context_restriction_flag field equal to 0 indicates that octree occupancy coding uses contexts determined from six neighboring parent nodes. The neighbour_context_restriction_flag field equal to 1 indicates that octree occupancy coding uses contexts determined from sibling nodes only.

The inferred_direct_coding_mode_enabled_flag field indicates whether the direct_mode_flag field is present in the geometry node syntax. For example, the inferred_direct_coding_mode_enabled_flag field equal to 1 indicates that the direct_mode_flag field may be present in the geometry node syntax. For example, the inferred_direct_coding_mode_enabled_flag field equal to 0 indicates that the direct_mode_flag field is not present in the geometry node syntax.

The bitwise_occupancy_coding_flag field indicates whether geometry node occupancy is encoded using bitwise contextualization of the syntax element occupancy map. For example, the bitwise_occupancy_coding_flag field equal to 1 indicates that geometry node occupancy is encoded using bitwise contextualisation of the syntax element ocupancy_map. For example, the bitwise_occupancy_coding_flag field equal to 0 indicates that geometry node occupancy is encoded using the dictionary encoded syntax element occupancy_byte.

The adjacent_child_contextualization_enabled_flag field indicates whether the adjacent children of neighboring octree nodes are used for bitwise occupancy contextualization. For example, the adjacent_child_contextualization_enabled_flag field equal to 1 indicates that the adjacent children of neighboring octree nodes are used for bitwise occupancy contextualization. For example, adjacent_child_contextualization_enabled_flag equal to 0 indicates that the children of neighbouring octree nodes are not used for the occupancy contextualization.

The log 2_neighbour_avail_boundary field specifies the value of the variable NeighbAvailBoundary that is used in the decoding process as follows:

$$\text{NeighbAvailBoundary} = 2^{\log 2\_neighbour\_avail\_boundary}$$

For example, when the neighbour_context_restriction_flag field is equal to 1, NeighbAvailabilityMask may be set equal to 1. For example, when the neighbour_context_restriction_flag field is equal to 0, NeighbAvailabilityMask may be set equal to 1<<log 2_neighbour_avail_boundary.

The log 2_intra_pred_max_node_size field specifies the octree node size eligible for occupancy intra prediction.

The log 2_trisoup_node_size field specifies the variable TrisoupNodeSize as the size of the triangle nodes as follows.

$$\text{TrisoupNodeSize} = 1 << \log 2\_trisoup\_node\_size$$

The gps_extension_present_flag field specifies whether the gps_extension_data syntax structure is present in the GPS syntax structure. For example, gps_extension_present_flag equal to 1 specifies that the gps_extension_data syntax structure is present in the GPS syntax. For example, gps_extension_present_flag equal to 0 specifies that this syntax structure is not present in the GPS syntax.

When the value of the gps_extension_present_flag field is equal to 1, the GPS according to the embodiments may further include a gps_extension_data_flag field.

The gps_extension_data_flag field may have any value. Its presence and value do not affect the decoder conformance to profiles.

FIG. 27 shows an embodiment of a syntax structure of the attribute parameter set (APS) (attribute_parameter_set( )) according to the present disclosure. The APS according to the embodiments may contain information on a method of encoding attribute information in point cloud data contained in one or more slices. According to embodiments, the APS may include an attribute processing method for the fused point cloud.

The APS according to the embodiments may include an aps_attr_parameter_set_id field, an aps_seq_parameter_set_id field, an attr_coding_type field, an aps_attr_initial_qp field, an aps_attr_chroma_qp_offset field, an aps_slice_qp_delta_present_flag field, and an aps_flag field.

The aps_attr_parameter_set_id field provides an identifier for the APS for reference by other syntax elements.

The aps_seq_parameter_set_id field specifies the value of sps_seq_parameter_set_id for the active SPS.

The attr_coding_type field indicates the coding type for the attribute.

In this example, the attr_coding_type field equal to 0 indicates predicting weight lifting as the coding type. The attr_coding_type field equal to 1 indicates RAHT as the coding type. The attr_coding_type field equal to 2 indicates fix weight lifting.

The aps_attr_initial_qp field specifies the initial value of the variable SliceQp for each slice referring to the APS. The initial value of SliceQp is modified at the attribute slice segment layer when a non-zero value of slice_qp_delta_luma or slice_qp_delta_luma are decoded The aps_attr_chroma_qp_offset field specifies the offsets to the initial quantization parameter signaled by the syntax aps_attr_initial_qp.

The aps_slice_qp_delta_present_flag field specifies whether the ash_attr_qp_delta_luma and ash_attr_qp_delta_chroma syntax elements are present in the attribute slice header (ASH). For example, the aps_slice_qp_delta_present_flag field equal to 1 specifies that the ash_attr_qp_delta_luma and ash_attr_qp_delta_chroma syntax elements are present in the ASH. For example, the aps_slice_qp_delta_present_flag field equal to 0 specifies that the ash_attr_qp_delta_luma and ash_attr_qp_delta_chroma syntax elements are not present in the ASH.

When the value of the attr_coding_type field is 0 or 2, that is, the coding type is predicting weight lifting or fix weight lifting, the APS according to the embodiments may further include a lifting_num_pred_nearest_neighbours field, a lifting_max_num_direct_predictors 필드, a lifting_search_range field, a lifting_lod_regular_sampling_enabled_flag field, a lifting_num_detail_levels_minus field.

The lifting_num_pred_nearest_neighbours field specifies the maximum number of nearest neighbors to be used for prediction.

The lifting_max_num_direct_predictors field specifies the maximum number of predictors to be used for direct prediction. The value of the variable MaxNumPredictors that is used in the decoding process as follows:

MaxNumPredictors=lifting_max_num_direct_predictors field+1

The lifting_lifting_search_range field specifies the search range used to determine nearest neighbors to be used for prediction and to build distance-based levels of detail.

The lifting_num_detail_levels_minus1 field specifies the number of levels of detail for the attribute coding.

The lifting_lod_regular_sampling_enabled_flag field specifies whether levels of detail (LOD) are built by a regular sampling strategy. For example, the lifting_lod_regular_sampling_enabled_flag equal to 1 specifies that levels of detail (LOD) are built by using a regular sampling strategy. The lifting_lod_regular_sampling_enabled_flag equal to 0 specifies that a distance-based sampling strategy is used instead.

The APS according to embodiments includes an iteration statement repeated as many times as the value of the lifting_num_detail_levels_minus1 field. In an embodiment, the index (idx) is initialized to 0 and incremented by 1 every time the iteration statement is executed, and the iteration statement is repeated until the index (idx) is greater than the value of the lifting_num_detail_levels_minus1 field. This iteration statement may include a lifting_sampling_period[idx] field when the value of the lifting_lod_decimation_enabled_flag field is true (e.g., 1), and may include a lifting_sampling_distance_squared[idx] field when the value of the lifting_lod_decimation_enabled_flag field is false (e.g., 0).

The lifting_sampling_period[idx] field specifies the sampling period for the level of detail idx.

The lifting_sampling_distance_squared[idx] field specifies the square of the sampling distance for the level of detail idx.

When the value of the attr_coding_type field is 0, that is, when the coding type is predicting weight lifting, the APS according to the embodiments may further include a lifting_adaptive_prediction_threshold field, and a lifting_intra_lod_prediction_num_layers field.

The lifting_adaptive_prediction_threshold field specifies the threshold to enable adaptive prediction.

The lifting_intra_lod_prediction_num_layers field specifies the number of LOD layers where decoded points in the same LOD layer could be referred to generate a prediction value of a target point. For example, the lifting_intra_lod_prediction_num_layers field equal to num_detail_levels_minus1 plus 1 indicates that target point could refer to decoded points in the same LOD layer for all LOD layers. For example, the lifting_intra_lod_prediction_num_layers field equal to 0 indicates that target point could not refer to decoded points in the same LoD layer for any LoD layers.

The aps_extension_present_flag field specifies whether the aps_extension_data syntax structure is present in the APS syntax structure. For example, the aps_extension_present_flag field equal to 1 specifies that the aps_extension_data syntax structure is present in the APS syntax structure. For example, the aps_extension_present_flag field equal to 0 specifies that this syntax structure is not present in the APS syntax structure.

When the value of the aps_extension_present_flag field is 1, the APS according to the embodiments may further include an aps_extension_data_flag field.

The aps_extension_data_flag field may have any value. Its presence and value do not affect decoder conformance to profiles.

The APS according to the embodiments may further include an attribute processing method for the fused point cloud.

When the value of the attr_coding_type field is 0 or 2, that is, when the coding type is "predicting weight lifting" or "fix weight lifting," the APS according to embodiments may further include an attribute_recommendedshared_result_flag field.

When at least one point has a plurality of attributes, the attribute_recommendedshared_result_flag field may specify whether to recommend independent execution for the corresponding attribute. For example, the attribute_recommendedshared_result_flag field equal to 0 may indicate that the attribute is independently decoded according to FIG. 20. The attribute_recommendedshared_result_flag field equal to 1 may indicate that some processing results are shared to decode the attribute according to FIG. 21.

FIG. 28 shows an embodiment of a syntax structure of a tile parameter set (TPS) (tile_parameter_set( )) according to the present disclosure. According to embodiments, a TPS may be referred to as a tile inventory. The TPS according to the embodiments includes information related to each tile. In particular, in this example, the TPS includes an attribute processing method for the fused point cloud.

The TPS according to the embodiments includes a num_tiles field.

The num_tiles field indicates the number of tiles signaled for the bitstream. When not present, num_tiles is inferred to be 0.

The TPS according to the embodiments includes an iteration statement repeated as many times as the value of the num_tiles field. In an embodiment, i is initialized to 0, and is incremented by 1 each time the iteration statement is executed. The iteration statement is repeated until the value of i becomes equal to the value of the num_tiles field. The iteration statement may include a tile_bounding_box_offset_x[i] field, a tile_bounding_box_offset_y[i] field, a tile_bounding_box_offset_z[i] field, a tile_bounding_box_size_width[i] field, a tile_bounding_box_size_height[i] field, and a tile_bounding_box_size_depth[i] field.

The tile_bounding_box_offset_x[i] field indicates the x offset of the i-th tile in the Cartesian coordinates.

The tile_bounding_box_offset_y[i] field indicates the y offset of the i-th tile in the Cartesian coordinates.

The tile_bounding_box_offset_z[i] field indicates the z offset of the i-th tile in the Cartesian coordinates.

The tile_bounding_box_size_width[i] field indicates the width of the i-th tile in the Cartesian coordinates.

The tile_bounding_box_size_height[i] field indicates the height of the i-th tile in the Cartesian coordinates.

The tile_bounding_box_size_depth[i] field indicates the depth of the i-th tile in the Cartesian coordinates.

The TPS according to the embodiments may further include an attribute processing method for the fused point cloud.

According to embodiments, the attribute processing method for the fused point cloud may be included in an iteration statement repeated as many times as the value of the num_tiles field described above.

That is, the iteration statement may include an attribute_recommendedshared_result_flag [i] field.

When at least one point has a plurality of attributes, the attribute_recommendedshared_result_flag [i] field may specify whether to recommend independent execution for the corresponding attribute in the i-th tile. For example, the attribute_recommendedshared_result_flag [i] field equal to 0 may indicate that the attribute is independently decoded according to FIG. 20. The attribute_recommendedshared_result_flag [i] field equal to 1 may indicate that some processing results are shared to decode the attribute according to FIG. 21.

FIG. 29 shows an embodiment of a syntax structure of a geometry slice bitstream according to the present disclosure.

The geometry slice bitstream (geometry_slice_bitstream( )) according to the embodiments may include a geometry slice header (geometry_slice_header( )) and geometry slice data (geometry_slice_data( )).

FIG. 30 shows an embodiment of a syntax structure of the geometry slice header (geometry_slice_header( )) according to the present disclosure.

A bitstream transmitted by the transmission device (or a bitstream received by the reception device) according to the embodiments may contain one or more slices. Each slice may include a geometry slice and an attribute slice. The geometry slice includes a geometry slice header (GSH). The attribute slice includes an attribute slice header (ASH).

The geometry slice header (geometry_slice_header( )) according to embodiments may include a gsh_geom_parameter_set_id field, a gsh_tile_id field, a gsh_slice_id field, a gsh_max_node_size_log 2 field, a gsh_num_points field, and a byte_alignment( ) field.

When the value of the gps_box_present_flag field included in the GPS is 'true' (e.g., 1), and the value of the gps_gsh_box_log 2_scale_present_flag field is 'true' (e.g., 1), the geometry slice header (geometry_slice_header( )) according to the embodiments may further include a gsh_box_log 2_scale field, a gsh_box_origin_x field, a gsh_box_origin_y field, and a gsh_box_origin_z field.

The gsh_geom_parameter_set_id field specifies the value of the gps_geom_parameter_set_id of the active GPS.

The gsh_tile_id field specifies the value of the tile id that is referred to by the GSH.

The gsh_slice_id specifies id of the slice for reference by other syntax elements.

The gsh_box_log 2_scale field specifies the scaling factor of the bounding box origin for the slice.

The gsh_box_origin_x field specifies the x value of the bounding box origin scaled by the value of the gsh_box_log 2_scale field.

The gsh_box_origin_y field specifies the y value of the bounding box origin scaled by the value of the gsh_box_log 2_scale field.

The gsh_box_origin_z field specifies the z value of the bounding box origin scaled by the value of the gsh_box_log 2_scale field.

The gsh_max_node_size_log 2 field specifies a size of a root geometry octree node.

The gsh_points_number field specifies the number of coded points in the slice.

FIG. 31 shows an embodiment of a syntax structure of geometry slice data (geometry_slice_data( )) according to the present disclosure. The geometry slice data (geometry_slice_data( )) according to the embodiments may carry a geometry bitstream belonging to a corresponding slice.

The geometry_slice_data( ) according to the embodiments may include a first iteration statement repeated as many times as by the value of MaxGeometryOctreeDepth. In an embodiment, the depth is initialized to 0 and is incremented by 1 each time the iteration statement is executed, and the first iteration statement is repeated until the depth becomes equal to MaxGeometryOctreeDepth. The first iteration statement may include a second loop statement repeated as many times as the value of NumNodesAtDepth. In an embodiment, nodeidx is initialized to 0 and is incremented by 1 each time the iteration statement is executed. The second iteration statement is repeated until nodeidx becomes equal to NumNodesAtDepth. The second iteration statement may include xN=NodeX[depth][nodeIdx], yN=NodeY[depth][nodeIdx], zN=NodeZ[depth][nodeIdx], and geometry_node(depth, nodeIdx, xN, yN, zN). MaxGeometryOctreeDepth indicates the maximum value of the geometry octree depth, and NumNodesAtDepth[depth] indicates the number of nodes to be decoded at the corresponding depth. The variables NodeX[depth][nodeIdx], NodeY[depth][nodeIdx], and NodeZ[depth][nodeIdx] indicate the x, y, z coordinates of the nodeIdx-th node in decoding order at a given depth. The geometry bitstream of the node of the depth is transmitted through geometry_node(depth, nodeIdx, xN, yN, zN).

The geometry slice data (geometry_slice_data( )) according to the embodiments may further include geometry_trisoup_data( ) when the value of the log 2_trisoup_node_size field is greater than 0. That is, when the size of the triangle nodes is greater than 0, a geometry bitstream subjected to trisoup geometry encoding is transmitted through geometry_trisoup_data( ).

FIG. 32 shows an embodiment of a syntax structure of attribute_slice_bitstream( ) according to the present disclosure.

The attribute slice bitstream (attribute_slice_bitstream ( )) according to the embodiments may include an attribute slice header (attribute_slice_header( )) and attribute slice data (attribute_slice_data( )).

FIG. 33 shows an embodiment of a syntax structure of an attribute slice header (attribute_slice_header( )) according to the present disclosure. The attribute slice header according to the embodiments includes signaling information for a corresponding attribute slice. In particular, in this example, the attribute slice header includes an attribute processing method for the fused point cloud.

The attribute slice header (attribute_slice_header( )) according to the embodiments may include an ash_attr_parameter_set_id field, an ash_attr_sps_attr_idx field, and an ash_attr_geom_slice_id field.

When the value of the aps_slice_qp_delta_present_flag field of the APS is 'true' (e.g., 1), the attribute slice header (attribute_slice_header( )) according to the embodiments may further include an ash_qp_delta_luma field and an ash_qp_delta_chroma field.

The ash_attr_parameter_set_id field specifies a value of the aps_attr_parameter_set_id field of the current active APS (e.g., the aps_attr_parameter_set_id field included in the APS described in FIG. 27).

The ash_attr_sps_attr_idx field identifies an attribute set in the current active SPS. The value of the ash_attr_sps_attr_idx field is in the range from 0 to the sps_num_attribute_sets field included in the current active SPS.

The ash_attr_geom_slice_id field specifies the value of the gsh_slice_id field of the current geometry slice header.

The ash_qp_delta_luma field specifies a luma delta quantization parameter (qp) derived from the initial slice qp in the active attribute parameter set.

The ash_qp_delta_chroma field specifies the chroma delta qp derived from the initial slice qp in the active attribute parameter set.

The attribute slice header (attribute_slice_header( )) according to the embodiments may further include an attribute processing method for the fused point cloud, for example, an attribute_recommendedshared_result_flag field.

When at least one point has a plurality of attributes, the attribute_recommendedshared_result_flag field may specify whether to recommend independent execution for the corresponding attribute. For example, the attribute_recommendedshared_result_flag field equal to 0 may indicate that the attribute is independently decoded according to FIG. 20. The attribute_recommendedshared_result_flag field equal to 1 may indicate that some processing results are shared to decode the attribute according to FIG. 21.

FIG. 34 shows an embodiment of a syntax structure of the attribute slice data (attribute_slice_data( )) according to the present disclosure. The attribute slice data (attribute_slice_data( )) according to the embodiments may carry an attribute bitstream belonging to a corresponding slice.

In the attribute slice data (attribute_slice_data( )) of FIG. 34, dimension=attribute_dimension[ash_attr_sps_attr_idx] represents the attribute dimension (attribute_dimension) of the attribute set identified by the ash_attr_sps_attr_idx field in the corresponding attribute slice header. The attribute_dimension refers to the number of components constituting an attribute. Attributes according to embodiments represent reflectance, color, or the like. Accordingly, the number of components varies for each attribute. For example, an attribute corresponding to color may have three color components (e.g., RGB). Accordingly, an attribute corresponding to reflectance may be a mono-dimensional attribute, and the attribute corresponding to color may be a three-dimensional attribute.

The attributes according to the embodiments may be attribute-encoded on a dimension-by-dimension basis.

In FIG. 34, zerorun specifies the number of 0 prior to residual).

In FIG. 34, i denotes an i-th point value of the attribute. According to an embodiment, the attr_coding_type field and the lifting_adaptive_prediction_threshold field are signaled in the APS.

MaxNumPredictors of FIG. 34 is a variable used in the point cloud data decoding process, and may be acquired based on the value of the lifting_adaptive_prediction_threshold field signaled in the APS as follows.

MaxNumPredictors=lifting_max_num_direct_predictors field+1

Here, the lifting_max_num_direct_predictors field indicates the maximum number of predictors to be used for direct prediction.

According to the embodiments, predIndex[i] specifies the predictor index (or prediction mode) to decode the i-th point value of the attribute. The value of predIndex[i] is in the range from 0 to the value of the lifting_max_num_direct_predictors field.

The variable MaxPredDiff[i] according to the embodiments may be calculated as follows.

```
minValue = maxValue = ã_o
for (j = 0; j < k; j++) {
    minValue = Min(minValue, ã_j)
    maxValue = Max(maxValue, ã_j)
}
MaxPredDiff[i] = maxValue − minValue;
```

Here, let $k_i$ be the set of the k-nearest neighbors of the current point i and let $(\tilde{a}_j)_{j \in k_i}$ be their decoded/reconstructed attribute values. The number of nearest neighbors, $k_i$ shall be in the range of 1 to lifting_num_pred_nearest_neighbours. According to embodiments, the decoded/reconstructed attribute values of neighbors are derived according to the Predictive Lifting decoding process.

The lifting_num_pred_nearest_neighbours field is signaled in the APS and indicates the maximum number of nearest neighbors to be used for prediction.

According to embodiments of the present disclosure, the attribute slice bitstream of FIGS. 32 to 35 is provided for each of the color attribute and the reflectance attribute.

Figure 35:
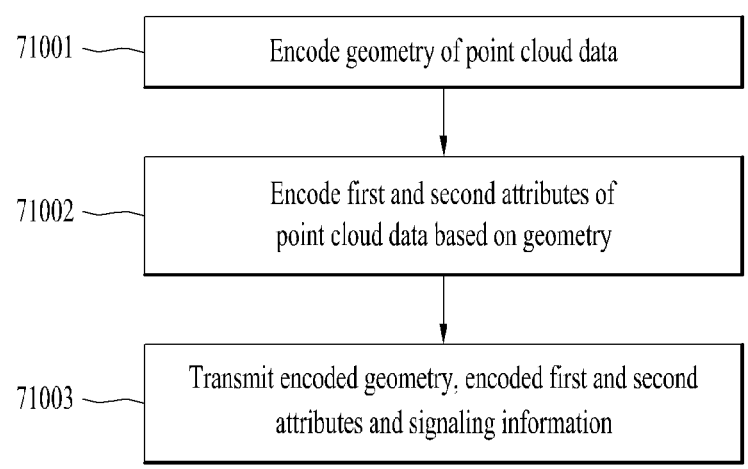
FIG. 35 is a flowchart of a method of transmitting point cloud data according to embodiments.

FIG. 35 is a flowchart of a method of transmitting point cloud data according to embodiments.

The point cloud data transmission method according to the embodiments may include a step 71001 of encoding geometry contained in the point cloud data, a step 71002 of encoding first and second attributes contained in the point cloud data based on input and/or reconstructed geometry, and a step 71003 of transmitting a bitstream including the encoded geometry, the encoded first and second attributes, and signaling information.

The steps 71001 and 71002 of encoding the geometry and attribute contained in the point cloud data may perform some or all of the operations of the point cloud video encoder 10002 of FIG. 1, the encoding process 20001 of FIG. 2, the point cloud video encoder of FIG. 4, the point cloud video encoder of FIG. 12, the point cloud encoding process of FIG. 14, the point cloud video encoder of FIG. 15 or the geometry encoder and the attribute encoder of FIG. 17 or the geometry encoder and the attribute encoder of FIG. 18.

According to embodiments, in the present disclosure, attribute encoding may be performed by fixing one of the attribute encoder as illustrated in FIG. 17 or the attribute encoder as illustrated in FIG. 18. For example, when only the point cloud video encoder having the structure shown in FIG. 17 is provided, encoding of a color attribute and encoding of a reflectance attribute may be performed independently. As another example, when only the point cloud video encoder having the structure shown in FIG. 18 is provided, some processing results may be shared for attribute encoding to encode the color attribute and the reflectance attribute.

According to embodiments, independent attribute encoding for each attribute through the attribute encoder of FIG. 17 or attribute encoding in which some processing results are shared through the attribute encoder of FIG. 18 may be selectively performed according to the processing capability of the attribute encoder and/or the attribute decoder. According to embodiments, whether to independently perform finding of neighbor points for attribute transformation processing, generation of LODs, and finding of neighbor points based on LODs for a plurality of attributes may be signaled in a recommended scheme. The recommendation scheme may be applied by the point cloud video decoder according to the processing capability of the equipment, and/or the characteristics of the content, and/or the workload at the corresponding time.

In the present disclosure, an attribute processing method (attribute_recommendedshared_result_flag) for a fused point cloud for indicating whether to share some processing operations and the results thereof or to independently perform the operations in attribute encoding and decoding may be signaled in signaling information.

According to embodiments, attribute processing method (attribute_recommendedshared_result_flag) for a fused point cloud may be signaled in at least one of a sequence parameter set, an attribute parameter set, a tile parameter set, or an attribute slice header.

According to embodiments, the color attribute bitstream encoded according to the configuration of FIG. 17 or 18 includes a residual attribute value of the color attribute for each point, and the reflectance attribute bitstream encoded according to the configuration of FIG. 17 or 18 includes a residual attribute value of the reflectance attribute for each point. According to embodiments, the color attribute bitstream encoded according to the configuration of FIG. 17 or 18 may or may not include the prediction mode of a point depending on the point, and the reflectance attribute bitstream encoded according to the configuration of FIG. 17 or 18 may or may not include the prediction mode of the point depending on the point.

According to embodiments, the step 71002 may apply a zero-run length coding to color residual attribute values of the points.

According to embodiments, the step 71002 may apply a zero-run length coding to reflectance residual attribute values of the points.

In the steps 71001 and 71002 according to embodiments, encoding may be performed on the basis of a slice or a tile containing one or more slices.

The step 71003 may be performed by the transmitter 10003 of FIG. 1, the transmitting process 20002 of FIG. 2, transmission processor 12012 of FIG. 12 or transmission processor 51008 of FIG. 15.

Figure 36:
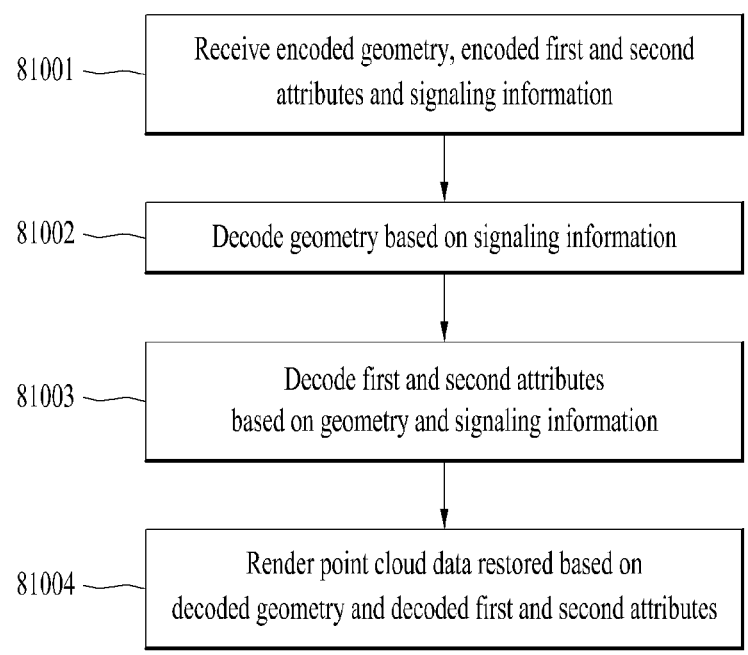
FIG. 36 is a flowchart of a method of receiving point cloud data according to embodiments.

FIG. 36 is a flowchart of a method of receiving point cloud data according to embodiments.

According to embodiments, a point cloud data reception method may include a step 81001 of receiving encoded geometries, encoded first and second attributes, and signaling information, a step 81002 of decoding the geometries based on the signaling information, a step 81003 of decoding the first and second attributes based on the signaling information and the decoded/reconstructed geometries, and a step 81004 of rendering point cloud data restored based on the decoded geometries and the decoded first and second attributes.

The step 81001 according to embodiments may be performed by the receiver 10005 of FIG. 1, the transmitting process 20002 or the decoding process 20003 of FIG. 2, the receiver 13000 or the reception processor 13001 of FIG. 13 or the reception processor 61001 of FIG. 19.

In the steps 81002 and 81003 according to embodiments, decoding may be performed on the basis of a slice or a tile containing one or more slices.

According to embodiments, the step 81002 may perform some or all of the operations of the point cloud video decoder 10006 of FIG. 1, the decoding process 20003 of FIG. 2, the point cloud video decoder of FIG. 11, the point cloud video decoder of FIG. 13, the geometry decoder of FIG. 19, the geometry decoder of FIG. 20 or the geometry decoder of FIG. 21.

According to embodiments, the step 81003 may perform some or all of the operations of the point cloud video decoder 10006 of FIG. 1, the decoding process 20003 of FIG. 2, the point cloud video decoder of FIG. 11, the point cloud video decoder of FIG. 13, the attribute decoder of FIG. 19, the attribute decoder of FIG. 20 or the attribute decoder of FIG. 21.

According to embodiments, the signaling information such as a sequence parameter set, an attribute parameter set, a tile parameter set, or an attribute slice header may include information on the maximum number of predictors that is used for attribute prediction (lifting_max_num_direct_predictors), threshold information for enabling adaptive prediction of an attribute (lifting_adaptive_prediction_threshold), an attribute processing method (attribute_recommendedshared_result_flag) for the fused point cloud, and the like.

According to an embodiment, attribute slice data may include predictor index information (predIndex) indicating a prediction mode of a point to be decoded.

According to embodiments, in the operation 81003 of decoding attributes, independent attribute decoding of each attribute by the attribute decoder of FIG. 20 or attribute decoding by the attribute decoder of FIG. 21 for which some processing results are shared may be selectively performed according to the processing capability of the attribute decoder. According to embodiments, whether to independently perform LOD generation, finding and registration of neighbor points for a plurality of attributes may be signaled in a recommended scheme. The recommendation scheme may be applied by the point cloud video decoder according to the processing capability of the equipment, and/or the characteristics of the content, and/or the workload at the corresponding time.

According to the present disclosure, an attribute processing method (attribute_recommendedshared_result_flag) for a fused point cloud which indicates whether to share some processing operations and the results thereof or to independently perform the operations in attribute decoding may be acquired from at least one of a sequence parameter set, an attribute parameter set, a tile parameter set, or an attribute slice header.

According to embodiments, in the operation 81003 of decoding attributes, a color attribute value of a specific point may be predicted based on a predefined prediction mode or a prediction mode corresponding to a predictor index signaled in the attribute slice data, in decoding a color attribute of the specific point based on the configuration of FIG. 20 or 21.

According to embodiments, in operation 81003 of decoding attributes, a color attribute value of a specific point may be restored by adding a received residual attribute value of the point to a predicted attribute value in decoding a color attribute of the specific point based on the configuration of FIG. 20 or 21. In the operation 81003 of decoding attributes, this process is performed for each point to restore the color attribute value of each point.

According to embodiments, in the operation 81003 of decoding attributes, a reflectance attribute value of a specific point may be predicted based on a predefined prediction mode or a prediction mode corresponding to a predictor index signaled in the attribute slice data, in decoding a reflectance attribute of the specific point based on the configuration of FIG. 20 or 21.

According to embodiments, in operation 81003 of decoding attributes, a reflectance attribute value of a specific point may be restored by adding a received residual attribute value of the point to a predicted attribute value in decoding a reflectance attribute of the specific point based on the configuration of FIG. 20 or 21. In the operation 81003 of decoding attributes, this process is performed for each point to restore the reflectance attribute value of each point.

In the step 81004 of rendering the point cloud data according to the embodiments, the point cloud data may be rendered according to various rendering methods. For example, the points of the point cloud content may be rendered onto a vertex having a certain thickness, a cube of a specific minimum size centered on the vertex position, or a circle centered on the vertex position. All or part of the rendered point cloud content is provided to the user through a display (e.g. a VR/AR display, a general display, etc.).

The step 81004 according to the embodiments may be performed by the renderer 10007 of FIG. 1, the rendering process 20004 of FIG. 2, or the renderer 13011 of FIG. 13.

A point cloud data transmission method, a point cloud data transmission device, a point cloud data reception method, and a point cloud data reception device according to embodiments may provide a good-quality point cloud service.

A point cloud data transmission method, a point cloud data transmission device, a point cloud data reception method, and a point cloud data reception device according to embodiments may achieve various video codec methods.

A point cloud data transmission method, a point cloud data transmission device, a point cloud data reception method, and a point cloud data reception device according to embodiments may provide universal point cloud content such as a self-driving service (or an autonomous driving service).

A point cloud data transmission method, a point cloud data transmission device, a point cloud data reception method, and a point cloud data reception device according to embodiments may perform space-adaptive partition of point cloud data for independent encoding and decoding of the point cloud data, thereby improving parallel processing and providing scalability.

A point cloud data transmission method, a point cloud data transmission device, a point cloud data reception method, and a point cloud data reception device according to embodiments may perform encoding and decoding by spatially partitioning the point cloud data in units of tiles and/or slices, and signal necessary data therefore, thereby improving encoding and decoding performance of the point cloud.

With a point cloud data transmission method, a point cloud data transmission device, a point cloud data reception method, and a point cloud data reception device according to embodiments, when at least one point in the point cloud data has a plurality of attributes, finding neighbor points for attribute transformation processing of the plurality of attributes, generation of LODs, and finding neighbor points based on the generated LODs may be shared. Thereby, attribute encoding time may be shortened, and power consumption and redundant memory usage may be reduced.

With a point cloud data transmission method, a point cloud data transmission device, a point cloud data reception method, and a point cloud data reception device according to embodiments, generating LODs for a plurality of attributes and configuring a neighbor point set based on the generated LODs may be performed in common or independently according to signaling information. Thereby, attribute encoding and attribute decoding of fused point cloud data may be performed efficiently.

With a point cloud data transmission method, a point cloud data transmission device, a point cloud data reception method, and a point cloud data reception device according to embodiments, generating LODs for a plurality of attributes and configuring a neighbor point set based on the generated LODs may be performed in common or independently according to the processing capability of a decoding device. Thereby, attribute encoding and attribute decoding of fused point cloud data may be performed efficiently.

With a point cloud data transmission method, a point cloud data transmission device, a point cloud data reception method, and a point cloud data reception device according to embodiments, generating LODs for a plurality of attributes and configuring a neighbor point set based on the generated LODs may be performed in common or independently according to the amount of information to be processed. Thereby, attribute encoding and attribute decoding of fused point cloud data may be performed efficiently.

Each part, module, or unit described above may be a software, processor, or hardware part that executes successive procedures stored in a memory (or storage unit). Each of the steps described in the above embodiments may be performed by a processor, software, or hardware parts. Each module/block/unit described in the above embodiments may operate as a processor, software, or hardware. In addition, the methods presented by the embodiments may be executed as code. This code may be written on a processor readable storage medium and thus read by a processor provided by an apparatus.

In the specification, when a part "comprises" or "includes" an element, it means that the part further comprises or includes another element unless otherwise mentioned. Also, the term " . . . module(or unit)" disclosed in the specification means a unit for processing at least one function or operation, and may be implemented by hardware, software or combination of hardware and software.

Although embodiments have been explained with reference to each of the accompanying drawings for simplicity, it is possible to design new embodiments by merging the embodiments illustrated in the accompanying drawings. If a recording medium readable by a computer, in which programs for executing the embodiments mentioned in the foregoing description are recorded, is designed by those skilled in the art, it may fall within the scope of the appended claims and their equivalents.

The apparatuses and methods may not be limited by the configurations and methods of the embodiments described above. The embodiments described above may be configured by being selectively combined with one another entirely or in part to enable various modifications.

Although preferred embodiments have been described with reference to the drawings, those skilled in the art will appreciate that various modifications and variations may be made in the embodiments without departing from the spirit or scope of the disclosure described in the appended claims. Such modifications are not to be understood individually from the technical idea or perspective of the embodiments.

Various elements of the apparatuses of the embodiments may be implemented by hardware, software, firmware, or a combination thereof. Various elements in the embodiments may be implemented by a single chip, for example, a single hardware circuit. According to embodiments, the components according to the embodiments may be implemented as separate chips, respectively. According to embodiments, at least one or more of the components of the apparatus according to the embodiments may include one or more processors capable of executing one or more programs. The one or more programs may perform any one or more of the operations/methods according to the embodiments or include instructions for performing the same. Executable instructions for performing the method/operations of the apparatus according to the embodiments may be stored in a non-transitory CRM or other computer program products configured to be executed by one or more processors, or may be stored in a transitory CRM or other computer program products configured to be executed by one or more processors. In addition, the memory according to the embodiments may be used as a concept covering not only volatile memories (e.g., RAM) but also nonvolatile memories, flash memories, and PROMs. In addition, it may also be implemented in the form of a carrier wave, such as transmission over the Internet. In addition, the processor-readable recording medium may be distributed to computer systems connected over a network such that the processor-readable code may be stored and executed in a distributed fashion.

In this document, the term "/" and "," should be interpreted as indicating "and/or." For instance, the expression "A/B" may mean "A and/or B." Further, "A, B" may mean "A and/or B." Further, "A/B/C" may mean "at least one of A, B, and/or C." "A, B, C" may also mean "at least one of A, B, and/or C." Further, in the document, the term "or" should be interpreted as "and/or." For instance, the expression "A or B" may mean 1) only A, 2) only B, and/or 3) both A and B. In other words, the term "or" in this document should be interpreted as "additionally or alternatively."

Terms such as first and second may be used to describe various elements of the embodiments. However, various components according to the embodiments should not be limited by the above terms. These terms are only used to distinguish one element from another. For example, a first user input signal may be referred to as a second user input signal. Similarly, the second user input signal may be referred to as a first user input signal. Use of these terms should be construed as not departing from the scope of the various embodiments. The first user input signal and the second user input signal are both user input signals, but do not mean the same user input signal unless context clearly dictates otherwise. The terminology used to describe the embodiments is used for the purpose of describing particular embodiments only and is not intended to be limiting of the embodiments. As used in the description of the embodiments and in the claims, the singular forms "a", "an", and "the" include plural referents unless the context clearly dictates otherwise. The expression "and/or" is used to include all possible combinations of terms. The terms such as "includes" or "has" are intended to indicate existence of figures, numbers, steps, elements, and/or components and should be understood as not precluding possibility of existence of additional existence of figures, numbers, steps, elements, and/or components.

As used herein, conditional expressions such as "if" and "when" are not limited to an optional case and are intended to be interpreted, when a specific condition is satisfied, to perform the related operation or interpret the related definition according to the specific condition. Embodiments may include variations/modifications within the scope of the claims and their equivalents. It will be apparent to those skilled in the art that various modifications and variations can be made in the present invention without departing from the spirit and scope of the invention. Thus, it is intended that the present invention cover the modifications and variations of this invention provided they come within the scope of the appended claims and their equivalents.

What is claimed is:

1. A point cloud data transmission method by an apparatus, the method comprising:

acquiring point cloud data;

encoding geometry information including positions of points in the point cloud data;

generating Level Of Details (LODs) based on the geometry information, and searching neighbor points of each point to be attribute encoded based on the generated LODs, wherein each point to be attribute encoded includes both color information and reflectance information, and wherein the LOD generation and the neighbor point search of each point are shared for an encoding process of the color information and an encoding process of the reflectance information;

encoding the color information of each point based on the searched neighbor points;

encoding the reflectance information of each point based on the searched neighbor points; and transmitting the encoded geometry information, the encoded color information, the encoded reflectance information and signaling information.

2. The method of claim 1, wherein the color information and the reflectance information, respectively, are encoded by sharing a result of the LOD generation and a result of the neighbor point search when a configuration for the LOD generation and a maximum number of neighbor points for the color information and the reflectance information are same.

3. The method of claim 1, wherein encoding the color information comprises:

determining a prediction mode of the color information of each point based on the searched neighbor points; and acquiring residual color information of each point by a difference between prediction color information of each point predicted based on the prediction mode of each point and the color information of each point.

4. The method of claim 1, wherein encoding the reflectance information comprises:
determining a prediction mode of the reflectance information of each point based on the searched neighbor points; and
acquiring residual reflectance information of each point by a difference between prediction reflectance information of each point predicted based on the prediction mode of each point and the reflectance information of each point.

5. A point cloud data transmission apparatus, the apparatus comprising:
an acquisition unit to acquire point cloud data;
a geometry encoder to encode geometry information including positions of points in the point cloud data;
a configuration unit to generate Level Of Details (LODs) based on the geometry information, and to search neighbor points of each point to be attribute encoded based on the generated LODs, wherein each point to be attribute encoded includes both color information and reflectance information, and wherein the LOD generation and the neighbor point search of each point are shared for an encoding process of the color information and an encoding process of the reflectance information;
a first attribute encoding unit to encode the color information of each point based on the searched neighbor points;
a second attribute encoding unit to encode the reflectance information of each point based on the searched neighbor points; and
a transmitter to transmit the encoded geometry information, the encoded color information, the encoded reflectance information and signaling information.

6. The apparatus of claim 5, wherein the color information and the reflectance information, respectively, are encoded by sharing a result of the LOD generation and a result of the neighbor point search when a configuration for the LOD generation and a maximum number of neighbor points for the color information and the reflectance information are same.

7. The apparatus of claim 5, wherein the first attribute encoding unit comprises:
color information predictor to determine a prediction mode of the color information of each point based on the searched neighbor points; and
a residual color information processor to acquire residual color information of each point by a difference between prediction color information of each point predicted based on the prediction mode of each point and the color information of each point.

8. The apparatus of claim 5, wherein the second attribute encoding unit comprises:
a reflectance information predictor to determine a prediction mode of the reflectance information of each point based on the searched neighbor points; and
a residual reflectance information processor to acquire residual reflectance information of each point by a difference between second prediction reflectance information of each point predicted based on the prediction mode of each point and the reflectance information of each point.

9. A point cloud data reception apparatus, the apparatus comprising:
a receiver to receive geometry information, color information, reflectance information, and signaling information;
a geometry decoder to decode the geometry information based on the signaling information;
a configuration unit to generate Level Of Details (LODs) based on the geometry information and the signaling information, and to search neighbor points of each point to be attribute decoded based on the generated LODs, wherein each point to be attribute decoded includes both the color information and the reflectance information, and wherein the LOD generation and the neighbor point search of each point are shared for a decoding process of the color information and a decoding process of the reflectance information;
a first attribute decoding unit to decode the color information of each point based on the signaling information and the searched neighbor points;
a second attribute decoding unit to decode the reflectance information of each point based on the signaling information and the searched neighbor points; and
a renderer to render point cloud data restored based on the decoded geometry information and the decoded color information and the decoded reflectance information.

10. The apparatus of claim 9, wherein the color information and the reflectance information, respectively, are decoded by sharing a result of the LOD generation and a result of the neighbor point search when a configuration for the LOD generation and a maximum number of neighbor points for the color information and the reflectance information are same.

11. The apparatus of claim 9, wherein the first attribute decoding unit comprises:
a color information predictor to determine a prediction mode of the color information of each point based on the signaling information and the searched neighbor points; and
a color information restoring unit to restore the color information of each point by adding first prediction color information of each point predicted based on the prediction mode of each point and residual color information of each point received.

12. The apparatus of claim 9, wherein the second attribute decoding unit comprises:
a reflectance information predictor to determine a prediction mode of the reflectance information of each point based on the signaling information and the searched neighbor points; and
a reflectance information restoring unit to restore the reflectance information of each point by adding prediction reflectance information of each point predicted based on the prediction mode of each point and residual reflectance information of each point received.

13. A point cloud data reception method by an apparatus, the method comprising:
receiving geometry information, color information, reflectance information, and signaling information;
decoding the geometry information based on the signaling information;
generating Level Of Details (LODs) based on the geometry information and the signaling information, and searching neighbor points of each point to be attribute decoded based on the generated LODs, wherein each point to be attribute decoded includes both the color information and the reflectance information, and wherein the LOD generation and the neighbor point search of each point are shared for a decoding process of the color information and a decoding process of the reflectance information;

decoding the color information of each point based on the signaling information and the searched neighbor points;

decoding the reflectance information of each point based on the signaling information and the searched neighbor points; and rendering point cloud data restored based on the decoded geometry information and the decoded color information and the decoded reflectance information.

14. The method of claim 13, wherein the color information and the reflectance information, respectively, are decoded by sharing a result of the LOD generation and a result of the neighbor point search when a configuration for the LOD generation and a maximum number of neighbor points for the color information and the reflectance information are same.

15. The method of claim 13, wherein decoding the color information of each point comprises:

determining a prediction mode of the color information of each point based on the signaling information and the searched neighbor points; and restoring the color information of each point by adding prediction color information of each point predicted based on the prediction mode of each point and residual color information of each point received.

16. The method of claim 13, wherein decoding the reflectance information of each point comprises:

determining a prediction mode of the reflectance information of each point based on the signaling information and the searched neighbor points; and restoring the reflectance information of each point by adding prediction reflectance information of each point predicted based on the prediction mode of each point and residual reflectance information of each point received.

* * * * *